US008160952B1

(12) United States Patent
Fell et al.

(10) Patent No.: US 8,160,952 B1
(45) Date of Patent: *Apr. 17, 2012

(54) METHOD AND SYSTEM FOR PROVIDING PRICE PROTECTION RELATED TO THE PURCHASE OF A COMMODITY

(75) Inventors: Robert M. Fell, Summerland, CA (US); Gary A. Magnuson, Corpus Christi, TX (US); Hal Connor Elrod, Houston, TX (US); Bradley Michael Weill, Austin, TX (US); Thomas D. Gros, Houston, TX (US)

(73) Assignee: Pricelock, Inc., Redwood City, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/370,430

(22) Filed: Feb. 12, 2009
(Under 37 CFR 1.47)

Related U.S. Application Data

(60) Provisional application No. 61/028,125, filed on Feb. 12, 2008, provisional application No. 61/057,250, filed on May 30, 2008, provisional application No. 61/056,732, filed on May 28, 2008, provisional application No. 61/056,775, filed on May 28, 2008, provisional application No. 61/056,767, filed on May 28, 2008.

(51) Int. Cl.
*G06Q 40/00* (2012.01)
*G06Q 30/00* (2012.01)
(52) U.S. Cl. ............... 705/37; 705/35; 705/4; 705/26.1
(58) Field of Classification Search .................. None
See application file for complete search history.

(56) References Cited

U.S. PATENT DOCUMENTS

| | | | |
|---|---|---|---|
| 3,691,527 A | 9/1972 | Yamamoto | |
| 3,852,576 A | 12/1974 | Rudd | |
| 4,723,212 A | 2/1988 | Mindrum et al. | |
| 4,821,186 A | 4/1989 | Munakata et al. | |
| 4,825,045 A | 4/1989 | Humble | |
| 4,910,672 A | 3/1990 | Off et al. | |
| 5,056,019 A | 10/1991 | Schultz et al. | |
| 5,173,851 A | 12/1992 | Off et al. | |
| 5,200,889 A | 4/1993 | Mori | |

(Continued)

FOREIGN PATENT DOCUMENTS
AU          2006100751 A4     12/2006
(Continued)

OTHER PUBLICATIONS

International Preliminary Report on Patentability for PCT Application No. PCT/US2008/059633, issued Oct. 13, 2009, mailed Oct. 22, 2009, 6 pgs.

(Continued)

*Primary Examiner* — Mussa A Shaawat
(74) *Attorney, Agent, or Firm* — Sprinkle IP Law Group

(57) ABSTRACT

Systems and methods described herein pertain to providing price protection programs related to the purchase of a commodity to a consumer. Embodiments of such a program may provide price protection related to the purchase of a commodity to the consumer so that when a consumer purchases the commodity, the price the consumer pays for the commodity may be determined under the provided program. Embodiments of these programs may be quite useful in incentivizing consumers in certain ways, including to seek or obtain employment from a particular employer.

12 Claims, 29 Drawing Sheets

U.S. PATENT DOCUMENTS

| | | |
|---|---|---|
| 5,202,826 A | 4/1993 | McCarthy |
| 5,481,094 A | 1/1996 | Suda |
| 5,521,364 A | 5/1996 | Kimura et al. |
| 5,612,868 A | 3/1997 | Off et al. |
| 5,710,887 A | 1/1998 | Chelliah et al. |
| 5,806,045 A | 9/1998 | Biorge et al. |
| 5,822,735 A | 10/1998 | De Lapa et al. |
| 5,862,222 A | 1/1999 | Gunnarsson |
| 5,873,069 A | 2/1999 | Reuhl et al. |
| 5,890,137 A | 3/1999 | Koreeda |
| 6,078,900 A | 6/2000 | Ettl et al. |
| 6,098,879 A | 8/2000 | Terranova |
| 6,112,981 A | 9/2000 | McCall |
| 6,116,505 A | 9/2000 | Withrow |
| 6,145,741 A | 11/2000 | Wisdom et al. |
| 6,151,565 A | 11/2000 | Lobley et al. |
| 6,152,591 A | 11/2000 | McCall et al. |
| 6,157,871 A | 12/2000 | Terranova |
| 6,193,155 B1 | 2/2001 | Walker et al. |
| 6,249,772 B1 | 6/2001 | Walker et al. |
| 6,298,329 B1 | 10/2001 | Walker et al. |
| 6,321,984 B1 | 11/2001 | McCall et al. |
| 6,332,128 B1 | 12/2001 | Nicholson |
| 6,422,464 B1 | 7/2002 | Terranova |
| 6,526,277 B1 | 2/2003 | Zicker et al. |
| 6,594,644 B1 | 7/2003 | Van Dussen |
| 6,601,033 B1 | 7/2003 | Sowinski |
| 6,611,811 B1 | 8/2003 | Deaton |
| 6,637,648 B1 | 10/2003 | Gilgen et al. |
| 6,732,081 B2 | 5/2004 | Nicholson |
| 6,741,968 B2 | 5/2004 | Jacoves et al. |
| 6,741,969 B1 | 5/2004 | Chen et al. |
| 6,754,636 B1 | 6/2004 | Walker |
| 6,778,967 B1 | 8/2004 | Nicholson |
| 6,862,580 B1 | 3/2005 | Ford |
| 6,862,612 B1 | 3/2005 | Horn |
| 6,885,996 B2 | 4/2005 | Nicholson |
| 6,950,806 B2 | 9/2005 | Dines et al. |
| 6,965,872 B1 | 11/2005 | Grdina |
| 6,980,960 B2 | 12/2005 | Hajdukiewicz et al. |
| 7,054,837 B2 | 5/2006 | Hoffman et al. |
| 7,080,026 B2 | 7/2006 | Singh et al. |
| 7,080,034 B1 | 7/2006 | Reams |
| 7,092,929 B1 | 8/2006 | Dvorak et al. |
| 7,162,444 B1 | 1/2007 | Machado, Jr. et al. |
| 7,188,076 B2 | 3/2007 | Bensemana |
| 7,337,122 B2 | 2/2008 | Eydeland et al. |
| 7,343,341 B2 | 3/2008 | Sandor et al. |
| 7,346,520 B2 | 3/2008 | Etzioni et al. |
| 7,373,320 B1 | 5/2008 | McDonough |
| 7,376,580 B1 | 5/2008 | Walker et al. |
| 7,376,603 B1 | 5/2008 | Mayr et al. |
| 7,379,890 B2 | 5/2008 | Myr et al. |
| 7,383,204 B2 | 6/2008 | McCall et al. |
| 7,437,323 B1 | 10/2008 | Valkov et al. |
| 7,617,111 B1 | 11/2009 | Sheppard et al. |
| 7,650,109 B2 | 1/2010 | Shimakawa et al. |
| 7,747,500 B2 | 6/2010 | Hwang et al. |
| 7,945,500 B2 | 5/2011 | Fell et al. |
| 7,945,501 B2 | 5/2011 | Fell et al. |
| 8,019,694 B2 | 9/2011 | Fell et al. |
| 8,065,218 B2 | 11/2011 | Fell et al. |
| 8,086,517 B2 | 12/2011 | Fell et al. |
| 2001/0039512 A1 | 11/2001 | Nicholson |
| 2001/0042036 A1 | 11/2001 | Sanders |
| 2001/0049626 A1 | 12/2001 | Nicholson |
| 2001/0049651 A1 | 12/2001 | Selleck |
| 2001/0049668 A1 | 12/2001 | Wright |
| 2002/0013758 A1 | 1/2002 | Khaitan |
| 2002/0026403 A1 | 2/2002 | Tambay et al. |
| 2002/0029171 A1 | 3/2002 | Senior |
| 2002/0035549 A1 | 3/2002 | Hagio et al. |
| 2002/0038279 A1 | 3/2002 | Samuelson et al. |
| 2002/0040321 A1 | 4/2002 | Nicholson |
| 2002/0069155 A1 | 6/2002 | Nafeh et al. |
| 2002/0073007 A1 | 6/2002 | Ayache |
| 2002/0107642 A1 | 8/2002 | Nishida et al. |
| 2002/0120555 A1 | 8/2002 | Lerner |
| 2002/0138392 A1 | 9/2002 | LeBlanc |
| 2002/0143616 A1* | 10/2002 | Hajdukiewicz et al. ........ 705/14 |
| 2002/0143693 A1 | 10/2002 | Soestbergen et al. |
| 2002/0161645 A1 | 10/2002 | Walker et al. |
| 2002/0165809 A1* | 11/2002 | Gendelman ..................... 705/36 |
| 2002/0194094 A1 | 12/2002 | Lancaster et al. |
| 2003/0014287 A1 | 1/2003 | Williams et al. |
| 2003/0018573 A1 | 1/2003 | Comas et al. |
| 2003/0033154 A1* | 2/2003 | Hajdukiewicz et al. .......... 705/1 |
| 2003/0050807 A1 | 3/2003 | Hoffman et al. |
| 2003/0074267 A1 | 4/2003 | Acharya et al. |
| 2003/0078787 A1 | 4/2003 | Hoffman et al. |
| 2003/0088435 A1 | 5/2003 | King |
| 2003/0088466 A1 | 5/2003 | Fitzpatrick |
| 2003/0101123 A1 | 5/2003 | Alvarado et al. |
| 2003/0101125 A1 | 5/2003 | McGill et al. |
| 2003/0158773 A1 | 8/2003 | Brunner |
| 2003/0195822 A1 | 10/2003 | Tatge et al. |
| 2003/0197060 A1 | 10/2003 | Coyner |
| 2003/0208430 A1 | 11/2003 | Gershon |
| 2003/0208437 A1 | 11/2003 | Samuelson |
| 2003/0229571 A1 | 12/2003 | May |
| 2003/0236738 A1 | 12/2003 | Lange et al. |
| 2004/0015454 A1 | 1/2004 | Raines et al. |
| 2004/0024692 A1 | 2/2004 | Turbeville et al. |
| 2004/0034584 A1 | 2/2004 | Cory, Sr. et al. |
| 2004/0039684 A1 | 2/2004 | Sandor |
| 2004/0088179 A1 | 5/2004 | Cogen et al. |
| 2004/0093298 A1 | 5/2004 | McClure, III et al. |
| 2004/0103003 A1 | 5/2004 | Mayers et al. |
| 2004/0111358 A1 | 6/2004 | Lange et al. |
| 2004/0117291 A1 | 6/2004 | O'Callahan |
| 2004/0122732 A1 | 6/2004 | Comer |
| 2004/0122764 A1 | 6/2004 | Bilski et al. |
| 2004/0128263 A1* | 7/2004 | Dosanjh ........................ 705/400 |
| 2004/0148236 A1 | 7/2004 | Steidlmayer |
| 2004/0148249 A1 | 7/2004 | Kinnear |
| 2004/0158493 A1 | 8/2004 | Nicholson |
| 2004/0177019 A1 | 9/2004 | Slavov et al. |
| 2004/0210478 A1 | 10/2004 | Pettigrew et al. |
| 2004/0215529 A1 | 10/2004 | Foster et al. |
| 2004/0230493 A1 | 11/2004 | Tatge et al. |
| 2004/0230520 A1 | 11/2004 | Reding et al. |
| 2004/0260613 A1 | 12/2004 | Mills |
| 2004/0260632 A1 | 12/2004 | Wanasek |
| 2005/0027650 A1 | 2/2005 | Walker |
| 2005/0044001 A1* | 2/2005 | Narayanaswami ............. 705/26 |
| 2005/0091139 A1 | 4/2005 | Kumar et al. |
| 2005/0097025 A1 | 5/2005 | Horton et al. |
| 2005/0114252 A1* | 5/2005 | Beurskens ...................... 705/37 |
| 2005/0144100 A1 | 6/2005 | Shapiro et al. |
| 2005/0149402 A1* | 7/2005 | Nicholson ...................... 705/14 |
| 2005/0154669 A1 | 7/2005 | Streetman |
| 2005/0159974 A1 | 7/2005 | Moss et al. |
| 2005/0160006 A1 | 7/2005 | Pate |
| 2005/0160014 A1 | 7/2005 | Moss et al. |
| 2005/0182660 A1 | 8/2005 | Henley |
| 2005/0192711 A1 | 9/2005 | Raines et al. |
| 2005/0209917 A1* | 9/2005 | Anderson et al. ............... 705/14 |
| 2005/0209921 A1* | 9/2005 | Roberts et al. .................. 705/14 |
| 2005/0216384 A1 | 9/2005 | Partlow et al. |
| 2005/0228747 A1 | 10/2005 | Gumport |
| 2005/0240492 A1 | 10/2005 | Grdina |
| 2005/0261916 A1* | 11/2005 | McCall et al. ..................... 705/1 |
| 2005/0289021 A1 | 12/2005 | Lagergren |
| 2006/0015424 A1 | 1/2006 | Esposito et al. |
| 2006/0026095 A1 | 2/2006 | Alvarado et al. |
| 2006/0031123 A1 | 2/2006 | Leggett et al. |
| 2006/0036530 A1* | 2/2006 | Shkedy ........................... 705/37 |
| 2006/0080196 A1 | 4/2006 | Griffin et al. |
| 2006/0080265 A1 | 4/2006 | Hinds et al. |
| 2006/0085252 A1* | 4/2006 | Kersenbrock .................. 705/14 |
| 2006/0095362 A1* | 5/2006 | Hwang et al. .................. 705/37 |
| 2006/0155423 A1 | 7/2006 | Budike |
| 2006/0184445 A1 | 8/2006 | Sandor et al. |
| 2006/0190383 A1 | 8/2006 | May |
| 2006/0190386 A1 | 8/2006 | Levy |
| 2006/0212384 A1 | 9/2006 | Spurgin et al. |
| 2006/0212393 A1 | 9/2006 | Brown |

| | | | | | | | |
|---|---|---|---|---|---|---|---|
| 2006/0218056 | A1 | 9/2006 | Dickman | WO | WO0211018 | A1 | 2/2002 |
| 2006/0241951 | A1 | 10/2006 | Cynamom et al. | WO | WO0212113 | A1 | 2/2002 |
| 2006/0293947 | A1 | 12/2006 | Nicholson | WO | WO0213091 | A1 | 2/2002 |
| 2006/0293952 | A1 | 12/2006 | Nicholson | WO | WO0217193 | A1 | 2/2002 |
| 2006/0293953 | A1 | 12/2006 | Nicholson | WO | WO0233621 | A1 | 4/2002 |
| 2006/0293980 | A1 | 12/2006 | Corby et al. | WO | WO0233635 | A1 | 4/2002 |
| 2007/0016502 | A1 | 1/2007 | Williamson et al. | WO | WO0233636 | A1 | 4/2002 |
| 2007/0032941 | A1 | 2/2007 | Allen | WO | WO0233637 | A1 | 4/2002 |
| 2007/0038553 | A1* | 2/2007 | Miller et al. ............ 705/37 | WO | WO0241120 | A2 | 5/2002 |
| 2007/0061174 | A1 | 3/2007 | Phillips | WO | WO0244847 | A2 | 6/2002 |
| 2007/0061220 | A1 | 3/2007 | Vaid | WO | WO02061663 | A2 | 8/2002 |
| 2007/0095890 | A1 | 5/2007 | Elefant | WO | WO02069109 | A2 | 9/2002 |
| 2007/0106559 | A1 | 5/2007 | Harrell | WO | WO02069110 | A2 | 9/2002 |
| 2007/0195486 | A1 | 8/2007 | Paul et al. | WO | WO02075485 | A2 | 9/2002 |
| 2007/0198385 | A1 | 8/2007 | McGill et al. | WO | WO02075488 | A2 | 9/2002 |
| 2007/0203793 | A1 | 8/2007 | Hajdukiewicz et al. | WO | WO02079923 | A2 | 10/2002 |
| 2007/0203794 | A1 | 8/2007 | Hajdukiewicz et al. | WO | WO02079940 | A2 | 10/2002 |
| 2007/0233616 | A1 | 10/2007 | Richards et al. | WO | WO02080041 | A2 | 10/2002 |
| 2007/0255457 | A1 | 11/2007 | Whitcomb et al. | WO | WO02028888 | A2 | 11/2002 |
| 2007/0267479 | A1 | 11/2007 | Nix et al. | WO | WO02088906 | A2 | 11/2002 |
| 2007/0267482 | A1 | 11/2007 | Ruckart et al. | WO | WO02093302 | A2 | 11/2002 |
| 2007/0276738 | A1 | 11/2007 | Rajunas, III | WO | WO02093328 | A2 | 11/2002 |
| 2007/0288312 | A1 | 12/2007 | Wang | WO | WO0195225 | A1 | 12/2002 |
| 2007/0294159 | A1 | 12/2007 | Cottleq | WO | WO02098045 | A2 | 12/2002 |
| 2008/0005008 | A1 | 1/2008 | Alvarado et al. | WO | WO02099589 | A2 | 12/2002 |
| 2008/0015964 | A1* | 1/2008 | Shuster ............ 705/36 R | WO | WO02099601 | A2 | 12/2002 |
| 2008/0015976 | A1 | 1/2008 | Sandor et al. | WO | WO02103487 | A2 | 12/2002 |
| 2008/0015981 | A1 | 1/2008 | Danesh | WO | WO02103489 | A2 | 12/2002 |
| 2008/0027737 | A1 | 1/2008 | Watkins | WO | WO03003150 | A2 | 1/2003 |
| 2008/0033833 | A1 | 2/2008 | Senior | WO | WO03012584 | A2 | 2/2003 |
| 2008/0080682 | A1 | 4/2008 | Ogunwale et al. | WO | WO03012585 | A2 | 2/2003 |
| 2008/0097877 | A1 | 4/2008 | Rahal | WO | WO03012586 | A2 | 2/2003 |
| 2008/0097888 | A1 | 4/2008 | Sugihara | WO | WO03012589 | A2 | 2/2003 |
| 2008/0114622 | A1* | 5/2008 | Crean et al. ............ 705/5 | WO | WO03032112 | A2 | 4/2003 |
| 2008/0126208 | A1 | 5/2008 | Nicholson et al. | WO | WO03036432 | A2 | 5/2003 |
| 2008/0133430 | A1 | 6/2008 | Horowitz | WO | WO03036466 | A1 | 5/2003 |
| 2008/0243663 | A1 | 10/2008 | Eveland | WO | WO03038375 | A1 | 5/2003 |
| 2009/0198621 | A1* | 8/2009 | Schneier et al. ............ 705/80 | WO | WO03038547 | A2 | 5/2003 |
| 2010/0042488 | A1 | 2/2010 | McClung, III | WO | WO03038651 | A1 | 5/2003 |
| FOREIGN PATENT DOCUMENTS | | | | WO | WO03038675 | A1 | 5/2003 |
| | | | | WO | WO03038676 | A1 | 5/2003 |
| AU | 2007100932 | A4 | 10/2007 | WO | WO03053124 | A2 | 7/2003 |
| CA | 2070736 | A1 | 12/1992 | WO | WO03062738 | A2 | 7/2003 |
| CA | 2217739 | A1 | 10/1996 | WO | WO03065278 | A1 | 8/2003 |
| CA | 2340966 | A1 | 9/2001 | WO | WO03069433 | A2 | 8/2003 |
| JP | 2217998 | A | 8/1990 | WO | WO03069840 | A1 | 8/2003 |
| JP | 04373069 | A | 12/1992 | WO | WO03077054 | A2 | 9/2003 |
| JP | 10111985 | A | 4/1998 | WO | WO03079214 | A1 | 9/2003 |
| JP | 2002063347 | A | 2/2002 | WO | WO03087708 | A1 | 10/2003 |
| JP | 2002215640 | A | 8/2002 | WO | WO03098516 | A1 | 11/2003 |
| JP | 2003108850 | A | 4/2003 | WO | WO03104938 | A2 | 12/2003 |
| JP | 2003128198 | A | 5/2003 | WO | WO03104944 | A2 | 12/2003 |
| JP | 2003233743 | A | 8/2003 | WO | WO03105054 | A1 | 12/2003 |
| JP | 2004145534 | A1 | 5/2004 | WO | WO2004001537 | A2 | 12/2003 |
| JP | 2004252569 | A | 9/2004 | WO | WO2004001538 | A2 | 12/2003 |
| JP | 2004318422 | A | 11/2004 | WO | WO2004001544 | A2 | 12/2003 |
| JP | 2005122766 | A | 5/2005 | WO | WO2004003699 | A2 | 1/2004 |
| JP | 2005135347 | A | 5/2005 | WO | WO2004003811 | A1 | 1/2004 |
| JP | 2006335438 | A | 12/2006 | WO | WO2004010262 | A2 | 1/2004 |
| JP | 2007122592 | A | 5/2007 | WO | WO2004021102 | A2 | 3/2004 |
| JP | 2007249410 | A | 9/2007 | WO | WO2004029781 | A2 | 4/2004 |
| WO | WO9118373 | A1 | 11/1991 | WO | WO2004046989 | A1 | 6/2004 |
| WO | WO9214213 | A1 | 8/1992 | WO | WO2004047082 | A2 | 6/2004 |
| WO | WO9301466 | A1 | 1/1993 | WO | WO2004059547 | A1 | 7/2004 |
| WO | WO9309398 | A1 | 5/1993 | WO | WO2004061596 | A2 | 7/2004 |
| WO | WO9606415 | A1 | 2/1996 | WO | WO2004061785 | A2 | 7/2004 |
| WO | WO9706250 | A1 | 2/1997 | WO | WO2004072778 | A2 | 8/2004 |
| WO | WO9818053 | A1 | 4/1998 | WO | WO2004072803 | A2 | 8/2004 |
| WO | WO9835490 | A1 | 8/1998 | WO | WO2004077256 | A2 | 9/2004 |
| WO | WO0003022 | A2 | 1/2000 | WO | WO2004084028 | A2 | 9/2004 |
| WO | WO0104327 | A1 | 1/2001 | WO | WO2004084046 | A2 | 9/2004 |
| WO | WO0125875 | A2 | 4/2001 | WO | WO2005057458 | A1 | 6/2005 |
| WO | WO0125989 | A1 | 4/2001 | WO | WO2005065131 | A2 | 7/2005 |
| WO | WO0126000 | A1 | 4/2001 | WO | WO2005069871 | A2 | 8/2005 |
| WO | WO0126003 | A1 | 4/2001 | WO | WO2005101996 | A2 | 11/2005 |
| WO | WO0155885 | A2 | 8/2001 | WO | WO2006049779 | A1 | 5/2006 |
| WO | WO0161671 | A | 8/2001 | WO | WO2006055117 | A2 | 5/2006 |
| WO | WO0177961 | A1 | 10/2001 | WO | WO2006083709 | A2 | 8/2006 |
| WO | WO0188743 | A2 | 11/2001 | WO | WO2006110121 | A1 | 10/2006 |

| WO | WO2007002065 A2 | 1/2007 |
| WO | WO2007044430 A2 | 4/2007 |
| WO | WO2007059165 A1 | 5/2007 |
| WO | WO2007079228 A2 | 7/2007 |

OTHER PUBLICATIONS

International Preliminary Report on Patentability for PCT Application No. PCT/US2008/059619, issued Oct. 13, 2009, mailed Oct. 22, 2009, 6 pgs.
International Preliminary Report on Patentability for PCT Application No. PCT/US2008/059609, issued Oct. 13, 2009, mailed Oct. 22, 2009, 6 pgs.
International Preliminary Report on Patentability for PCT Application No. PCT/US2008/059614, issued Oct. 13, 2009, mailed Oct. 22, 2009, 4 pgs.
Final Office Action issued for U.S. Appl. No. 12/030,073 mailed on Nov. 24, 2009, 12 pgs.
Office Action issued for U.S. Appl. No. 11/705,571, mailed on Apr. 23, 2010, 16 pgs.
Office Action issued for U.S. Appl. No. 12/099,237, mailed May 21, 2010, 8 pgs.
Office Action issued for U.S. Appl. No. 12/099,253, mailed May 25, 2010, 9 pgs.
Office Action issued for U.S. Appl. No. 12/099,224, mailed May 26, 2010, 7 pgs.
Office Action issued for U.S. Appl. No. 12/029,961, mailed Jun. 23, 2010, 13 pgs.
Office Action issued for U.S. Appl. No. 12/030,012, mailed Jul. 22, 2010, 12 pgs.
Office Action issued for U.S. Appl. No. 12/099,209, mailed Aug. 3, 2010, 17 pgs.
Office Action issued for U.S. Appl. No. 12/030,032, mailed Sep. 28, 2010, 9 pgs.
Office Action issued for U.S. Appl. No. 12/370,395, mailed Oct. 7, 2010, 11 pgs.
GasLimit "frequent Asked Questions", obtained from http://wwww.gaslimit.com/faq on Jan. 2, 2008), 2 pgs.
GasLimit "Current Gas prices", obtained from http://www.gaslimit.com/current-gas-prices.php on Jan. 2, 2008, 2 pgs.
GasLimit "Terms and Conditions", obtained from http://www.gaslimit.com/terms_and_conditions on Jan. 2, 2008, 4 pgs.
GasLimit "Quote Steps 1-5", obtained from http://gaslimit.com/legacy on Jan. 2, 2008, 5 pgs.
GasLimit "Gas Cap Cancellation Information", obtained from http://www.gaslimit.com/cancel_info on Jan. 2, 2008, 1 pg.
"Price Changes in the Gasoline Market: Are Midwestern Gasoline Prices Downward Sticky?", Energy Information Administration, Wash., DC; DOE/EIA-0626, pp. i-55, Feb. 2009, 52 pgs.
Jacobson, S. "Recongnizing Embedded Risks in Energy", downloaded from http://www.derivativesstrategy.com/magazine/archive/1999/1299co14.asp on Jan. 11, 2008, 4 pgs.
Gordon et al. Modeling Farm-Retail Price Linkage for Eight Agricultural Commodities (Technical Report #1/96), Dept. of Econ, Univ. of Canada & Auckland, Nov. 1996, 65 pgs.
Ervin, S. Commodity Features Modernization Act of 2000: A Practical Look at the Law that Revolutionized derivatives law and Regulation,: Copyright 2001 Dechert, 5 pgs.
Commodity Features Trading Commission, Order, DOCID:fr21mr03-45; Federal Register, Notices, vol. 68, No. 55, Mar. 21, 2003, obtained from <<wais.access.gpo.gov>>, 6 pgs.
"Congress Makes Changes to the Regulation of Futures and Derivatives Transactions" Publications/McDermott Newsletters, McDermott Will and Emery, Jan. 2001, 10 pgs.
Marsh, J., "Regulation of Specialist Commodity Dealers in the United States", Hunton & Williams, London, England, Oct. 19, 2005, obtained from <<www.hunton.com>>, 10 pgs.
Request for Continued Examination, Extension of Time and Amendment as Filed with the USPTO on Oct. 6, 2006 in U.S. Appl. No. 09/853,196, 17 pgs.
Office Action mailed from USPTO on Dec. 13, 2006 in U.S. Appl. No. 09/805,950, 11 pgs.
Office Action mailed from USPTO on Dec. 15, 2006 in U.S. Appl. No. 09/853,196, 11 pgs.
Asplund, M. et al., "Price Adjustments by a Gasoline Retail Chain", Scand. J. of Economics 102(1), 101-121, 2000, 21 pgs.
Fisher A., "Weather futures 'bet' will give Tucson firms a hedge against losses," Arizona Daily Star, Tucson, Arizona, Feb. 5, 1999, 3 pgs.
Fuel Bank; Lock in your price for gasoline, obtained from http:/www.fuelbank.com on May 19, 2008, 1 pg.
Tommelleo, D., "PRICELINE.COM plans to let Customers Set Prices for Gasoline", The Augusta Chronicle, Augusta, Georgia, Feb. 26, 2000, 2 pgs.
Skyline Products: Central Control Fuel Pricing Software, obtained from http:/skylineproducts.com on Feb. 10, 2007, 3 pgs.
Skyline Products Inc. Press release: Skyline Products Partners with Excentus to Offer a Certified Fuel Pricing Integration for High-Volume Retailers, 1 pg.
International Search Report and Written Opinion for PCT Application No. PCT/US2008/053686, completed May 9, 2008, mailed Jun. 5, 2008, 7 pgs.
International Search Report and Written Opinion for PCT Application No. PCT/US2008/053669, completed May 13, 2008, mailed Jun. 5, 2008, 10 pgs.
International Search Report and Written Opinion for PCT Application No. PCT/US2008/053676, completed May 13, 2008, mailed Jun. 5, 2008, 8 pgs.
International Search Report and Written Opinion for PCT Application No. PCT/US2008/053674, completed May 11, 2008, mailed Jun. 5, 2008, 9 pgs.
International Search Report and Written Opinion for PCT Application No. PCT/US2008/053687, completed May 16, 2008, mailed Jun. 5, 2008, 7 pgs.
Chao et al., "Restructured Electricity Markets: A risk management Approach", [Retrieved online from URL:http//www.ieor.berkeley.edu], presented Jul. 1, 2005, 35 pgs.
International Search Report and Written Opinion for PCT Application No. PCT/US2008/053724, completed May 13, 2008, mailed Jun. 5, 2008, 8 pgs.
International Search Report and Written Opinion for PCT Application No. PCT/US2008/053695, completed May 13, 2008, mailed Jun. 5, 2008, 6 pgs.
International Search Report and Written Opinion for PCT Application No. PCT/US2008/059633, completed Jun. 24, 2008, mailed Jul. 8, 2008, 8 pgs.
International Search Report and Written Opinion for PCT Application No. PCT/US2008/059609, completed Jun. 20, 2008, mailed Jul. 1, 2008, 8 pgs.
International Search Report and Written Opinion for PCT Application No. PCT/US2008/053699, completed May 17, 2008, mailed Jun. 27, 2008, 6 pgs.
International Search Report and Written Opinion for PCT Application No. PCT/US2008/059619, completed Aug. 7, 2008, mailed Aug. 15, 2008, 8 pgs.
International Search Report and Written Opinion for PCT Application No. PCT/US2008/059614, completed Aug. 13, 2008, mailed Aug. 25, 2008, 7 pgs.
Office Action issued for U.S. Appl. No. 12/030,073, mailed on May 1, 2009, 11 pgs.
Office Action issued for U.S. Appl. No. 11/705,571, mailed on Aug. 14, 2009, 13 pgs.
International Preliminary Report on Patentability for PCT Application No. PCT/US2008/053669, mailed Aug. 27, 2009, issued Aug. 19, 2009, 9 pgs.
International Preliminary Report on Patentability for PCT Application No. PCT/US2008/053676, mailed Aug. 27, 2009, issued Aug. 19, 2009, 6 pgs.
International Preliminary Report on Patentability for PCT Application No. PCT/US2008/053674, mailed Aug. 27, 2009, issued Aug. 19, 2009, 7 pgs.
International Preliminary Report on Patentability for PCT Application No. PCT/US2008/053686, mailed Aug. 27, 2009, issued Aug. 19, 2009, 6 pgs.

International Preliminary Report on Patentability for PCT Application No. CT/US2008/053687, mailed Aug. 27, 2009, issued Aug. 19, 2009, 6 pgs.
International Preliminary Report on Patentability for PCT Application No. PCT/US2008/053695, mailed Aug. 27, 2009, issued Aug. 19, 2009, 5 pgs.
International Preliminary Report on Patentability for PCT Application No. PCT/US2008/053699, mailed Aug. 27, 2009, issued Aug. 19, 2009, 5 pgs.
International Preliminary Report on Patentability for PCT Application No. PCT/US2008/053724, mailed Aug. 27, 2009, issued Aug. 19, 2009, 6 pgs.
Office Action issued for U.S. Appl. No. 12/099,253 mailed on Oct. 26, 2010, 10 pgs.
Office Action issued for U.S. Appl. No. 12/030,119 mailed on Oct. 27, 2010, 16 pgs.
TechWeb, "Bargain Hunters Topple AAA Gas-Price Finder," Manhasset, May 27, 2005, (1 pg.).
Shanley, Will, "Drivers can Use the Internet to Find Cheap Gasoline," Knight Ridder Tribune Business News, Washington, May 26, 2005, (1 pg.).
Day to Day, "Using the Internet to Search for Cheap Gas," Los Angeles, Apr. 27, 2006, (1 pg.).
Maunsell, Nevill Boyd, "City View: Savers and Borrowers Hang on to Shares," Birmingham Post, Post Edition, Birmingham (UK), Nov. 30, 2000, (1 pg.).
Office Action issued for U.S. Appl. No. 12/099,237, mailed on Nov. 10, 2010, 7 pgs.
Office Action issued for U.S. Appl. No. 12/030,086, mailed on Dec. 21, 2010, 13 pgs.
Liu, Lon-Mu, "Dynamic Relationship Analysis of US Gasoline and Crude Oil Prices," Journal of Forecasting, Sep. 1991, p. 521-547. (27 pgs.).
John M. Barron, Beck A. Taylor and John R. Umbeck, "Will Open Supply Lower Retail Gasoline Prices?" Contemporary Economic Policy, Jan. 2004, pp. 63-77. (15 pgs.).
Franklin R. Edwards and Michael S. Carter, "The Collapse of Metallgesellschaft: Unhedgeable Risks, Poor Hedging Strategy, or Just Bad Luck?" The Journal of Futures Markets, May 1995, p. 211. (54 pgs.).
Office Action issued for U.S. Appl. No. 12/029,961, mailed on Nov. 17, 2010, 15 pgs.
Office Action issued for U.S. Appl. No. 12/030,041, mailed on Nov. 16, 2010, 14 pgs.
Office Action issued for U.S. Appl. No. 12/099,209, mailed on Jan. 20, 2011, 19 pgs.
Office Action issued for U.S. Appl. No. 12/099,224, mailed on Nov. 12, 2010, 8 pgs.
Office Action issued for U.S. Appl. No. 11/705,571, mailed on Jan. 26, 2011, 20 pgs.
Roger G. Clarke, "Options and Futures: A Tutorial," The Research Foundation of the Institute of Chartered Financial Analysis, Dec. 1992/Rev. Aug. 1996, 46 pgs.
Phil Shook, "Futures Trading: The Fine Art of Managing Risk, or Shooting," NPN, National Petroleum News, Chicago: Feb. 1992, vol. 84, Issue 2, p. 37, 7 pgs.
Notice of Allowance issued for U.S. Appl. No. 12/099,224, mailed on Mar. 1, 2011, 5 pgs.
Notice of Allowance issued for U.S. Appl. No. 12/099,237, mailed on Mar. 3, 2011, 5 pgs.
"Locked-in rates for heating oil burn consumers," David Dishneau Associated Press, Journal—Gazette, Ft. Wayne, Ind. Oct. 11, 2006, 3 pgs.
"Fuel hardy as gas and oil prices rise, shoppers can place a premium on the pennies they save by using their heads at the pump," Kristen Andresen, Bangor Daily News, Bangor, ME, Oct. 1, 2005, 3 pgs.
Office Action for U.S. Appl. No. 12/030,041, mailed on Apr. 12, 2011, 19 pgs.
Office Action for U.S. Appl. No. 12/370,395, mailed on Apr. 13, 2011, 12 pgs.
Office Action issued for U.S. Appl. No. 12/029,961, mailed May 12, 2011, 14 pgs.
Office Action issued for U.S. Appl. No. 12/030,032, mailed May 23, 2011, 10 pgs.
Office Action issued for U.S. Appl. No. 13/076,567, mailed May 24, 2011, 6 pgs.
Office Action issued for U.S. Appl. No. 13/076,741, mailed May 24, 2011, 6 pgs.
Final Office Action issued for U.S. Appl. No. 12/030,119 mailed on Jul. 8, 2011, 5 pgs.
Final Office Action issued for U.S. Appl. No. 11/705,571 mailed on Jul. 13, 2011, 11 pgs.
Notice of Allowance issued for U.S. Appl. No. 12/030,086, mailed Jul. 26, 2011, 14 pgs.
Office Action issued for U.S. Appl. No. 12/099,253, mailed Aug. 29, 2011, 12 pgs.
Office Action issued for U.S. Appl. No. 13/210,602, mailed Oct. 11, 2011, 7 pgs.
Final Office Action issued for U.S. Appl. No. 12/029,961, mailed Nov. 21, 2011, 22 pgs.
Notice of Allowance issued for U.S. Appl. No. 11/705,571, mailed Dec. 22, 2011, 8 pages.
Office Action issued for U.S. Appl. No. 12/370,395, mailed Dec. 30, 2011, 10 pages.
Final Office Action issued for U.S. Appl. No. 12/099,253, mailed Jan. 9, 2012, 22 pages.

* cited by examiner

Welcome, Sarah

Logout | Contact Us

| Date | Location | Gallons | Pump Price | Pricelock Price | You Paid | You Saved |
|---|---|---|---|---|---|---|
| 9/12/08 | Shell 125 Langford Pky Lampass TX | 13.00 | $3.13 | $2.99 | $38.87 | $1.82 |
| 9/18/08 | Shell 125 Langford Pky Lampass TX | 26.54 | $3.28 | $2.99 | $79.35 | $7.70 |
| Your Total | | 36.54 | | | | $9.52! |

THE NEW CHRYSLER
6192 2954 9982 0275
JOHN R SMITH

SPECIAL OFFERS

CHRYSLER AUTO SHOW
Concept Vehicles, Auto Show Highlights and More >

About Us | Terms and Conditions | Contact Us

*FIG. 8B*

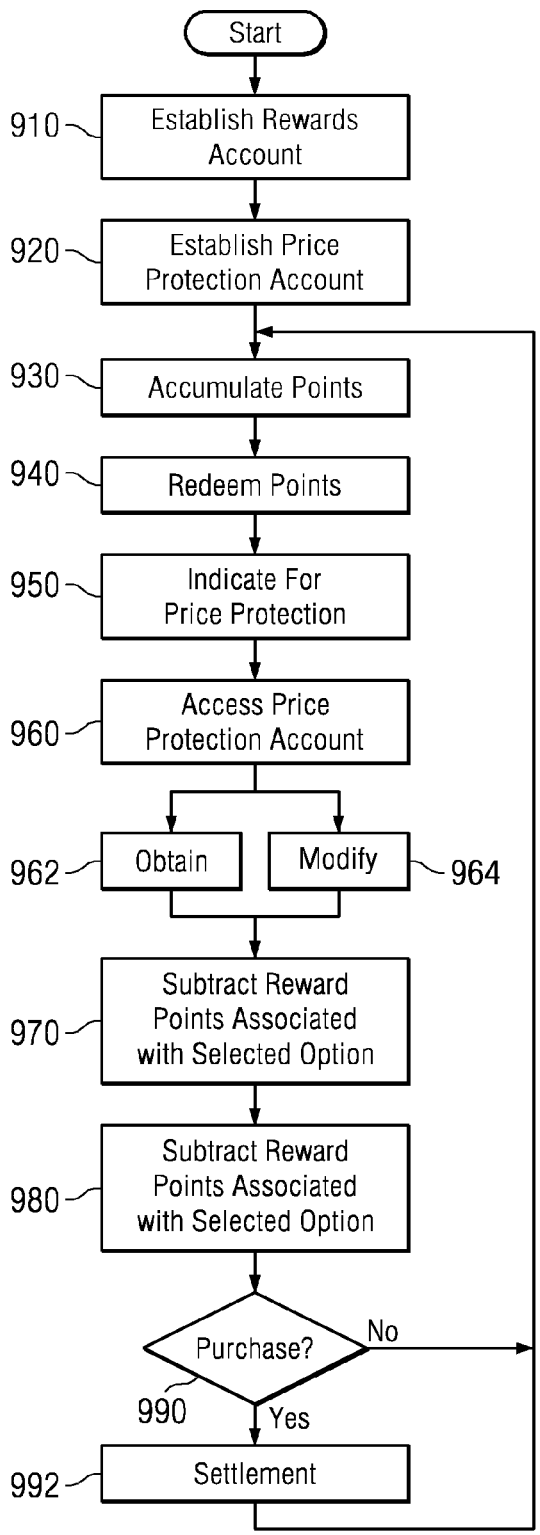
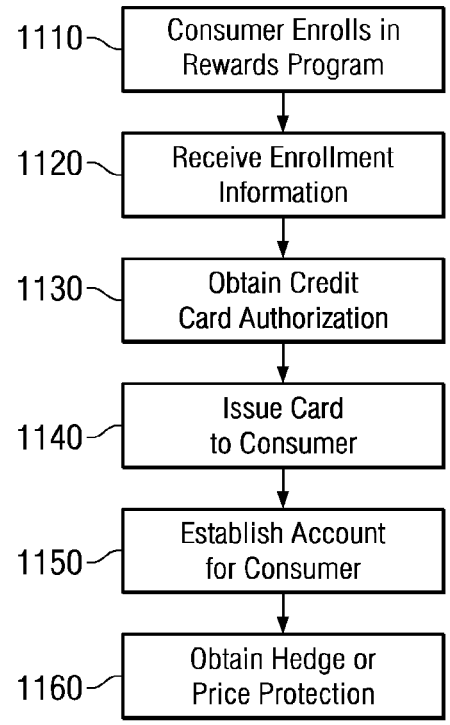
FIG. 9
FIG. 11B

FIG. 20C

| Employee Id | First Name | Last Name | Login Name | Login | Location | Enroll Date | Hire Date | User Status | Card Status |
|---|---|---|---|---|---|---|---|---|---|
| 120566 | Racheal | Smith | RSmith | login as user | ELKINS | 01/12/2008 | 12/10/2008 | ACTIVE | ACTIVE |
| 058941 | Carol | Smith | CSmith | login as user | ELKINS | 01/11/2008 | 06/12/1990 | ACTIVE | ACTIVE |
| 111695 | Zachary | Smith | ZSmith | login as user | ELKINS | 01/11/2008 | 09/06/2008 | ACTIVE | ACTIVE |
| 116516 | Sarah | Smith | SSmith | login as user | ELKINS | 01/11/2008 | 07/01/2008 | ACTIVE | ACTIVE |
| 101899 | Aaron | Smith | ASmith | login as user | ELKINS | 01/11/2008 | 02/07/2007 | ACTIVE | ACTIVE |
| 119132 | Natasha | Smith | NSmith | login as user | ELKINS | 01/11/2008 | 02/09/2008 | ACTIVE | ACTIVE |
| 106864 | Joshua | Smith | JSmith | login as user | ELKINS | 01/11/2008 | 12/09/2008 | ACTIVE | ACTIVE |
| 118637 | Melanie | Smith | MSmith | login as user | FAIRMONT | 01/11/2008 | 04/08/2008 | ACTIVE | ACTIVE |

FIG. 20E

Aegis Admin

Search User
- My Account
- Business Reports
- Admin Reports
- Admin Operations
- System Maintenance Logout Edit User

Personal Details

First Name *: Sarah
Middle Name: LeAnn
Last Name *: Smith
Employee Id: 116548
Location: ELKINS
Plan: BETA_PLAN
Hire Date: 02/07/2006
End Date: ☐ Clear End Date
Referred by:

Account Details

Login Name *: SSmith
Password *: •••••

Address

Street Line 1 *: 202 Ellis Ave

Welcome, sclark

Hire Date: 02/07/2006

End Date: [ ] Clear End Date

Referred by:

Account Details

Login Name *: SSmith

Password *: ••••

Address

Street Line 1 *: 202 Ellis Ave

Street Line 2:

City *: Elkins

State *: WV

Zip Code *: 26241

Card Details

Card Number: 100680

Account Code: 66973-5752

Voyager Action: N/A

[Submit]

*FIG. 20F*

METHOD AND SYSTEM FOR PROVIDING PRICE PROTECTION RELATED TO THE PURCHASE OF A COMMODITY

RELATED INFORMATION

This application claims a benefit of priority to the filing date of U.S. Provisional Patent Application Ser. No. 61/028,125 by inventors Thomas D. Gros and Gary A. Magnuson, entitled "METHOD AND SYSTEM FOR PROVIDING PRICE PROTECTION IN CONJUNCTION WITH THE PURCHASE OF GOODS" filed on Feb. 12, 2008; U.S. Provisional Patent Application Ser. No. 61/057,250 by inventors Thomas D. Gros and Gary A. Magnuson, entitled "METHOD AND SYSTEM FOR PROVIDING PRICE PROTECTION IN CONJUNCTION WITH THE PURCHASE OF GOODS" filed on May 30, 2008; U.S. Provisional Patent Application Ser. No. 61/056,732 by inventors Robert M. Fell and Gary A. Magnuson, entitled "METHOD AND SYSTEM FOR PROVIDING PRICE PROTECTION IN CONJUNCTION WITH A REWARDS OR INCENTIVE PROGRAM" filed on May 28, 2008; U.S. Provisional Patent Application Ser. No. 61/056,775 by inventors Robert M. Fell and Gary A. Magnuson, entitled "METHOD AND SYSTEM FOR PROVIDING PRICE PROTECTION IN CONJUNCTION WITH A RENTAL OR LEASING PROGRAM" filed on May 28, 2008; and U.S. Provisional Patent Application Ser. No. 61/056,767 by inventors Robert M. Fell and Gary A. Magnuson, entitled "METHOD AND SYSTEM FOR PROVIDING PRICE PROTECTION TO EMPLOYEES" filed on May 28, 2008, the entire contents of which are hereby expressly incorporated by reference for all purposes.

TECHNICAL FIELD

This invention relates generally to systems and methods for commodity purchasing, and in particular to systems and methods for providing protection against variability in the market for a commodity. Even more particularly, embodiments of the present invention relate to systems and methods for providing protection against adverse fluctuations in the retail price of a commodity in conjunction with providing an incentive to a consumer in conjunction with employment of the consumer or the purchase, lease or other use of goods or services by the consumer. Specifically, embodiments of the present invention relate to systems and methods for allowing an employer to provide protection against adverse fluctuation in the retail price of a commodity to an employer as a benefit.

BACKGROUND

Commodities that consumers purchase fluctuate in price on a regular basis. The periodicity of these fluctuations depends heavily on a variety of factors, including supply and demand, or variables associated with the supply and demand. The severity of the effects of these price spikes on a given individual or entity is usually tied directly to the amount of the product consumed. Consequently, many individual consumers and businesses desire to financially protect themselves from potential increases in the price of a commodity to not only lower costs for themselves, but additionally to create greater budget certainty or predictability.

SUMMARY

Systems and methods described herein pertain to providing price protection programs related to the purchase of a commodity to a consumer. Embodiments of such a program may provide price protection related to the purchase of a commodity to the consumer so that when a consumer purchases the commodity, the price the consumer pays for the commodity may be determined under the provided program. Embodiments of these programs may be quite useful in incentivizing consumers in certain ways, including to purchase or utilize goods or services or to seek or obtain employment from a particular employer. Similarly, embodiments of these programs may also be useful in retaining current employees, allowing businesses to lower costs associated with employee turnover.

As can be seen, such programs may be quite useful to incentivize consumers in certain ways, including to purchase or utilize goods or services or to seek or obtain employment from a particular employer. However, as potential program providers may not have the expertise, infrastructure or desire to implement such programs themselves in certain embodiments, a program provider may utilize the expertise, functionality, infrastructure, relationships, etc. of the operators of a price protection system to implement such program. Thus, information pertinent to the program may be provided to the price protection system and the price protection system may be responsible for implementing such a program where charges to be assessed to the program provider or the consumer may be assessed to the respective parties by the operators price protection system in a variety of ways. In addition to the charges assessed to the program provider for any purchases made by consumers under such a program implemented by the price protection system, the operators of price protection system may charge the program providers a fee which may be for example, a onetime fee, an ongoing fee, a fee assessed per purchase or amount purchased, a fee per consumer enrolled in such a program or structured in some other manner.

Provisioning consumers with this type of program may, however, leave program providers themselves exposed to the risk of adverse fluctuations in the price of fuel. Accordingly, in conjunction with the implementation of such a program the program provider may also obtain price protection. This price protection may for example comprise hedging directly in one or more markets, or may alternatively comprise purchasing a product (for example, from operators of price protection system or a financial institution) whereby paying an insurance cost the program provider obtains the right to be indemnified for any cost of the commodity above a certain price. The provider of such price protection to a program provider (for example, operators of a price protection system) may also obtain price protection, for example through the purchase of such price protection from a financial institution or another provider of such price protection.

In one embodiment, a method is provided for receiving enrollment information corresponding to a employee from an employer computer; issuing a payment method to the employee, establishing an account for the consumer comprising the enrollment information, receiving purchase information corresponding to an employee purchase of a commodity using the payment method from a fleet card computer, determining if the purchase is a qualifying purchase corresponding to the price protection program and determining an employee charge and an employer charge based on a retail price associated with the purchase and a set of terms corresponding to the price protection program or the employee; and sending the employee charge and the employer charge to the employer computer Embodiments may also comprise price protection systems comprising an interface provider computer, configured to provide an interface; an enrollment computer configured to receive enrollment information from the interface provider computer, determine if an employee is eligible for a price protection program offered by an employer using the enrollment information and obtain fleet card information corresponding to a fleet card issued to the employee; an account manager computer configured to establish an account for an employee enrolled in the price protection program including the fleet card information and the enrollment information, access the account for the consumer, modify the account and return information corresponding to the account; and a purchase processing computer configured to receive purchase information corresponding to an employee purchase of a commodity, obtain account information corresponding to the employee, determine if the purchase is a qualifying purchase corresponding to the price protection program and determine an employee charge and an employee charge based on a retail price associated with the purchase and a set of terms corresponding to the price protection program or the employee.

Embodiments of the invention disclosed herein, or portions thereof, can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIGS. 8A and 8B are illustrations of interfaces which may be utilized by a price protection system.

FIG. 9 is a flow diagram illustrating one embodiment of a method for the provisioning of price protection in conjunction with a reward or incentive program.

FIG. 11B is a flow diagram illustrating one embodiment of a method for enrollment.

FIGS. 20A-20H are illustrations of interfaces which may be utilized by a price protection system.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Figure 1:
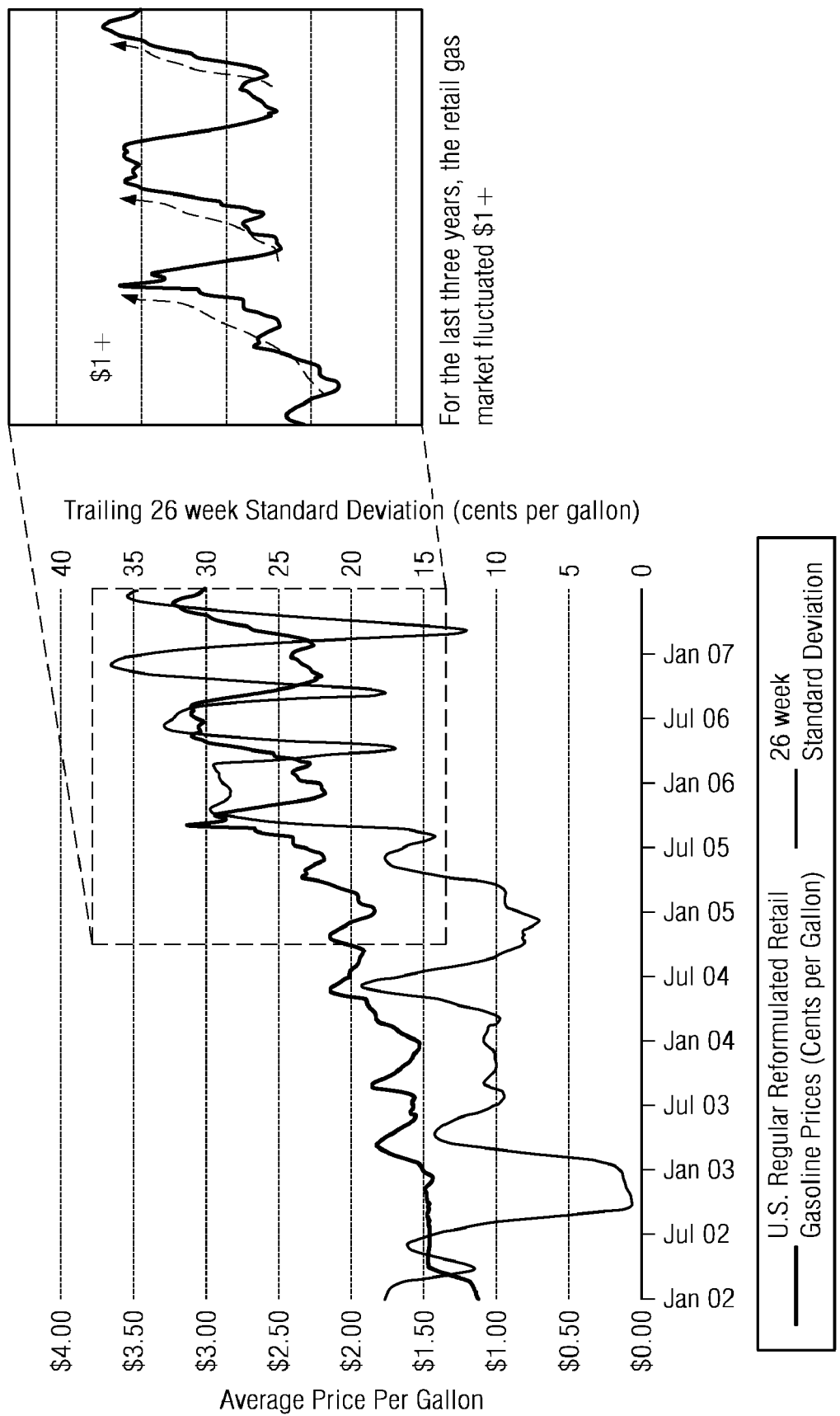
FIG. 1 is a graphical depiction of the fluctuation of fuel prices.

A little bit of context may be helpful to an understanding to the systems and methods presented herein. Almost all of these types of commodities that consumers purchase fluctuate in price on a regular basis. To illustrate, FIG. 1 depicts the fluctuations in the prices of reformulated fuel in the past few years. While fuel is one type of commodity, in general the term "commodity" refers to an article of commerce—an item that can be bought and sold freely on a market. It may be a product which trades on a commodity exchange or spot market and which may fall into one of several categories, including energy, food, grains, and metals. Currently, commodities that can be traded on a commodity exchange include, but are not limited to, crude oil, light crude oil, natural gas, heating oil, gasoline, propane, ethanol, electricity, uranium, lean hogs, pork bellies, live cattle, feeder cattle, wheat, corn, soybeans, oats, rice, cocoa, coffee, cotton, sugar, gold, silver, platinum, copper, lead, zinc, tin, aluminum, titanium, nickel, steel, rubber, wool, polypropylene, and so on. Note that a commodity can refer to tangible things as well as more ephemeral products. Foreign currencies and financial indexes are examples of the latter. For example, positions in the Goldman Sachs Commodity Index (GSCI) and the Reuters Jefferies Consumer Research Board Index (RJCRB Index) can be traded as a commodity. What matters is that something be exchanged for the thing. New York Mercantile Exchange (NYMEX) and Chicago Mercantile Exchange (CME) are examples of a commodity exchange. Other commodities exchanges also exist and are known to those skilled in the art.

In a simplified sense, commodities are goods or products with relative homogeneousness that have value and that are produced in large quantities by many different producers; the goods or products from each different producer are considered equivalent. Commoditization occurs as a goods or products market loses differentiation across its supply base. As such, items that used to carry premium margins for market participants have become commodities, of which crude oil is an example. However, a commodity generally has a definable quality or meets a standard so that all parties trading in the market will know what is being traded. In the case of crude oil, each of the hundreds of grades of fuel oil may be defined. For example, West Texas Intermediate (WTI), North Sea Brent Crude, etc. refer to grades of crude oil that meet selected standards such as sulfur content, specific gravity, etc., so that all parties involved in trading crude oil know the qualities of the crude oil being traded. Motor fuels such as gasoline represent examples of energy-related commodities that may meet standardized definitions. Thus, gasoline with an octane grade of 87 may be a commodity and gasoline with an octane grade of 93 may also be a commodity, and they may demand different prices because the two are not identical—even though they may be related. Those skilled in the art will appreciate that other commodities may have other ways to define a quality. Other energy-related commodities that may have a definable quality or that meet a standard include, but are not limited to, diesel fuel, heating oils, aviation fuel, and emission credits. Diesel fuels may generally be classified according to seven grades based in part on sulfur content, emission credits may be classified based on sulfur or carbon content, etc.

Historically, risk is the reason exchange trading of commodities began. For example, because a farmer does not know what the selling price will be for his crop, he risks the margin between the cost of producing the crop and the price he achieves. In some cases, investors can buy or sell commodities in bulk through futures contracts. The price of a commodity is subject to supply and demand.

A commodity may refer to a retail commodity that can be purchased by a consuming public and not necessarily the wholesale market only. One skilled in the art will recognize that embodiments disclosed herein may provide means and mechanisms through which commodities that currently can only be traded on the wholesale level may be made available to retail level for retail consumption by the public. One way to achieve this is to bring technologies that were once the private reserves of the major trading houses and global energy firms down to the consumer level and provide tools that are applicable and useful to the retail consumer so they can mitigate and/or manage their measurable risks involved in buying/selling their commodities. One example of an energy related retail commodity is motor fuels, which may include various grades of gasoline. For example, motor fuels may include 87 octane grade gasoline, 93 octane grade gasoline, etc as well as various grades of diesel fuels. Other examples of an energy related retail commodity could be jet fuel, heating oils, electricity or emission credits such as carbon offsets. Other retail commodities are possible and/or anticipated.

While a retail commodity and a wholesale commodity may refer to the same underlying good, they are associated with risks that can be measured and handled differently. One reason is that, while wholesale commodities generally involve sales of large quantities, retail commodities may involve much smaller transaction volumes and relate much more closely to how and where a good is consumed. The risks associated with a retail commodity therefore may be affected by local supply and demand and perhaps different factors. Within the context of this disclosure, there is a definable relationship between a retail commodity and the exposure of risks to the consumer. This retail level of the exposure of risks may correlate to the size and the specificity of the transaction in which the retail commodity is traded. Other factors may include the granularity of the geographic market where the transaction takes place, and so on. For example, the demand for heating oil No. 2 in January may be significantly different in the Boston market than in the Miami market.

The periodicity of the fluctuations of the price of a commodity depends heavily on a variety of factors, including supply and demand, or variables associated with the supply and demand. Certain commodities are more volatile than others, however. These commodities are usually in relatively heavy demand or are widely consumed such that any disruption in the supply of the commodity may cause a market spike in the prices of these goods. Products of this type include fuel products such as gasoline or diesel, heating oil, natural gas, crude oil, etc. Disruptions in the supply of these products (or commodities from which these products are produced) such as those caused by worlds events, natural disasters, etc. may cause the price of these commodities to jump markedly in a relatively short amount of time.

The severity of the effects of these price spikes on a given individual or entity is usually tied directly to the amount of the product consumed. Consequently, many individual consumers and businesses desire to financially protect themselves from potential increases in the price of a commodity to not only lower costs for themselves, but additionally to create greater budget certainty or predictability.

This situation has not been lost on manufacturers of goods which consume these various commodities, such as manufacturers of automobiles or the like. These manufacturers may use incentives related to commodity used with their products to drive sales of those products. Additionally, the desire to protect against fluctuations in fuel prices has not been lost on businesses which rent, lease or provide services related to the consumption of particular commodities, such as businesses that lease, rent or offer partial ownership in jets or other types of aircrafts such as helicopters, etc. where the imposition of these fuel surcharges has resulted in a decline in the use of such businesses. Other business impacted by such fluctuations in fuel prices include providers whose business models may depend heavily on the consumption of these commodities as in some cases the business of casinos or amusement parks may depend heavily on drive in customers and thus indirectly on the price of fuel. As a consequence, as the price of fuel grows these types of business may experience a commensurate decline in business.

The fluctuation in price of such commodities may also affect employers. Indeed, as the transitive nature of the composition of communities has increased, in many cases, employees may commute a not insignificant distance to their job. In some cases however, the cost of commuting to a potential employer may force a potential employee to refuse an otherwise desirable job opportunity. Also, a rise in cost may make alternative job options closer to home more attractive.

Some purchasing systems have been introduced in certain industry segments in an effort to address this issue. For example, there are certain schemes which allow consumers (e.g. manufacturers providing the incentive programs) to purchase a good or service and take later delivery, in whole or in part, such as purchasing a quantity of fuel which is physically deposited in a storage tank for future at will consumption. In other words the physical product itself has to be ordered and deposited into a storage facility, which has a limited capacity, a fixed location and issues related to perishability.

These types of systems are cumbersome for a variety of reasons: not only do they require dedicated storage but they also require a certain amount of the commodity to be pre-purchased, without being assured that the commodity will be consumed. In addition, these types of purchase schemes may require the exclusive use of certain types of distribution networks. This limitation is untenable in many cases, for example when a purchaser is being provided with an incentive program related to fuel in conjunction with the purchase of an automobile: the purchaser of the automobile desires to be able to obtain fuel anywhere, or at least at a wide variety of locations.

Thus, there is a need for systems and methods which allow providers of such programs, goods or services, employers, etc. to protect against variability in the price of a commodity by for example, allowing the manufacturer to obtain price protection against adverse fluctuations in the price of a commodity in conjunction with providing an incentive program related to a good or service, allowing a business operator to obtain price protection against adverse fluctuations in the price of a commodity in conjunction with the rental or lease of a good, which allow rewards obtained in association with a reward program implemented by a particular business to be easily utilized in the purchase or obtainment of a commodity, allow an employer to easily provide protections against adverse fluctuations in the price of a commodity to employees or other systems and methods which protect a provider of goods or service.

Reference is now made in detail to the exemplary illustrated in the accompanying drawings. Wherever possible, the same reference numbers will be used throughout the drawings to refer to the same or like parts (elements). The systems and methods of the invention may be particularly useful for providing price protection in conjunction with fuel and thus it is in this context that embodiments of the invention may be described. It will be appreciated, however, that embodiments of the systems and methods of the present invention may be applicable for providing price protection in conjunction with almost any desired commodity.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized.

Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Explanations which may be helpful to an understanding of the systems and methods of the present invention may be found in United States Patent Application Publication No. 2003/0033154 A1 entitled "SYSTEM AND METHOD FOR PROVIDING A FUEL PURCHASE INCENTIVE WITH THE SALE OF A VEHICLE" by inventors Richard Stanley Hajduklewicz et al filed on May 11, 2001 and United States Patent Application Publication No. 2002/0029171 A1 entitled "ELECTRONIC QUANTITY PURCHASING SYSTEM" by inventor Rodney Senior filed Mar. 15, 2001; U.S. patent application Ser. No. 11/705,571 entitled "METHOD AND SYSTEM FOR PROVIDING PRICE PROTECTION FOR COMMODITY PURCHASING THROUGH PRICE PROTECTION CONTRACTS" by inventors Robert M. Fell et al. filed Feb. 12, 2007; U.S. patent application Ser. No. 11/733,178 entitled "FUEL OFFERING AND PURCHASE MANAGEMENT SYSTEM" by inventor Michael Kirch filed Apr. 9, 2007; U.S. patent application Ser. No. 11/733,191 entitled "FUEL OFFERING AND PURCHASE MANAGEMENT SYSTEM" by inventor Michael Kirch filed Apr. 9, 2007; U.S. patent application Ser. No. 11/733,192 entitled "FUEL OFFERING AND PURCHASE MANAGEMENT SYSTEM" by inventor Michael Kirch filed Apr. 9, 2007; U.S. patent application Ser. No. 11/733,199 entitled "FUEL OFFERING AND PURCHASE MANAGEMENT SYSTEM" by inventor Michael Kirch filed Apr. 9, 2007; U.S. patent application Ser. No. 11/733,198 entitled "FUEL OFFERING AND PURCHASE MANAGEMENT SYSTEM" by inventor Michael Kirch filed Apr. 9, 2007; U.S. patent application Ser. No. 11/733,197 entitled "FUEL OFFERING AND PURCHASE MANAGEMENT SYSTEM" by inventor Michael Kirch filed Apr. 9, 2007; U.S. patent application Ser. No. 11/733,200 entitled "FUEL OFFERING AND PURCHASE MANAGEMENT SYSTEM" by inventor Michael Kirch filed Apr. 9, 2007; U.S. patent application Ser. No. 09/853,196 entitled "SYSTEM AND METHOD FOR PROVIDING A FUEL PURCHASE INCENTIVE WITH THE SALE OF A VEHICLE" by inventors Richard Stanley Hajdukiewicz, et al. filed May 11, 2001; U.S. patent application Ser. No. 11/733,118 entitled "SYSTEM AND METHOD FOR PROVIDING A FUEL PURCHASE INCENTIVE WITH THE SALE OF A VEHICLE" by inventors Richard Stanley Hajdukiewicz, et al. filed Apr. 9, 2007; U.S. patent application Ser. No. 11/733,125 entitled "SYSTEM AND METHOD FOR PROVIDING A FUEL PURCHASE INCENTIVE WITH THE SALE OF A VEHICLE" by inventors Richard Stanley Hajdukiewicz, et al. filed Apr. 9, 2007; which are fully incorporated herein by reference for all purposes.

Figure 2:
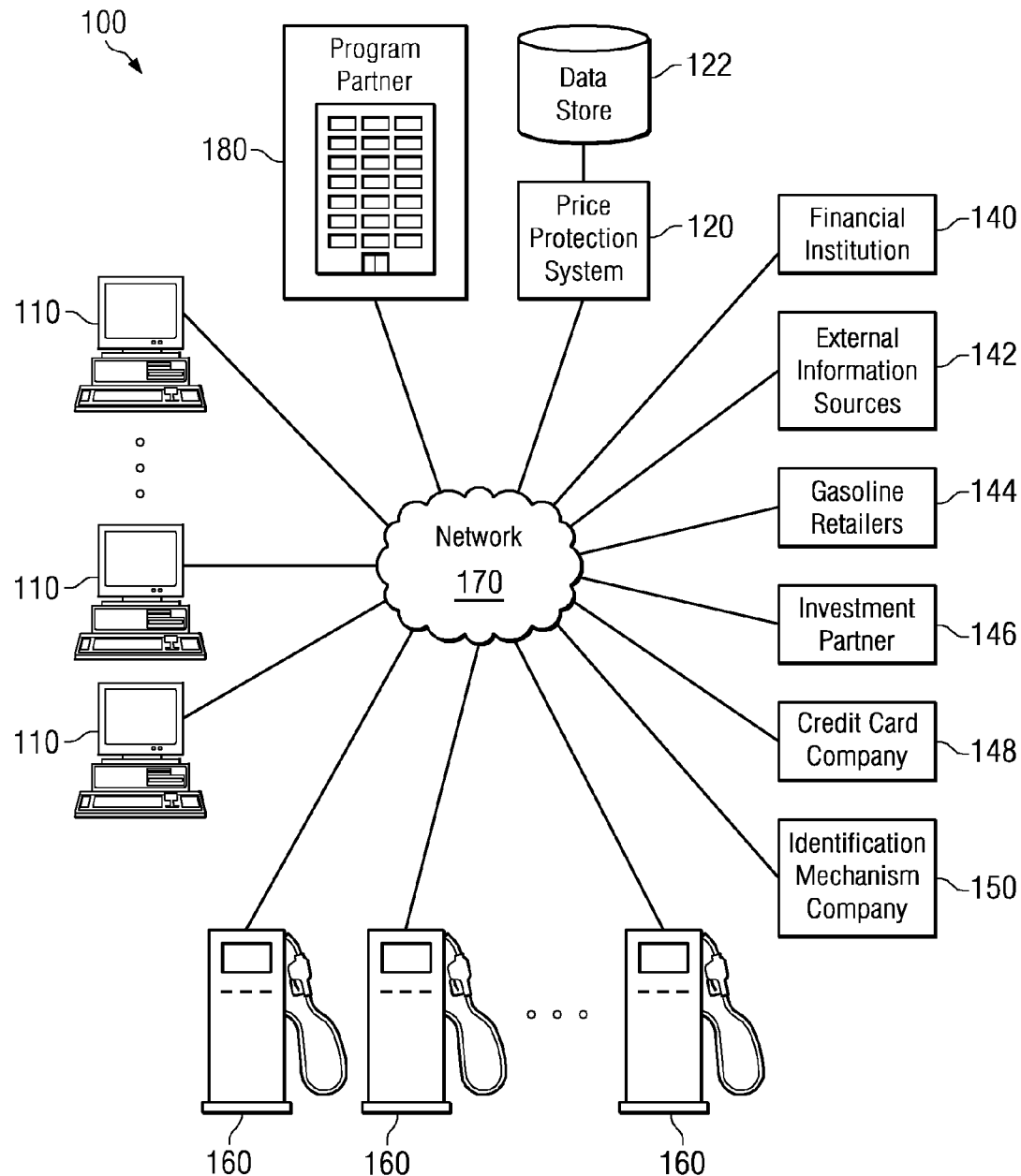
FIG. 2 is a block diagram illustrating one embodiment of a topology which may be used to implement embodiments of the present invention.

Embodiments of the systems and methods of the present invention may be better explained with reference to FIG. 2, which depicts one embodiment of a topology which may be used to implement embodiments of the systems and methods of the present invention. Topology 100 comprises price protection system computer 120 which is coupled through network 170 to computing devices 110 (e.g. computer systems, personal data assistants, kiosks, dedicated terminals, etc), financial institution (including, for example, financial institution computer) 140, external information sources (including, for example, one or more external information source computers) 142, one or more gasoline retailers (including, for example, an gasoline retailer computer) 144, one or more investment partners (including, for example, an investment partner computer) 146, one or more credit card companies (including, for example, a credit card company computer) 148, one or more program partners (including, for example, a program partner computer) 180, identification mechanism company 150 and one or more associated retail point of sale locations 160 including, for example, an identification mechanism computer and one or more associated retail point of sale location computers). Network 170 may be for example, the Internet or a wide area network (WAN), or any other type of conventional or non-electronic communication link such as mail, courier services or the like.

A program partner 180 may be one or more entities which provides to consumers, or wishes to obtain, price protection. As discussed above the provisioning of this price protection may occur in a variety of contexts. For example, program partner 180 may be a manufacturer of automobiles which desires to implement an incentive program whereby purchasers of an automobile are provided with price protection for fuel purchases made by the purchaser. For example, such a program may involve free fuel for a certain amount of time (e.g. free fuel for a year) or a free quantity of fuel (e.g. free 500 gallons), fixed price fuel for a fixed amount of time (e.g. $2.50 a gallon gas for one year), a fixed discount if fuel is below a certain price or fixed price fuel if the price is above the certain price, or some other program related to the consumer's purchase of fuel whereby the consumer is alleviated of some of the burden or risk associated with the purchase of fuel.

Program partner 180 may also, for example, be a provider of an incentive or rewards program to a consumer, where the consumer may accumulate such rewards through a variety of activities and the exercise of such rewards may be provided with price protection by program partner 180. In this context then, program partner 180 may be, for example, an operator of a casino which provides some sort of reward program where points are awarded to a consumer based upon frequenting or utilizing the services of the casino, where these points may be redeemed to allow these consumers to purchase fuel more inexpensively, in turn allowing these consumers to visit the casino more often or more inexpensively.

Program partner 180 may also, in one embodiment, be a renter or leaser of goods, such as businesses that lease, rent or offer partial ownership in jets or other types of aircrafts such as helicopters, etc. who might bear the risk of increased fuel prices and desire to obtain price protection to protect themselves from potential increases in the price of the fuel to allow them to lower the costs of their fees or to create greater predictability in their cost structure.

In another embodiment, program partner 180 may also, be an employer who provides a benefits program related to the purchase of fuel to its employees, where the benefit may be provided as an incentive for potential employees to obtain or accept employment with the employer, as a reward for good service, or for any other reason determined by employer. These fuel programs may provide, for example, a discount off of the retail price of purchased fuel, free fuel (for example, up to some quantity) for a certain time period, fixed price fuel (for example, up to a certain quantity), a fixed discount if the price of fuel is below a certain price or fixed price fuel if the retail price is above a certain price, etc., where the fuel program is effective for a certain time period (for example, a year, for the term of employment, etc.).

It should be noted that program partner 180 may, in conjunction with the implementation of a program provide price protection to consumers, obtain price protection from operators of price protection system 120 or some other source, hedge or both. It should also be noted that in some instances program provider 180 may implement a program for a consumer utilizing price protection system 120 without obtaining price protection from operators of price protection system. In other words, in one embodiment, program provider 180 may utilize the expertise of the operators of price protection system 120, the functionality of price protection system 120, the relationships operators of price protection system 120 may have with other entities (for example, credit card company 148, financial institution 140, identification mechanism company 150, etc.), etc. to implement at least a portion of the program offered by program partner 180 irrespective of whether program partner 180 obtains price protection from operators of price protection system 120.

Price protection system 120 along with each of the other computers may be one or more computer systems with a central processing unit executing a software application (for example, computer executable instructions embodied on a computer readable medium) that performs at least some of the functionality associated with embodiments of the present invention. Furthermore, price protection system 120 may include data store 122 operable to store received data, data determined during operation or any other type of data associated with embodiments of the present invention or determined during the implementation of those embodiments.

Price protection system 120 may provide a wide degree of functionality including presenting an interface for interaction with price protection system 120 such as a set of web pages to users of devices 110, receiving and responding to queries from users at computing devices 110, interfacing with financial institution 140 to provide data gathered, or determined, by price protection system 120 to the financial institution 140 or receive data from financial institution 140, interfacing with associated retail point of sale locations 160 to obtain purchase or other point of sale data, interfacing with external information sources 142 to obtain desired data, interfacing with credit card company 148 or identification mechanism company 150 to obtain or send information (for example, to reconcile charges), etc.

Credit card company 148 may be one or more companies which provides credit cards (for example, credit cards, debit cards or other payment mechanisms) and processes transactions which occur with respect to these cards as are known in the art. An investment partner 146 may be a financial institution with which operators of price protection system have an account, such that funds may be deposited in the account and interest earned on these funds. These accounts may include trust accounts where funds from users of price protection system 120 may be held in trust.

Financial institution 140 may be a large financial institution which may be capable of assuming a large degree of risk, providing insurance against retail price fluctuations, analyzing forward markets, creating price protection contracts or providing any other of a number of desired activities (as will be discussed in more detail below). Such financial institutions may provide daily prices corresponding to a commodity or price protection available for a commodity to price protection system 120. Thus, in some embodiments financial institution 140 may be a relatively large or well capitalized financial institution such as Goldman Sachs or Morgan Stanley. External information sources 142 may comprise any number of various source, online or otherwise, which may provide desired data, for example data regarding commodities, markets, locale(s), point of sale locations, etc. To illustrate but one example, the website www.gasbuddy.com may be an external information source which provides information pertaining to spotted fuel prices.

Identification mechanism company 150 may be a company which provides identification or payment mechanisms (for example, fleet cards or the like) to users of price protection system 120 and may assist in processing transactions conducted using these identification mechanisms. One example of such an identification mechanism company and an associated identification mechanism is a Voyager Fleet Cart provided by Voyager Fleet System Inc.

Retail point of sale locations 160 may be locations where a commodity is sold at retail to a consumer. In one embodiment, retail point of sale locations 160 may be associated with operators of price protection system 160 such that consumers may be able to purchase the commodity at a retail point of sale location 160 and the benefit of any price protection obtained from provider 180 (for example, utilizing price protection system 120) may be realized.

In addition to being associated with price protection system 120, certain retail point of sale locations 160 may be affiliated with operators of price protection system 120 or provider 180, where this affiliation may comprise an agreement between operators of price protection system 120 or the vehicle manufacturer and the affiliated retail point of sale location 160. For example, the agreement could stipulate that an affiliated retail point of sale 160 will provide a discount on the price of a commodity to operators of price protection system 120 or provider 180, that the retail point of sale location 160 will pay a fee to be affiliated with price protection system 120 or provider 180, that other incentives will be provided to purchasers affiliated with operators of price protection scheme or provider 180 (e.g. providing discounts, car washes, free drinks, etc.), etc.

It should be noted here that not all of the various entities depicted in topology 100 are necessary, or even desired, in embodiments of the present invention, and that certain of the functionality described with respect to the entities depicted in topology 100 may be combined into a single entity (e.g. financial institution 140 may perform the functionality associated with investment partner 148) or eliminated altogether. Topology 100 is therefore exemplary only and should in no way be taken as imposing any limitations on embodiments of the present invention.

Generally speaking then, embodiments of the present invention will allow a program provider to provide a program related to the purchase of a commodity to a consumer. Such a program may provide price protection related to the purchase of a commodity to the consumer so that when a consumer purchases the commodity, the price the consumer pays for the commodity may be determined under the provided program. For example, in some embodiment, the provided program may entail terms which dictate that the consumer will pay no more than a program price for the commodity for a period of time. Thus, when a consumer purchases the commodity under the program the consumer may pay the amount of the purchase corresponding to the program price while the program provider may pay the remainder of the cost associated with the purchase. To illustrate, if a consumer is provided with a program associated with the purchase of fuel for the program price of $2.50 per gallon and the consumer purchases 10 gallons of fuel with a retail price of $3.00 the consumer may be responsible for $25.00 of the purchase under the program while the program provider may be responsible for the other $5.00 of the consumer's purchase under the program.

As can be seen, such programs may be quite useful to incentivize consumers in certain ways, including to purchase or utilize goods or services or to seek or obtain employment from a particular employer. However, as potential program providers may not have the expertise, infrastructure or desire to implement such programs themselves in certain embodiments, a program provider may utilize the expertise, functionality, infrastructure, relationships, etc. of the operators of a price protection system to implement such program. Thus, information pertinent to the program may be provided to the price protection system and the price protection system may be responsible for implementing such a program where charges to be assessed to the program provide or the consumer may be assessed to the respective parties by the operators price protection system in a variety of ways. In addition to the charges assessed to the program provider for any purchases made by consumers under such a program implemented by the price protection system, the operators of price protection system may charge the program providers a fee which may be for example, a onetime fee, an ongoing fee, a fee assessed per purchase or amount purchased, a fee per consumer enrolled in such a program or structured in some other manner.

Provisioning consumers with this type of program may, however, leave program providers themselves exposed to the risk of adverse fluctuations in the price of fuel. Accordingly, in conjunction with the implementation of such a program the program provider may also obtain price protection. This price protection may for example comprise hedging directly in one or more markets, or may alternatively comprise purchasing a product (for example, from operators of price protection system or a financial institution) whereby paying an insurance cost the program provider obtains the right to be indemnified for any cost of the commodity above a certain price. The provider of such price protection to a program provider (for example, operators of a price protection system) may also obtain price protection, for example through the purchase of such price protection from a financial institution or another provider of such price protection.

Attention is first directed to embodiments of the present invention which include systems and methods for allowing a manufacturer to obtain price protection for a corresponding commodity in association with the provisioning of an incentive program related to that commodity in conjunction with the purchase of a good or service (collectively referred to herein as a good). Specifically, embodiments of the present invention may provide the ability for manufacturers to provide an incentive program for the purchase of a good, where the incentive program is related to the purchaser's consumption of a commodity. Based upon the provisioning of the incentive program the manufacturer, if desired, may obtain a price protection contract related to the commodity such that the manufacturer is protected from increases in the price of the commodity when provisioning the incentive program.

Specifically, certain embodiments of the present invention may provide the ability for manufacturers to obtain a price protection contract for the purchase of fuel based upon a fuel purchase incentive program offered in conjunction with the purchase of one of their automobiles. An offered fuel purchase incentive program may have a certain set of terms. If a vehicle corresponding to that offered fuel purchase incentive is purchased, the manufacturer may obtain a price protection contract in conjunction with the provisioning of the incentive program to the purchaser of the automobile, where the terms of the price protection contract may cover some or all of the risk related to the provisioning of the incentive program taken on by the manufacturer. When the purchaser of the automobile thereafter purchases fuel under the incentive program settlement may be made between the purchaser, the manufacturer, the gas station or the providers of the price protection contract based upon a price at which the fuel was purchased, the terms of the incentive program and any obtained price protection contract.

Alternatively, in other embodiments, program provider 180 may utilize the expertise of operators of a price protection system, the functionality of a price protection system, the relationships operators of price protection system may have with other entities (for example, a credit card company, a financial institution, an identification mechanism company, etc.), etc. to implement at least a portion of the incentive program offered by the manufacturer, irrespective of whether program partner obtains price protection from operators of a price protection system.

In any event, in conjunction with the implementation of such an incentive program or the obtaining of price protection in conjunction with such an incentive program, the manufacturer, the operators of a price protection system, or both, may hedge their position in the market place by directly buying or selling options or futures contracts in one or more markets or by themselves obtaining protection against an increase in the price of fuel from a third party (for example, a financial institution) by paying an insurance cost such that that they are indemnified for any amount paid for fuel at a price above the strike price.

Accordingly, certain embodiments of the present invention may be advantageously implemented in conjunction with a price protection system such as that depicted in U.S. patent application Ser. No. 11/705,571 entitled "Method and System for Providing Price Protection For Commodity Purchasing Through Price Protection Contracts" filed Feb. 12, 2007 by Fell et al, hereby incorporated by reference in its entirety.

Before delving into the details of various embodiments of the present invention it may be helpful to give an overview of an embodiment of the present invention with respect to the above described embodiment of a topology, again using the example commodity of fuel in conjunction with the purchase of an automobile. Manufacturers (for example, program provider 180) may provide one or more fuel based incentive programs in conjunction with the sales of their cars at a dealership. These incentive programs may provide, for example, free fuel (for example, up to some quantity) for a certain time period, fixed price fuel (for example, up to a certain quantity) for a certain time period, a fixed discount from the retail price if the retail price of fuel is below a certain price or fixed price fuel if the retail price is above a certain price, etc.

When a vehicle is purchased then, the incentive program may be provided to the purchaser of the vehicle by the manufacturer. As in most cases these embodiments of incentive programs involve providing fuel to a vehicle purchaser at a certain cost, the manufacturer is taking on a degree of risk with respect to the provisioning of these incentive programs, as the cost of fuel may increase. Thus, these manufacturers may themselves wish to obtain some protection from future increases in the price of fuel to increase predictability of future fuel costs.

If the manufacturer desires to obtain such price protection the manufacturers may access price protection system 120 to obtain price protection contracts pertaining to fuel, where the terms of the obtained price protection contract are based upon the incentive program provided to the purchaser of the manufacturer's automobile. Alternatively, in one embodiment the manufacturer may hedge their position (for example, with respect to the provided incentive program) by directly buying or selling options or futures contracts in one or more markets.

Numerous advantages may be obtained through the use of embodiments such as these. More specifically, manufacturers may provide a wide variety of incentive programs in conjunction with the sale of their products and associate those incentive programs with slogans or other branding which may increase the desire of a consumer to purchase their products. In addition, by purchasing such price protection contracts in conjunction with these incentives the manufacturers will accurately be able to price the cost of the various incentive programs and obtain the benefit of decreases in the price of a commodity while mitigating the risk of increases in these prices. Manufacturers may additionally benefit as operators of price protection system 120 may have an extant infrastructure which may be used to implement such incentive programs without additional involvement by the manufacturer.

Consumers may benefit as any costs to them which are involved with obtaining such an incentive program in conjunction with the purchase of the good may be rolled into the purchase price of that good, which may, for example, allow them to finance any such purchase costs in conjunction with the financing of the purchase price of the good or which may allow the cost of the incentive program to be paid for in some other way which eases the burden of any payment for the incentive program by the consumer.

Figure 3:
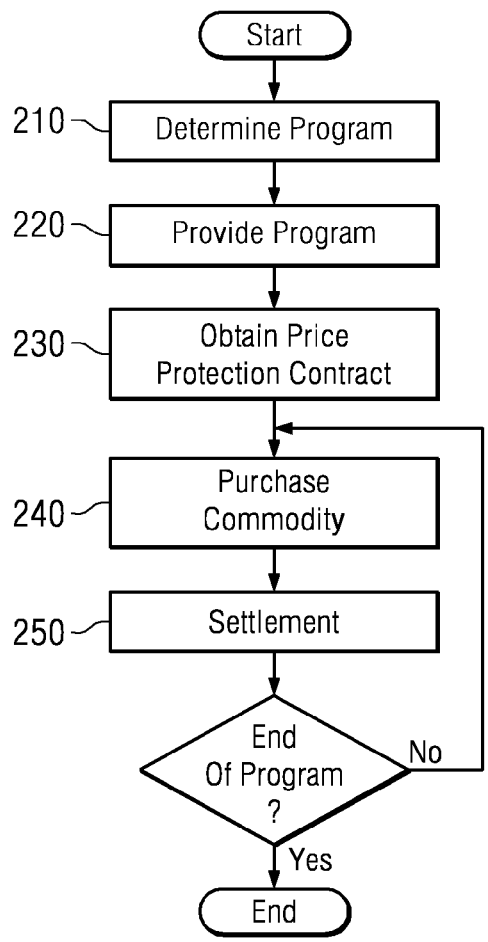
FIG. 3 is a flow diagram illustrating one embodiment of a method for the provisioning of price protection in conjunction with an incentive program related to the purchase of a good.

Moving now to FIG. 3, one embodiment for a method of providing an incentive program related to a commodity in conjunction with the purchase of a good is presented. At step 210 an incentive program is determined by a manufacturer of a good, where the incentive program comprises a set of terms related to the purchase of a commodity related to use of the good. For example, a vehicle manufacture may offer a fuel incentive program with a set of terms relating to time, price, location, etc. At step 220, when the manufacturer sells a good the incentive program may be provided to the purchaser of that good. In conjunction with the provisioning of this incentive program then, at step 230 if the manufacturer desires, the manufacture may obtain a price protection contract with a certain set of terms based upon the terms of the incentive program provided to the purchaser of the good or another type of hedge. During the incentive program then, at step 240 when the purchaser of the product who was provided with the incentive program purchases the good covered by the incentive program, a settlement between the manufacturer and the implementers of the incentive program, if needed, and any settlement between the retail point of sale location, the operators of price protection system and the consumer to whom the incentive was provided may take place at step 250, where the terms of the settlement between the manufacturer, consumer and the implementers may be based upon a price associated with the commodity purchased, and the sets of terms associated with the incentive program.

As discussed above, certain embodiments of the present invention may be particularly useful with respect to fuel incentive programs offered in conjunction with the purchase of a vehicle. It may be useful here to delve into more detail with respect to these types of embodiments. With that in mind attention is now directed to FIG. 4 which depicts one embodiment for a method of providing a fuel incentive program in conjunction with the purchase of an automobile is depicted.

At step 310 a fuel incentive program to offer to a potential purchaser of an automobile is determined by the manufacturer, where the fuel incentive program comprises a set of terms related to the future purchase or use of fuel. Such a fuel incentive program may be particularly suitable to offer in connection with the sale or lease of a low mile-per-gallon (MPG) vehicle (such as a pickup truck with a large engine), vehicles on sale in a particular region (such as "Texan Edition" pickup trucks) or vehicles targeted at, or correlated with, users that have a higher probability of being outdoors-loving or environmentally aware (such as buyers of Jeep-type vehicles).

The incentive program may, for example, provide the purchaser with free fuel (up to a certain quantity) for a certain time period when they purchase one of the manufacturer's automobiles from a dealership provide the purchaser with fuel at a set cost for a certain amount of time, some combination of these incentive programs, or another set of terms altogether. These incentive programs can then be advertised or marketed by the manufacturer or dealership 180. In fact by setting price terms associated with the fuel incentive program at a discount to current prices, a purchaser may be provided with a powerful incentive to purchase the manufacturer's vehicles from dealership 180 as purchasers may rest assured that their fuel budgets will not exceed a fixed cost during a certain time period, while still being given the benefit of reduction in fuel costs.

It may be useful here to go into more detail regarding embodiments of such fuel incentive programs, their terms and conditions, associated rules, etc. In some embodiments, an incentive program has a defined program period and a program description containing a set of official program rules. An example program description may include the following language, including a set of rules:

"The fuel program is offered to eligible retail consumers who purchase or lease an eligible vehicle and take delivery during the program period. This special program is an alternative to the traditional incentive offers of Consumer Cash/Lease Cash and/or APR. This offer consists of a specific number of price-protected gallons of fuel at a fixed price per gallon for regular 87 octane unleaded, E85, or diesel purchases, per vehicle on select vehicles. In this example, the fixed price is $2.99 per gallon."

As a specific example, an incentive program offered to a consumer may contain the following elements/qualifications:

1. The eligible consumer must have a valid MasterCard or Visa credit card to participate in this program. No debit cards or other credit cards are permitted in this program. A program card (the "Card") will be issued to participating customers using the customer's credit card account information and must only be utilized for eligible fuel purchases. The Card will be activated for fuel purchases only. The customer will receive a PIN number to the Card for security purposes during the activation process. All amounts to be charged to the customer will be billed to the MasterCard/Visa credit card that was registered by the consumer. The Card must be issued in the name of the individual reported as the vehicle purchaser.

2. Fuel purchases will be protected at a fixed price per gallon for a specified number of years, divided equally into yearly increments, with the below listed requirements:

If the vehicle uses unleaded fuel, the program covers up to 87 octane fuel, but not diesel fuel. Diesel purchases will be passed through to the customer at full pump price plus a service fee per transaction.

If the vehicle can use E85 fuel, the program will cover E85 or up to 87 octane, but not diesel fuel. Diesel purchases will be passed through to the customer at full pump price plus a service fee per transaction.

If the vehicle requires diesel fuel, the program will cover diesel fuel only. Unleaded fuel purchases (including E85) will be passed through to the customer at full pump price plus a service fee per transaction.

3. The program is designed to provide participating customers a specified number of gallons of required fuel (87 octane, E85 fuel, or diesel) at a fixed price per gallon for a specified number of years. Participating consumers may elect to upgrade their fuel quality purchases, and these purchases will be considered as "Out of Scope" purchases with the noted charges/prices outlined below:

If the consumer purchases a higher grade of gas (i.e., Mid-Grade or Premium) on an unleaded gas card, the consumer will be billed for the fixed program price plus an additional charge per gallon for mid-grade fuel (88 or 89 octane) or premium fuel (90 to 94 octane). All other grades of fuel higher than 94 octane are not covered under this program, and the full pump price will be billed through to the consumer, plus a service fee per transaction. In addition, if a consumer purchases unleaded gas (including E85) on a diesel card, the consumer will be billed the full pump price plus a service fee per transaction.
4. The yearly (or other time period) allotment of fuel protected at the fixed price will have annual start—and expiration dates. For example, the first year begins upon receipt of the Card and has an expiration date of Jul. 31, 2009. The second year then begins on Aug. 1, 2009 and has an expiration date of Jul. 31, 2010. The third year begins on Aug. 1, 2010 and has an expiration date of Jul. 31, 2011, and so on until the specified number of years expires.
5. If the annual fuel gallon allotment is used, the Card will not authorize any purchases until the next scheduled annual allotment time period is reached.
6. If the annual and/or program gallon allotment is not used during the appropriate time period, any unused gallons will expire and not roll-over to the next year.
7. If the Card is used to purchase fuel at a price less than the fixed program price, the price will not be adjusted, but the gallon usage will still be applied against the maximum annual allotment.
8. If the consumer's MasterCard or Visa credit card is dishonored for any reason, the Card will be deactivated. The consumer will lose card privileges until the consumer re-enrolls into the program with a valid MasterCard or Visa credit card and a reinstatement fee is paid by the consumer.
9. Cards are not transferable. If a consumer sells their vehicle before the program expiration date, turns-in their lease before the program expiration date, or disposes of their vehicle for any other reason, the card will continue to function for the original consumer as designed.
10. This program will only allow one card to be issued, and it must be issued in the name of the individual designated as the vehicle purchaser. If a card is lost or stolen, the customer must call and deactivate that card and have a replacement card issued.
11. If the vehicle is reported sold with more than one name, the consumers must identify one (1) credit card that will be used for the program that matches one of the names on the vehicle sale.
12. Eligible consumers must enroll for the program card via the program web site or by calling the program enrollment center at a given number before a given date.
13. The program contains a maximum fuel charge per day without pre-authorization.
14. If an eligible consumer exceeds the maximum gallon allotment during a tank fill-up, the program will cover the entire fill-up at the fixed program price per gallon, unless the consumer has exceeded the total program fuel allotment. The Card will not function for future fuel purchases until the next annual gallon allotment is replenished (if applicable—i.e., if time still remains in the program).
15. Only fuel purchases in the United States are eligible for this program.
16. Fuel purchases at marinas are ineligible for this program.

In some embodiments, the gallon allotment calculation used to determine the specified number of years of gas at the fixed program price per gallon is as follows: 12,000 miles driven per year multiplied by the specified number of years, divided by the vehicle's adjusted combined EPA City/Highway average miles per gallon (MPG) (average MPG calculated via average of all body models MPG within each nameplate).

The program provider may also reserve the right to discontinue, amend, rescind or modify this program at any time and may specify that this program is an alternative to traditional incentive programs. For example, the program may specify that consumers who select this offer will not be eligible for the traditional consumer/lease cash, subvented APR rates, or retail cash-back offers. Additionally, the incentive program may specify that all franchised dealers of the manufacturer who agree to abide by these official program rules are eligible to participate. Further, the program may specify that eligible vehicles must be delivered during the program start and end dates indicated. The program sponsor may define what auto models are eligible to participate in the program and/or what auto models are ineligible to participate in the program. In some cases, the program sponsor may provide a plurality of incentive programs and may specify program compatibility in the program rules accordingly.

It will be apparent that the above list is but one example of a description and a corresponding set of rules which may be presented or implemented in conjunction with a fuel incentive program, and fewer, additional or different rules may be implemented. For example, the number of payment methods accepted may be expanded or subtracted and may include: Visa, Mastercard, Discover, American Express, etc.

As cards have different interchange fees and different loyalty bases and different relationships with operators of the price protection system or auto manufacturers a wide variety of arrangements may be imagined. In the same vein, the choice to accept or use debit cards as a payment method may be based on the regulatory complications or cost issues involved, the choice whether to issue multiple payment methods (for example to a husband and wife), whether the payment method will continue to work if the automobile is sold, may be varied depending on the fuel incentive program implemented.

Additionally, the time period for which the fuel incentive program lasts may also be varied. For example, the fuel incentive program may start the day you purchase the car, the day the card is mailed to the customer or the fuel incentive program can be extended to one month from the end of the offering period. So, in a May/June of 2009 offering, as cards would likely last be distributed in July 2009, all cards in that fuel incentive program extend protection through, for example, Jul. 31, 2011.

Rule regarding actions if a payment method is dishonored may also be varied or implemented, including:
1. Turning off the payment method upon notice of dishonor.
2. Losing protection under the program until a valid credit card is presented—which may be an important incentive for remedy.
3. A $25 (or alternative) reinstatement charge may be levied with this revenue flowing to as compensation for excess servicing costs.
4. The payment method may not be reinstated until the dishonored charge and the reinstatement fee are provided.

In one embodiment, rules concerning occasions where: a consumer whose fuel incentive program covers only unleaded 87 buys diesel or vice versa; a consumer whose fuel incentive program covers only unleaded 87 customer purchases mid-grade or premium or a consumer whose fuel incentive program covers only unleaded 87 purchases E85 may also be implemented.

In these cases possible alternative program rules could be: the out of program transaction is passed-through to the consumer's personal card at full retail and the gallons purchased are also reduced from the virtual protection tank as a penalty. This is a simple rule that also provides the consumer an incentive for compliance and will also likely reduce to some small degree the risk management costs of the program. Another possibility would be full pass-through with no depletion of the consumer's virtual tank. In another scenario the transaction may be "bifurcated" and the contracted for equivalent price is charged and the amount related to the premium or grade differential is charged directly to the consumer's credit card. In the case of E85 the purchase may be treated as the equivalent of an unleaded 87 purchase because E85 is structurally lower that unleaded 87 in most market environments and in expected future environment.

There also may be alternatives with respect to when the consumer purchases fuel at a price which is lower than the price at which they are protected under the fuel incentive program. In one embodiment, if a consumer purchases fuel at a price lower than the price at which they are protected a fixed discount (for example, 50 cents off the retail price per gallon) may be deducted from the consumer's purchase and the number of gallons purchased deducted from the consumer's allotment under the incentive, program.

In other embodiments, where a fixed price discount is not provided, however, the question is whether these "out of the money" gallons should count towards the consumer's allotment? So, if the average customer program is 700 gallons per year then should the first 700 gallons purchased, regardless of retail price being count towards the consumer's allotment (referred to as the consumer's "virtual tank.") In a first embodiment, all purchased gallons are deducted from a consumer's virtual tank regardless of price. The advantage of this option is that it would possibly reduce the hedging and risk management costs of the incentive program.

In an alternative case, the consumer's virtual tank is only depleted when gas prices exceed the protected price under the incentive program. This may give more options to the consumer at the expense of increased costs associated with risk management or increased confusion on the part of the consumer.

Another possible variation in the program description or rules may concern actions to be taken if the number of gallons under a provided fuel incentive program exceeds a certain amount during a time period. An example of this case is a consumer who under a provided fuel incentive program has an annual fuel allotment of 700 gallons who within some period short of the expiration of a year of a three year fuel incentive program exhausts their allocation for the first year of the program. One way of addressing this issue would be to turn off the purchase rights of any card issued to the consumer until the beginning of the second card program year. In this case, it may be desirable to communicate the rationale for the suspension and also the reinstated option to purchase to the consumer at each anniversary date. This option may be a less expensive option as master servicing fees and other fees under the program may be based upon gallons and dollars processed. Another option would be to allow all purchases on the payment method even after the number of price protected gallons have been exceeded and process these purchases at the prevailing pump price. This would allow the payment method to retain "share of wallet" and would be a trusted fuel card for the entire program duration.

After reviewing the above, it will be realized that the description and rules presented to a purchaser in conjunction with the fuel incentive program and to which a purchaser may be required to adhere to obtain or utilize such a fuel incentive program may be tailored to almost any concern or objective.

Figure 4:
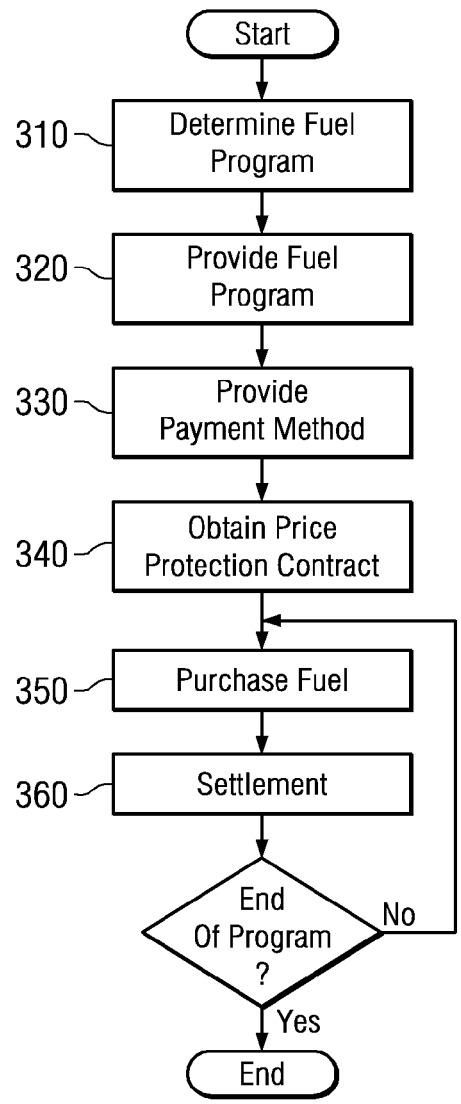
FIG. 4 is a flow diagram illustrating one embodiment of a method for the provisioning of price protection in conjunction with a fuel incentive program related to the purchase of an automobile.

Referring still to FIG. 4, once the fuel incentive program has been determined at step 210, when a consumer thereafter purchases a vehicle at dealership then, the consumer is provided with the fuel incentive program at step 320. In conjunction with providing the fuel incentive program to the purchaser, a payment method may be provided to the purchaser at step 330 such that transactions (e.g. at retail point of sale locations 160) under the fuel incentive program may be identified and processed. This payment method may be a credit card provided by credit card company or another type of identification mechanism (for example, a fleet card provided by identification mechanism 150). The payment mechanism may be associated with the purchaser and the fuel incentive program provided to the purchaser and may also be branded in conjunction with the operators of a price protection system, manufactures of vehicles, suppliers of retail point of sale locations or co-branded in some manner.

In some embodiments, operators of price protection system 120 may specify terms and conditions regarding the use and operation of the payment method which may be, for example, an authorization card issued to a purchaser under a particular program. In one embodiment, the terms and conditions ("Terms and Conditions") governing the use and operation of a payment method (the "Card") issued by a operators of price protection system 120 ("Pricelock") to a purchaser (the "Consumer") under a fuel incentive program (the "Program") may include some or all of the following items:

1. Card Usage.
    a. The Card may only be used by Consumer. Consumer is responsible for the safe keeping and security of the Card and the prevention of unauthorized use of the Card.
    b. The Card may only be used to obtain fuel at participating retailers in the United States.
    c. Possession of the Card does not confer any right on Customer to purchase fuel.
2. Personal Identification Number ("PIN Number").
    a. A 4-digit PIN Number shall be allocated to each Card.
    b. PIN Numbers are to be treated as confidential information by Customer and should, at all times, be kept entirely separate from the Card.
    c. If a PIN Number is disclosed to an unauthorized person, Customer must immediately notify Pricelock per the Terms and Conditions on Loss, Theft or Unauthorized Use of Card.
    d. The PIN Number is only for use in the completion of fuel purchase transactions at participating retailers in the United States.
3. No Finance Charge; Fees and Service Charge.
    No finance charges will be accessed to the Card. However, Consumer may be charged a fee in connection with:
    a. the issuance of new Card(s) on reissuing cards in replacement of lost or stolen cards if the incidence of reported loss or theft is deemed excessive by Pricelock.
    b. the use of the Card to purchase types of fuel not authorized for the particular Card.
4. No Periodic Billing; Preauthorization.
    The Card shall not be subject to periodic billing. Pursuant to the credit card authorization, Consumer have authorized Pricelock to charge Consumer credit card for the payment of fuel purchased by Consumer using the Card at participating retailers and for charges payable by Customer as set out in the credit card authorization.
    IF, AT ANY TIME, PAYMENTS ARE NOT CLEARED ON THE FIRST PRESENTATION, THE CARD WILL BE DEACTIVATED. Customer Will Lose Card Privileges Until Customer RE-ENROLLS INTO THE PROGRAM WITH A VALID MASTERCARD CREDIT CARD OR VISA CREDIT CARD AND A $25 REINSTATEMENT FEE IS RECEIVED FOR THE REINSTATEMENT. If the Card is Used Outside the Scope of the PROGRAM, IT IS SUBJECT TO TERMINATION. IN THAT EVENT, CUSTOMER WILL LOSE CARD PRIVILEGES UNTIL CUSTOMER IS RE-AC- CEPTED INTO THE PROGRAM AND A $25 REINSTATEMENT FEE IS RECEIVED FOR THE REINSTATEMENT.
5. Parallel Charges.
  A separate charge, in the amount of the retail pump fuel price in excess of a fixed price for fuel authorized for Consumer's Card, is payable by Program partner(s) or an affiliate thereof. IF THAT PAYMENT IS NOT MADE WHEN DUE CUSTOMER'S CARD WILL BE UNAVAILABLE FOR FUEL PURCHASES.
6. Acceptance.
  a. Use of the Card by Consumer constitutes acceptance of these Terms and Conditions.
  b. All quotations or offers are made and all orders of the Card are accepted by Customer subject to these Terms and Conditions.
  c. These Terms and Conditions (including the cancellation provisions set out in these Terms and Conditions) shall apply to all repeat purchases made with Consumer's Card unless Customer is notified otherwise.
7. Validity; Tampering/Alteration.
  a. Each Card will be valid for use by Consumer in accordance with these Terms and Conditions, within the scope of the Program, until the Card is invalidated, terminated or cancelled.
  b. Consumer shall ensure that any person using a Card shall not tamper with or attempt to alter or interfere with the fuel monitoring device or fuel delivery equipment at any participating retailer. In the event there appears to be a defect or default in such monitoring or fuel delivery equipment, Consumer shall immediately report the same to Pricelock and the participating retailer.
8. Loss, Theft or Unauthorized Use of Card.
  Consumer must report the loss or theft of the Card or the PIN immediately by telephoning Pricelock at a telephone number given on the back of the Card. Do NOT use the lost or stolen Card or PIN after reporting the loss or theft of the Card or the PIN. Consumer shall remain liable for fuel purchased with the lost or stolen Card until Consumer reports the loss or theft as provided in this section.
9. Resale.
  Fuel purchased through the Program shall not be used by Consumer for any purpose other than for fuel in Consumer's personal vehicle(s) and shall not be resold or otherwise disposed of to any other person.
10. Privacy.
  Consumer's information such as name, mailing address, phone number and other personal information will not be distributed to anyone other than to the entities involved in the administration of the Program, including Pricelock, its Program partner(s), and their affiliated third parties, each of which reserves the right to alter its privacy principles, as business needs require. Cardholders from outside the United States should be aware that any personal information they provide will be stored in the United States in accordance with U.S. law.
11. Warranty and Damages Disclaimer.
  a. Pricelock, its Program partner(s), and their affiliated third parties accept no liability and give no warranty, express or implied, whether arising by common law or statute in relation to any transaction by virtue of the issuance of the Card to Consumer.
  b. Pricelock, its Program partner(s), and their affiliated third parties accept no responsibility and shall not be liable to Consumer for a failure (for whatever reason) on the part of a fuel delivery device to dispense fuel at any participating retailer.
  c. Pricelock, its Program partner(s), and their affiliated third parties shall not be liable under any circumstances for incidental, indirect, consequential or punitive damages arising out of any transaction governed by these Terms and Conditions.
12. Assignment.
  These Terms and Conditions and all agreements associated therewith, including any and all rights and obligations associated therewith, are personal to Consumer and shall not be assigned in whole or in part by Consumer without prior written consent of Pricelock or its Program partner(s). Pricelock or its Program partner(s) may assign without further notice to Customer all of their rights under this agreement.
13. Miscellaneous.
  a. Consumer shall immediately notify Pricelock in writing of any change to Customer's name, address or any other personal information Pricelock deems pertinent.
  b. Pricelock and its Program partner(s) may vary or add to the Terms and Conditions at any time provided that notice of such variation is served in writing. Any use of the Card by Consumer or any other authorized person after such notice has been served on Consumer shall be construed as acceptance by Consumer and such other authorized person of such variation or addition.
  c. The Card does not entitle Consumer to participate in any of Program partner(s) or its affiliates' other special offers or promotions that may be available from time to time.
  d. Failure by Pricelock or its Program partner(s) at any time to enforce any breach by Consumer of these Terms and Conditions or any other agreement shall not be construed as a waiver by Pricelock or its Program partner(s) of such Terms and Conditions and Pricelock and its Program partner(s) shall be entitled to enforce such breach at any time.
14. Consumer Service and Dispute Resolution.
  Representatives are available to answer questions and address disputes regarding Consumer's Card. Submit inquires in writing to Pricelock at the address given on the back of the Card.

After providing the purchaser with the fuel incentive program and the payment mechanism at steps 320 and 330, the manufacturer providing these fuel incentive programs may desire to obtain protection against increases in the price of fuel. If so at step 340 the manufacture may obtain a price protection contract with a certain set of terms based upon the terms of the fuel incentive program provided to the purchaser. The pricing of the price protection contract provided to the manufacturer may be determined based upon a forward projection of the price of fuel and a number of other factors. Such fuel protection may be provided through the application of risk management tools and mechanisms including, but not limited to, swaps (financial contracts that provide the obligation to buy or sell at a fixed and/or defined floating price), options (providing the right but not the obligation to buy or sell) and combinations of these such as swaptions (the right but not the obligation to buy or sell a swap at a specific point in the future).

During the fuel incentive program then (for example, a time period during which the fuel incentive program is in effect) the purchaser of the vehicle purchases may purchase fuel at step 350 using the payment methodology provided by the manufacturer (step 320). A settlement between the manufacturer and the operators of the price protection system may then take place at step 360, where the settlement between the manufacturer and the provider may be based upon a price associated with the fuel purchase, and the sets of terms associated with the fuel incentive program or the corresponding price protection contract.

For many reasons, it may be desirable to drive the purchaser to particular retail point of sale locations 160. As discussed particular retail point of sale locations 160 may be affiliated with the providers of price protection system 120 and may provide a discount on prices paid by the manufacturer providing the fuel incentive program or the providers of price protection system 120 or other perks to purchasers using the issued payment method, such as free car washes, drinks, or other special offerings. It may also be desirable to drive purchasers to particular retail point of sale locations 160 for a variety of reasons, including to provide the purchaser with the nearest retail point of sale location 160, the nearest retail point of sale location 160 with the lowest price, or some other reason entirely.

In order to provide such information to a purchaser a telematics device may be provided in the purchased vehicle by the manufacturer or the vehicle dealership 180. By interacting with the telematics device the purchaser may be provided with a variety of information on retail point of sale locations. For example, by activating the telematics device the purchaser may be presented with a map on a screen that automatically displays a map with their GPS location, the location and price of retail point of sale locations 160 within a certain radius, the retail point of sale location 160 with the lowest price of fuel, and retail point of sale locations 160 with other types of special offers. In this manner a purchaser may be provided real time information on retail point of sale locations 160 and driven to certain retail point of sale locations 160 based upon the provided information.

In one embodiment, the telematics device provided in the vehicle may be coupled to, or otherwise provided information by operators of, price protection system 120. Consequently, any data obtained, determined or otherwise maintained in conjunction with price protection system 120 may be provided to a purchaser having such a telematics device in his vehicle. As mentioned above, this data may be used to allow a purchaser to make decisions regarding retail point of sale locations 160 based on a wide variety of criteria and provide a mechanism for operators of price protection system 1290 to provide such purchasers which data to drive the purchasers to desired retail pint of sale location 160.

Figure 5A:
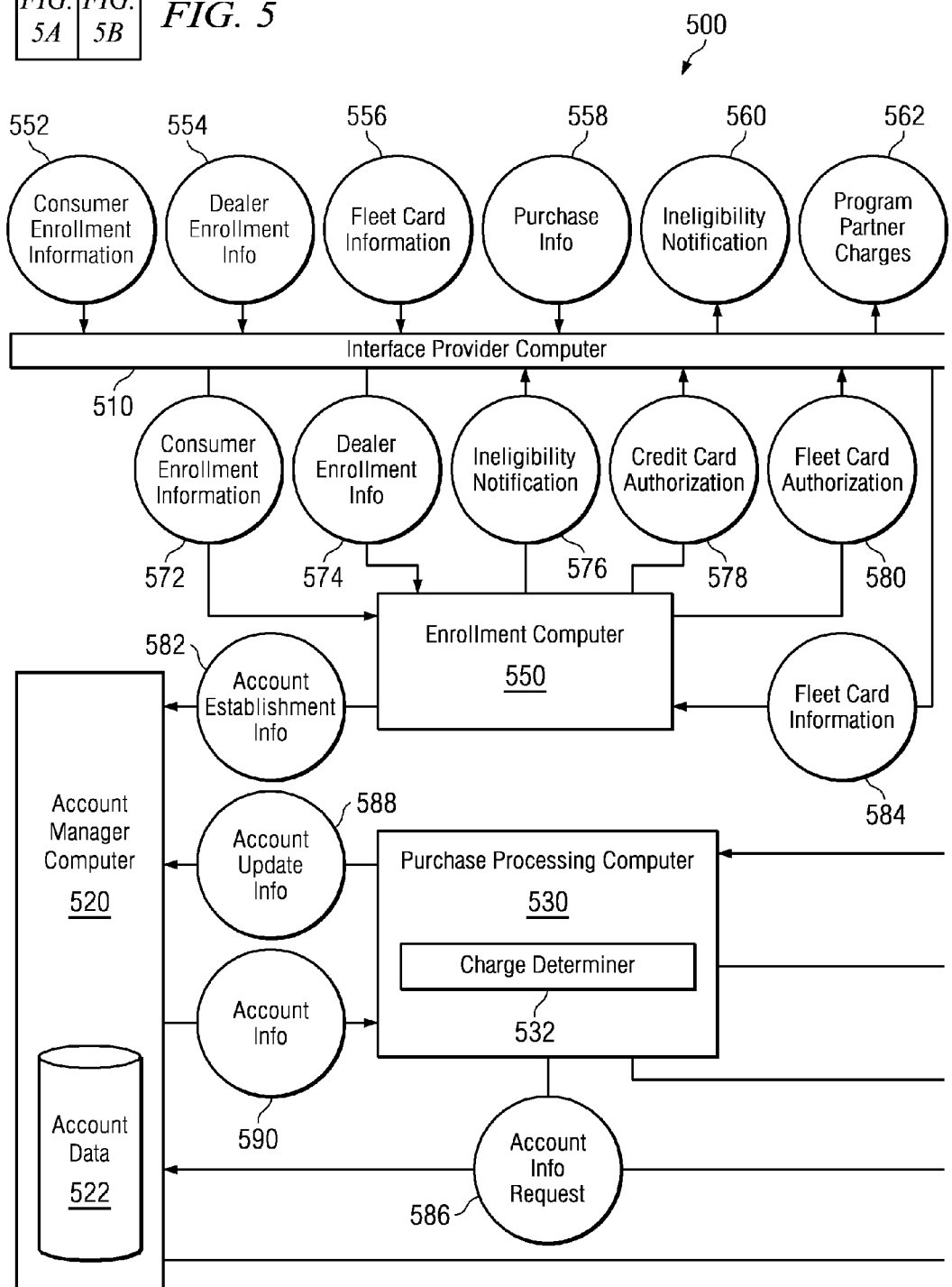
FIG. 5 is a block diagram illustrating one embodiment of a price protection system.
Figure 5B:
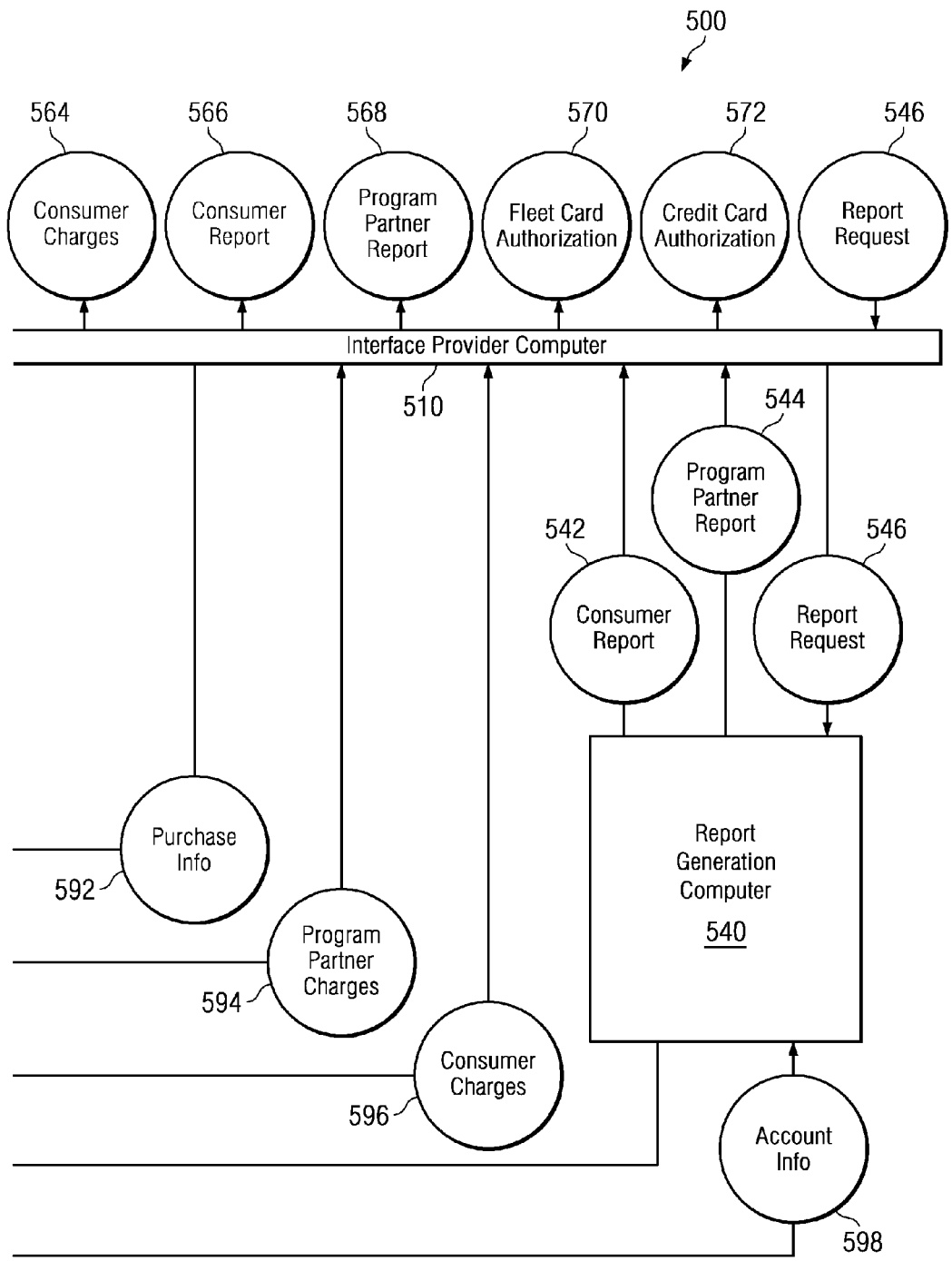

Moving now to FIG. 5, one embodiment of a price protection system configured for use in the provisioning of incentive programs is depicted. Price protection system 500 comprises an interface provider computer 510 which is coupled to one or more other computers (not shown) and is configured to receive data from, and send data to, these other computers. This interface provider computer may be configured to communicate via one or more protocols or standards including HTTP, XML, SOAP, Web Services Definition Language (WSDL), FTP, etc. and may additionally be configured to provide one or more interfaces for interaction with price protection system 500, including, for example, web pages, command line interfaces, web services interfaces, database server functionality, application server functionality, web server functionality, etc.

Utilizing the interfaces and protocols according to which the interface provider computer is configured, interface provider computer is operable to receive data such as consumer enrollment information 552, dealer enrollment information 554, fleet card information 556, report request 546 and purchase information 558 from one or more computers external to price protection system 500. Interface provider computer 510 may be configured to transform this data according to one or more communication protocols, file formats, etc., for example, parsing received data to extract desired information and communicate the extracted data to one or more of enrollment computer 550, account manager computer 520, report generation computer 540 or purchase processing computer 530.

Conversely, the interface provider computer 510 may utilize the configured protocols and interfaces to communicate data received from enrollment computer 550, purchase processing computer 530 or report generation computer 540 to one or more computers external to price protection system 500. Such data may include fleet card authorization 580, ineligibility notification 586, program partner charges 594, consumer charges 596, consumer report 542 or program partner report 544. Interface provider computer 510 may be configured to transform the received data according to one or more communication protocols by, for example, formatting received data according to a format or protocol utilized by an external computer or integrating such data into an interface presented to an external computer such that interface provider computer can communicate ineligibility notification 560, program partner charges 562, consumer charges 564, consumer report, program partner report 568, fleet card authorization 570 or credit card authorization 572 to the one or more external computers utilizing a format or interface utilized by the external computer.

Enrollment computer 550 may be configured to, based upon data received from interface provider computer 51, such as consumer enrollment information 572 and dealer enrollment information 574, determine if a consumer is eligible to enroll in an incentive program provided by a program partner. If not, enrollment computer 550 may communicate an ineligibility notification 576 to interface provider computer 550. Otherwise enrollment computer 550 may communicate credit card authorization 578 and fleet card authorization 580 to interface provider computer 550. Enrollment computer 550 may also initiate the creation of an account for the consumer through the communication of account establishment information 582 to account manager computer 520, where determination of account establishment information 582 is based upon a transformation of consumer enrollment information 572, dealer enrollment information 574 and fleet card information 582.

More particularly, in one embodiment, enrollment computer may be configured to determine a consumer's eligibility based on received consumer enrollment information 572 comprising, for example, a consumer's name, social security number, VIN of vehicle purchased, make or model of vehicle, mailing address, credit card type, number, security code, etc., billing address, phone number, email, vehicle identification number, security questions to be used, etc. and received dealer enrollment information 574 including a consumer's name, VIN, make or model of a purchased vehicle, the protected price under provided program, the type of fuel which is price protected under the incentive program, the number of gallons protected, etc. This determination may comprise a comparison of data contained in the consumer enrollment information 572 and the dealer enrollment information 574, for example a VIN number, a name, an address, etc., or some combination.

If the consumer is determined to be ineligible enrollment computer 550 may send out ineligibility notification 576 comprising a notification for a manufacturer that a person who tried to enroll in the incentive program provided by the manufacturer is not eligible, where the notification 576 may be an email or a file designating ineligibility designed to be communicated to a manufacturer computer via FTP, etc.

However, if the consumer is eligible, enrollment computer 550 may produce credit card authorization 578 to pre-authorize a credit card (for example, the card number provided in consumer enrollment information 572). The credit card authorization 578 may comprise, for example, a merchant check or the like. Enrollment computer may also send fleet card authorization 580 to tell a fleet card company to issue a card to the consumer, including, for example, a name of the consumer, manufacturer name, VIN, expiration date. Fleet card authorization 580 may be a file designed to be communicated to a fleet card computer via FTP, etc.

Enrollment computer may then receive fleet card information 584 comprising, for example, the fleet card number or other information related to the fleet card issued to the consumer. Enrollment computer may then send account establishment information 582 to account manager computer to establish an account for the consumer where the account establishment information 520 may comprise an identifier for the consumer such as a social security number, name, VIN, fleet card number, etc and related information to be associated with the identifier such as a social security number, name, VIN, fleet card number, credit card number, virtual reserve (number of protected gallons), etc.

Account manager computer 520 may be configured to establish, store, access, manage, update and provide information related to accounts corresponding to consumers. Accounts may be established based upon account establishment information 582. Account manager computer 520 may transform such account establishment information to store account data associated with a consumer in account data store 522. Account manager computer 520 may update accounts stored in account data store 522 based on account update information 588 and return account information 590, 598 based upon a received account information request 586.

Specifically, in one embodiment, account manager computer 520 may be configured to establish an account in response to receiving account establishment information 582 which may comprise an instruction to establish an account for a consumer where the account establishment information 520 may comprise an identifier for the consumer such as a social security number, name, VIN, fleet card number, etc and related information to be associated with the identifier such as a social security number, name, VIN, fleet card number, credit card number, virtual reserve (number of protected gallons), etc.

Account manager computer 520 may transform at least a portion of account establishment information 582 to produce an account configured to be stored in account data store 522, where the account may comprise an identifier for the consumer and associated information such as a social security number, name, VIN, fleet card number, credit card number, virtual reserve (number of protected gallons), etc. At least some of the account data may be stored in an encrypted form in account data store 522.

Furthermore, account manager computer 520 may be configured to update an account based upon account update information 588 which may comprise an identifier corresponding to a consumer whose account it is desired to update and an instruction identifying the account data to be updated and how the account data is to be updated. For example, account update information 588 may comprise an account identifier and an instruction to deduct a certain amount of gallons from the virtual reserve corresponding to the account associated with that identifier, record a purchase transaction in association with the account, etc. In response to receiving such account update information 588 the account manager computer may obtain account data corresponding to the identifier from the account data store 522, transform the account data according to the instruction on how the account data is to be updated and stored the updated account in account data store 522.

Account manager computer may also be configured to receive account information requests 586 comprising one or more identifiers corresponding to accounts on which information is desired, for example an identifier for a particular consumer, a set of consumers, a geographical region, an age group, etc. and what information from these accounts is desired. In response the account manager computer 520 may obtain account data from the account(s) corresponding to the identifier from the account data store 522 to provide account information 590, 598.

Purchase processing computer 530 is configured to process purchases made by consumers, determine charges to be assessed to a consumer or to a program partner and determine what account information for the consumer is to be updated based upon the consumer purchase. Purchaser processing computer 530 may be configured to utilize charge determiner 532 to determine charges to be assessed to a program provider or a consumer. Charge determiner 532 may employ a rules engine to evaluate a purchase made by a consumer with respect to the consumer's account to determine the charges to be assessed.

In particular, in one embodiment purchase information 592 comprising level-3 data corresponding to a consumer's purchase including the fuel grade, number of gallons, fleet card number, etc. is received at purchase processing computer 530. Purchase processing computer 530 may determine any charges to be assessed to the program provider. Purchase processing computer may validate the purchase information for reasonableness based on a set of rules (for example, is the quantity of fuel above or below a certain amount, is the price above or below a certain amount, etc.).

Purchase processing computer 530 will then match the purchase transaction corresponding to the purchase information 592 to an account by issuing an account information request 586 to account manager computer 520 comprising an identifier for a consumer's account, where the identifier corresponds to data received in purchase information 592. Account information 590 matching the identifier will be received from account manager computer 590 and comprise information regarding the consumer's account, such a protected fuel grade, program price at which the consumer is protected, number of gallons in virtual reserve, etc.

Based on the account information 590 and purchase information 592 charges to assess to the consumer's credit card or the program partner, if any, may be determined utilizing charge determiner 532. Any such charges are generated as program partner charges 594 or consumer charges 598, where the program partner charges 594 may be configured as a text file including a consumer identifier and a charge amount owed by the program provider while the consumer charge 596 may be a file configured to be provided to the credit card company corresponding to the credit card stored in association with consumer's account and indicating a card number and an amount to charge to the credit card.

Report generation computer 540 is configured to generate reports based upon account information. These reports may include a consumer report 542 for presentation to a specific consumer and program partner report 544 from a program partner. More specifically, in one embodiment, report generation computer 540 may be configured to receive report request 546 comprising an indication of a type of report to be generated and any associated data, such as a particular consumer, set of consumers, geographical area or other parameters corresponding to a desired report.

Accordingly, report generation computer 540 may issue an account information request 586 comprising a request for account information to generate the report corresponding to report request 546 such as account information pertaining to one or more consumers and data related to the consumer(s) such as the number of gallons left in a consumer's virtual reserve, number of gallons purchased, price at which fuel was purchased under the incentive program, what a consumer currently owes the program partner or operator of the price protection system, etc. Report generation computer 540 may then transform the received account information 598 into a report responsive to the report request 546, which may include a program partner report 544 or consumer report 542. A program partner report 544 may comprise data or the results of an analysis of data corresponding to the set, or some subset, of consumers participating in the incentive program offered by the program partner such as an analysis of purchase prices paid by the consumers, a geographical breakdown of the consumers, a price and geographic break down of consumers, analysis of number of gallons left in the consumer's virtual reserve, future projections related to the consumers or almost any other type of analysis desirable. A consumer report may comprise data or the results of an analysis of data corresponding to a particular consumer.

After reading the above it should be noted that in addition to performing the specific functionality and transformations discussed, each of account manager computer 520, purchase processing computer, report generation computer 540, enrollment computer 550 and interface provider computer 510 may be a general purpose computer of the type known in the art having a central processing unit ("CPU"), at least one read-only memory ("ROM"), at least one random access memory ("RAM"), at least one hard drive ("HD"), or one or more input/output ("I/O") device(s). Furthermore, it will be realized that although account manager computer 520, purchase processing computer, report generation computer 540, enrollment computer 550 and interface provider computer 510 are depicted as separate computers, the functionality described with respect to these computers may be combined into one or more computers, including one or more general purpose computers.

Figure 6A:
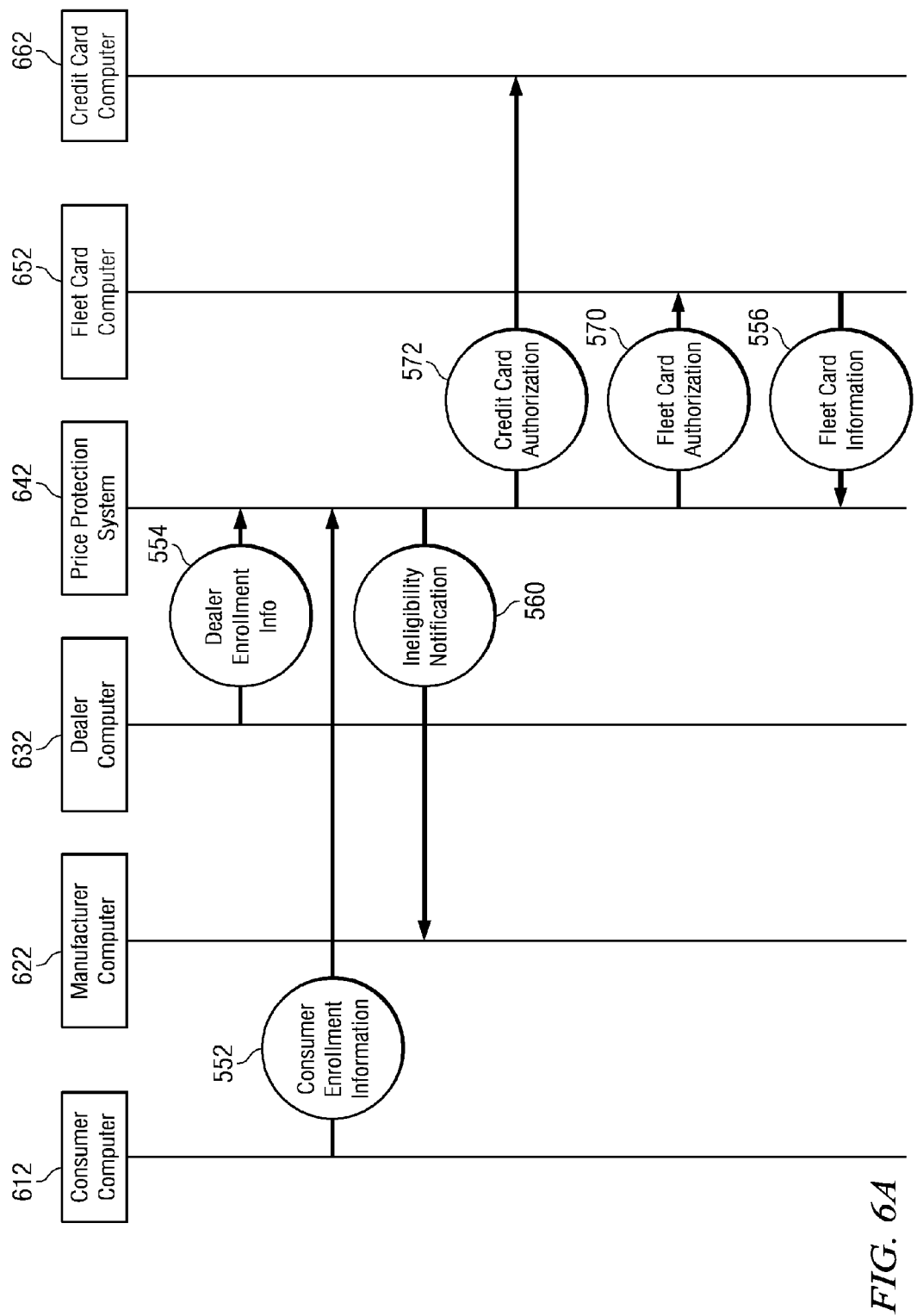
FIG. 6A is a block diagram depicting one embodiment of an information flow utilizing a price protection system.
Figure 6B:
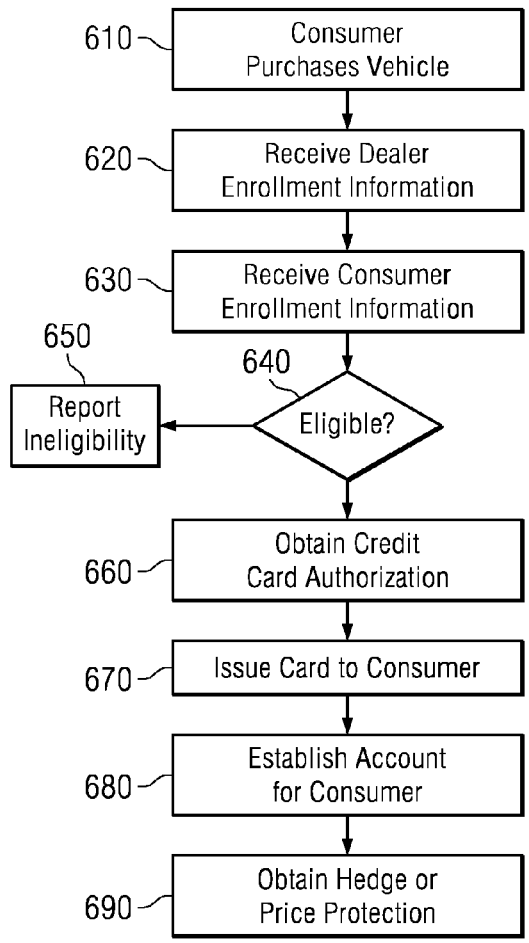
FIG. 6B is a flow diagram illustrating one embodiment of a method for enrollment.

Moving now to FIGS. 6A and 6B, one embodiment of a method and associated information flow for a process of enrolling a consumer in an incentive program related to fuel purchasing offered by a manufacturer of automobiles utilizing an price protection system is depicted. Referring conjointly to FIGS. 6A and 6B, at step 610 a consumer may decide to purchase a vehicle from a particular manufacturer and goes to a dealer who sells vehicles from that manufacturer. At the dealer the consumer is informed that the manufacturer is providing an incentive program related to the price of fuel. Such an incentive program may, for example, allow the consumer to pay no more than a program price for fuel for a certain time period and may additionally provide a fixed discount off the price of fuel if the price is below the program price. Based on this incentive program or other considerations the consumer may then purchase one of the manufacturer's vehicles from the dealer.

When the consumer purchases the vehicle he becomes eligible for the incentive program and thus the dealer may provide enrollment information concerning the consumer to the price protection system responsible for implementing at least a portion of the incentive program in conjunction with its program partner the manufacturer such that the dealer enrollment information is received at the price protection system at step 320. This step may entail the dealer entering information such as the consumer's name, vehicle type, VIN number, address, dealer information, program information, etc. into dealer computer 632. This dealer enrollment information 554 is then communicated to, and received by price protection system 642. The entry or communication may be accomplished, for example, using an interface provided by price protection system 642 such as one or more web pages, FTP locations, etc.

As part of such an incentive program the consumer may also need to enroll and provide information to price protection system 642. More specifically, in one embodiment a consumer enrolling in the incentive program may provide information such as a name, mailing address, phone, vehicle information (for example, VIN number or make or model), email address and information on a credit card such as the card number, expiration date, name on the card, CCV2 security code, etc. In one embodiment, enrollment of a consumer may be done utilizing by a consumer at a consumer computer 612 using one or more web page interfaces provided by price protection system. The consumer enrollment information 552 can then be communicated from the consumer computer 612 to the price protection system 642.

It can then be determined at step 640 if the consumer is eligible for enrollment in the program. In one embodiment, this determination is made by comparing at least a portion of the consumer enrollment information 552 to the dealer enrollment information 554 or may be determined by evaluating consumer enrollment information 552 utilizing one or more rules (for example, only certain makes and models are eligible, etc.). This determination may be done at price protection system 642 or alternatively at another computer. In the latter case, price protection system 642 may assemble eligibility information (for example, as a text file or as a web services request) send the eligibility information to the other computer and receive a determination of eligibility (this scenario is not shown). If the consumer is not eligible, this ineligibility may be reported to the manufacturer at step 650 so that the manufacturer may responsible for consumer dealings. The manufacturer may be informed of this ineligibility by sending an ineligibility notification 560 regarding the consumer from price protection system 642 to manufacturer computer 622.

If the consumer is eligible, pre-authorization for the credit card provided by the consumer, as is known in the art, may be obtained at step 660 by sending credit card authorization request 572 from price protection system 642 to credit card computer 662. Once pre-authorization for the credit card is obtained an identification or payment mechanism such as a fleet card may be issued to the consumer enrolling in the program at step 670 by sending fleet card authorization 570 from price protection system 642 to fleet card computer 652. This fleet card authorization 570 may comprise any information needed by a fleet card company to issue a card and may include such information as a name, vehicle type, a VIN and expiration date (of the incentive program, the card, etc.). Fleet card information 556, including the assigned number, expiration etc. may be returned from fleet card computer 652 to price protection system 642. The fleet card itself may then be sent from the operators of fleet card computer 652 to the consumer via mail.

At step 680 then an account may be established for the consumer, including, for example, an identifier for the consumer, data corresponding to the consumer's credit card, data corresponding to the fleet card issued to the consumer, a virtual tank storing the amount or allotment of fuel the consumer is eligible to purchase under the program or for some portion of the program or any other type of information which it may be desired to keep or which may be useful in implementing the program.

If desired, at step 690, a hedge or other form of price protection may be obtained by the manufacturer, the operators of price protection system or both. Whether, who, and what type of, hedge is obtained may vary based on the financial arrangements between of operators of the price protection system and the manufacturer. For example, in one embodiment a manufacturer may pay a fee to operators of price protection system for implementing such an incentive program. However, in cases such as these the manufacturer may take on the risk associated with the price of fuel going above the program price associated with the incentive program provided to the consumer. Here, the manufacturer may choose to obtain a hedge against such a risk, either in the market or by purchasing one or more products from a financial institutions designed to at least partially protect the manufacturer against such risk. Alternatively, manufacturer may, in addition to paying operators of price protection system for the provisioning of the incentive program also pay operators of the price protection system for one or more products designed to protect the manufacturer against the risk of increased fuel prices. In this case, operators of price protection system may themselves desire to obtain a hedge against their risk by, in one embodiment, purchasing a product from a financial institution to protect them from such risk or by hedging their risk directly in one or more markets. It will be apparent from the above description that the scenarios depicted are exemplary only and that other arrangements of payments and hedging will be possible and may depend on the type and amount of risk borne by various parties involved in the provisioning and implementation of such an incentive program.

Figure 7B:
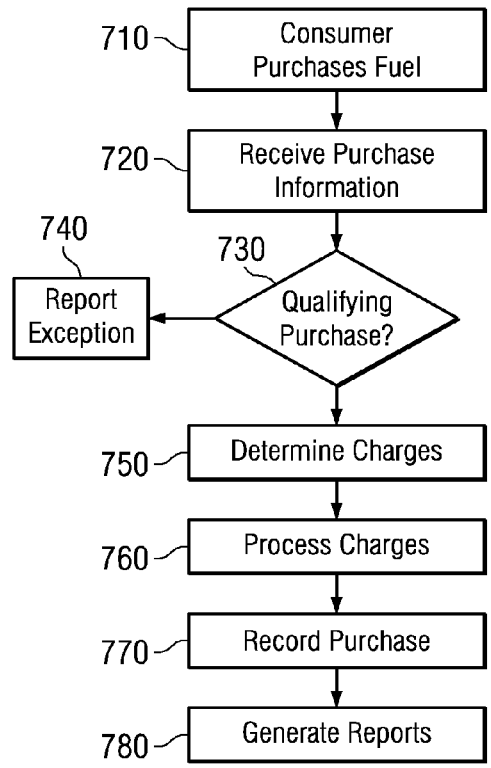
FIG. 7B is a flow diagram illustrating one embodiment of a purchase involving a price protection system.
Figure 7A:
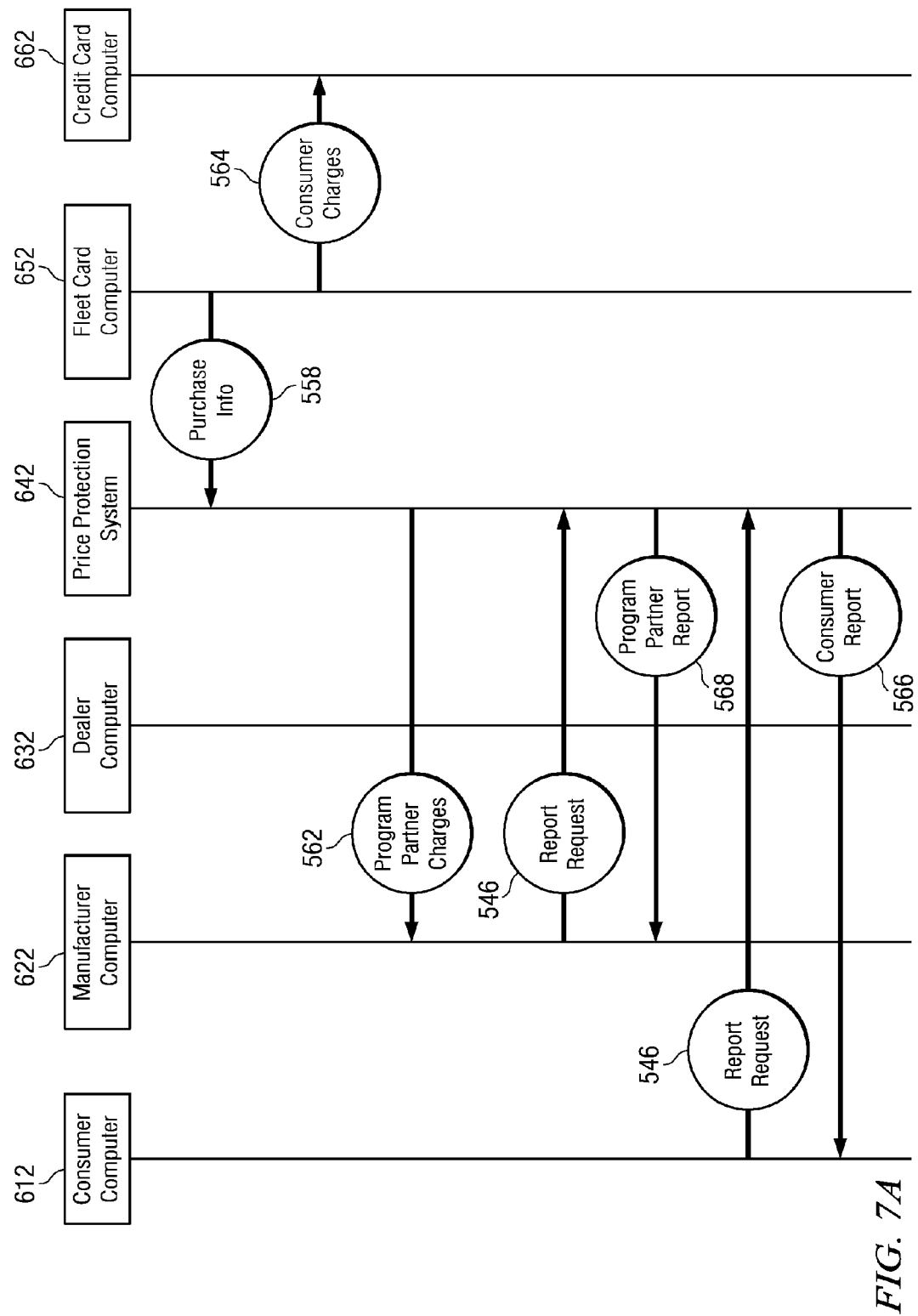
FIG. 7A is a block diagram illustrating one embodiment of an information flow utilizing a price protection system.

Continuing on now to FIGS. 7A and 7B a method and associated information flow for a process of processing a transaction according to an incentive program related to fuel purchasing offered by a manufacturer of automobiles is depicted. Referring conjointly to FIGS. 7A and 7B, a consumer enrolled in an incentive program related to the purchase of fuel may purchase fuel using the fleet card provided in association with the program at step 710. Thus, when this purchase occurs, or at some later point, fleet card computer 652 may receive point of sale (POS) data from the fuel vendor (for example, a computer associated with a retail point of sale location, etc.). This POS data may comprise what is known as level-3 transaction data pertaining to the purchase.

At step 720 this purchase information 538 may be communicated from fleet card computer 652 to price protection system 642. Specifically, the fleet card computer may determine that the purchase was made by a consumer enrolled in an incentive program (for example, using the fleet card number provided in the transaction data) and thus send the purchase information 538 to the price protection system 642. The purchase information 538 may be in a batch file comprising transaction data from multiple purchases by multiple consumers enrolled in such an incentive program.

It can then be determined at step 730 whether the purchase qualifies under an incentive program at step 730. This determination may be made using a variety of criteria such as whether certain data is outside certain ranges (for example, price too high/low, quantity too high/low), whether the transaction data corresponds to a consumer or a wide variety of other qualification parameters which may be noted from a review of this disclosure. If the purchase does not qualify the purchase may be reported as an exception (for example, to a provider of the fleet card) at step 740.

If the purchase does qualify, charges corresponding to the purchase by the consumer may be determined at step 750. In one embodiment, this determination is made by applying a set of rules corresponding to the incentive program in which the consumer is enrolled to the purchase. Applying these rules may, for example entail determining if the consumer is over a gallon limit (for example, how man gallons the consumer has left in his virtual reserve) and if the consumer is over the limit charging the consumer the retail price at the pump, determining if the fuel purchased is of the grade corresponding to the incentive program (for example, regular versus premium, etc.), determine if the price is above the program price and thus whether to apply a fixed discount to the purchase price, etc. It will be apparent that a whole host of other or different rule may be applied and the specific rules applied in any embodiment may vary depending on the type of incentive program implemented. Additionally, if the manufacturer has purchased price protection from operators of the price protection system additional or different rules which incorporate the terms of the obtained price protection may also be utilized to determine any charges.

From the application of the rules then charges to be paid by the consumer and the manufacturer may be determined (where either or both of these charges may be zero) and then processed at step 760. The processing of these charges may, in one embodiment, entail sending consumer charge 564 from price protection system 642 to credit card computer 662 where consumer charge 564 may identify the consumer's credit card and an amount to be charged to that credit card and the entity (operators of price protection system) that is placing the charge on the card. Similarly program partner (in this case the manufacturer) charges 562 may be sent from price protection computer 642 to manufacturer computer 622 where the program partner charges may detail the charges owed by the manufacturer to the providers of price protection system 642 under this purchase. Details of this purchase transaction may then be recorded in conjunction with the consumers account or another location at step 770.

Reports corresponding to this purchase, a consumer, the manufacturer or some other criteria may then be generated at step 780. Consumer report 566 or program partner report 568 may be generated in response to a received report request 546 issued through an interface provided by price protection system 642, or may automatically be generated once or on a periodic basis. In one embodiment, a report for a consumer 566 may be generated and sent to a consumer computer 612 through an interface presented by price protection system 642 and utilized by a consumer to interact with price protection system 642 to access, manage, update or perform other actions with respect to the incentive program in which they are enrolled and their account under the incentive program. Consumer report 566 may comprise a list of the consumers purchases, charges, virtual tank (for example, amount of protected gallons remaining under the incentive program), pump price for each transaction, savings on each purchase, etc. A program partner report 568 may also be generated for the manufacturer. This program partner report may, for example, include purchase transaction or other data related to the incentive program where such data may be broken down by one or more criteria such as geographical location, cost, amount, vehicle type, fuel type, etc. and which may be presented in a variety of formats, including textually or graphically.

It will be noted that the above examples of consumer reports 566 and program partner reports 568 are examples only and that a wide variety of other data may be presented, criteria utilized to create these reports, etc., that such reports may be generated at the behest of consumers or manufacturers and that such reports may be presented using a variety of formats and technologies, including through interfaces such as web pages accessed through consumer computer 612 or manufacturer computer 622 or via other methodologies such as mailing such reports.

Figure 8A:

To illustrate examples of such interfaces, FIGS. 8A and 8B depict embodiments of interfaces which may be provided by a price protection system for a consumer such that a consumer may interact with price protection system in conjunction with the provisioning of an incentive program to a consumer.

While embodiments of the present invention may be usefully employed in the provisioning of incentive programs related to the purchase of goods or services, other embodiments may also be usefully applied in other contexts such as in the provisioning of rewards programs, especially rewards programs having providers whose business models may depend heavily on the consumption of these commodities. To illustrate, in many cases an operator of a business may provide some sort of reward program for frequenting a business or purchasing goods or services associated with that business. These types of rewards programs can be seen in a variety of contexts: airline miles are awarded by airlines for purchasing tickets on those airlines; credit card companies may provide "points" when a consumer purchases goods on a certain credit card, where these points may be redeemed for other goods or services; an amusement park operator (such as Disney, Six Flags or the like) may provide points in conjunctions with money spent at the amusement park (on concessions, tickets, etc.) where the points may be redeemed for other goods and services which may be utilized to buy other goods; a casino operator may provide points to a consumer in conjunction with a consumer's visiting or gambling (money risked, won, lost, etc.) at that or an affiliated casino, where the points may be also be redeemed for goods or services, etc. The latter two examples above are of particular interest as they exemplify types of businesses whose revenue may be tied to a commodity as in some cases the business of casinos or amusement parks may depend heavily on drive in customers and thus indirectly on the price of fuel. As a consequence, as the price of fuel grows these types of business may experience a commensurate decline in business.

Operators of these types of businesses may therefore desire to offer consumers the ability to utilize any reward programs offered by the operators of the business to aid in the purchase or obtainment of such a commodity to further drive use of their business. For example, an operator of a casino may provide some sort of reward program where points are awarded to a consumer based upon frequenting or utilizing the services of the casino, where these points may be redeemed to allow these consumers to purchase fuel more inexpensively, in turn allowing these consumers to visit the casino more often or more inexpensively. These programs may involve free fuel for a certain amount of time (for example, free fuel for a year) or a free quantity of fuel (for example, free 500 gallons), fixed price fuel for a fixed amount of time (for example, $2.50 a gallon gas for one year), fixed price fuel if the retail price is above a certain price or a discount from the retail price is below a certain price, or some other program related to the consumer's purchase of fuel whereby the consumer is alleviated of some of the burden or risk associated with the purchase of fuel.

If an operator of a business implements such a program, however, the operator may bear the risk of a rise in the price of fuel during the implementation of such a program. Consequently, many business operators may desire to implement these types of reward-for-commodity programs while isolating themselves from the need to protect themselves from potential increases in the price of the fuel to allow them greater predictability in the implementation of these types of reward programs.

To that end, attention is directed to systems and methods for allowing a consumer to utilize rewards obtained in conjunction with purchases or use of a business to obtain price protection for a commodity. Specifically, embodiments of the present invention may provide the ability for operators of a business to provide a reward (points, credits, miles, actual money, etc.) in conjunction with purchases or another use of the business by a consumer. The consumer may then redeem or otherwise utilize these rewards to obtain, or modify price protection related to the commodity such that the consumer is protected from increases in the price of the commodity based upon an exercise of the rewards program.

Specifically, embodiments of the present invention may provide the ability for a consumer to obtain price protection for the purchase of fuel utilizing a rewards program offered by a business. More particularly, a consumer may frequent a business which offers a rewards programs and may obtain rewards in conjunction with this rewards program through a variety of means. The rewards given to the consumer can then be utilized by the consumer to obtain price protection for the purchase of fuel. When the consumer thereafter purchases fuel under the program, settlement may be made between the consumer, the retail point of sale location for fuel, the business which provided the rewards program or the implementers of the price protection based upon a price at which the fuel was purchased, the terms of the price protection contract or any agreement between the operators of the business and the providers of the price protection.

Before delving into the details of various embodiments of the present invention it may be helpful to give an overview of an embodiment of the present invention with respect to the embodiment of a topology depicted in FIG. 2, again using the example commodity of fuel in conjunction with a rewards program offered by a casino. As discussed above a consumer may obtain points through use of program provider 180 (which in this example is a casino). These points may then be used by the consumer to obtain a price protection from price protection system 120 or to modify the terms of existing price protection associated with the consumer which may be obtained from price protection system 120. These modifications may, for example, include modifications to a virtual reserve established for the consumer in conjunction with the price protection contract, modification of a program price or any other desired modification.

Numerous advantages may be obtained through the use of embodiments such as these. In particular the flexibility of rewards programs offered by business may be expanded such that price protection for a commodity may be provided in conjunction with a rewards program offered by a business without the implementation of a price protection system by the business. This capability may, in turn, drive these consumers back to the business as the cost of utilizing the business has been decreased through the use of the rewards program. This type of symbiotic relationship may be beneficial to both business and the consumer who utilize these businesses.

Moving now to FIG. 9, one embodiment for a method of providing an incentive program related to a commodity in conjunction with a rewards program. At step 910 a rewards account may be established for a consumer in conjunction with casino 180 and at step 920 a price protection account may be established for the consumer with a price protection system. The price protection account at price protection system may be the same as the rewards account established in conjunction with the casino 180 or vice versa and in conjunction with the establishment of such a price protection account payment may be made by the casino to operators of price protection system or by operators of price protection system to operators of casino, by the consumer to the operators of the casino or the price protection system, or some other arrangement entirely based on a business agreement between one or more of the consumer, the operator of price protection system and the operators of the casino.

At step 930 the consumer may accumulate points which result from the use of the casino, including for example, placing wagers, purchasing food or liquor, staying at a hotel, etc. These points may be stored or otherwise tracked in conjunction with the consumer's reward account. At some point then, at step 940 the consumer may desire to redeem some or all of his accumulated points. The consumer may, for example, access an interface to his reward accounts presented by one or more computer systems associated with the casino or price protection system to manipulate his rewards account or indicate how accumulated points are to be utilized. Using this interface, or another method, the consumer may indicate at step 950 that he wishes at least a portion of his accumulated points to be utilized to obtain a price protection or modify an existing price protection.

The consumer's price protection account at price protection system 120 can then be accessed at step 260. The consumer may then be presented with a set of options associated with the redemption of his points based upon a business agreement between the operators of casino 180, the operators of price protection system 120 or some other arrangement entirely. These options may include using accumulated points (associated with consumer's reward account) to obtain price protection with a certain set of terms. More specifically, a consumer may be offered at step 962 multiple price protection contracts with different sets of terms where each of the price protection contracts may have a different number of points associated with it such that to obtain that price protection contract that number of points will be subtracted from the consumer's rewards account. Additionally, at step 964 the consumer may be offered the ability to modify one or more of the terms of an existing price protection associated with his account at the price protection system. For example, the consumer may have a corresponding virtual reserve with a number of gallons at a corresponding program price. In this case, a number of gallons at the corresponding program price may be added to the virtual reserve for a corresponding number of points which will be subtracted from the reward account (for example, if the user has the right to buy 50 gallons at a $2.99 program price (50 gallons left in his virtual reserve corresponding to a $2.99 program price), the consumer may be able to obtain the right to purchase an additional 50 gallons at the $2.99 program price (on other words 50 gallons may be added to his virtual reserve at the program price)). Other modifications to the terms of existing price protection are also possible, for example modifications to the time in which a price protection contract is effective, etc. At step 970 then, the number of points associated with the option selected by the consumer will be subtracted from the consumer's reward account.

At some point then a consumer may purchase fuel at step 980 using a payment methodology, which may have been provided in conjunction with the price protection system or rewards account associated with the casino by, for example, an identification mechanism company (for example, a fleet card provider) or a credit card company. A settlement between the operators of casino, the operators of price protection system and the consumer may then take place at step 992, where the settlement between operators of casino, the operators of price protection system and the consumer may be based upon a retail price associated with the fuel purchase, and the sets of terms associated with the provided price protection, the rewards program offered by the casino, a business arrangement between the operators of the casino and price protection system, or some other arrangement entirely.

It will be noted after reading this disclosure that almost all business arrangements between a consumer, operators of casino and price protection system in conjunction with the provisioning of a price protection contract for the purchase of fuel in association with the provisioning of a rewards system for the consumer's use of the casino will be covered under this disclosure. Thus, for example, payment may be made by operators of casino to operators of price protection system in one lump sum for the implementation of such a reward program which includes price protection contracts for all consumers participating in the rewards program, on a consumer by consumer basis, based on price protection provided by operators of price protection system, etc. Conversely, payment may be made by operators of price protection system to operators of casino to allow operators of price protection system to provide such services in conjunction with a reward program associated with the casino, which may provide a whole host of profit opportunities for operators of price protection system.

By the same token, almost all settlement options between a consumer, operators of the casino which provides the reward program and operators of price protection system are also covered by this disclosure. For example, operators of casino may reimburse operators of price protection system some, all or none of the difference between a program price corresponding to a consumer's price protection contract and the retail price at which fuel was purchased by the consumer under the corresponding price protection contract.

Similarly, it will be understood that other options for settlement and redemption of rewards may be utilized in other embodiments. For example, a rewards card may be issued to consumers participating in the reward program of a casino. Any reward points accumulated may be stored on this card or in an account corresponding to the consumer and the issued card. When the consumer purchases fuel under the provided price protection a certain number of points may used to settle the transaction between the consumer, the operators of the casino or the operators of the price protection system. This number of points may then be subtracted from the number of points associated with the consumer's account.

Figure 10A:
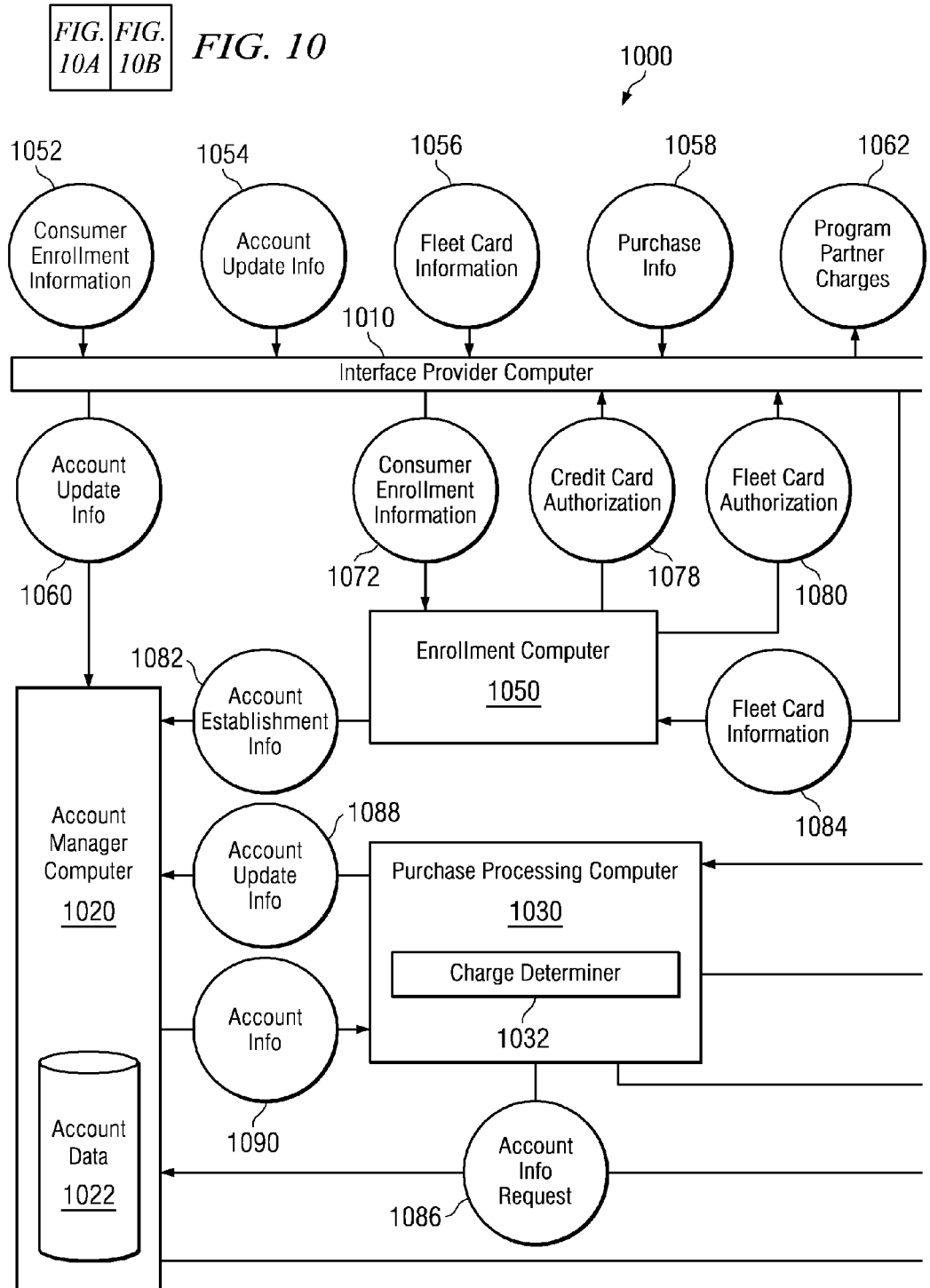
FIG. 10 is a block diagram illustrating one embodiment of a price protection system.
Figure 10B:
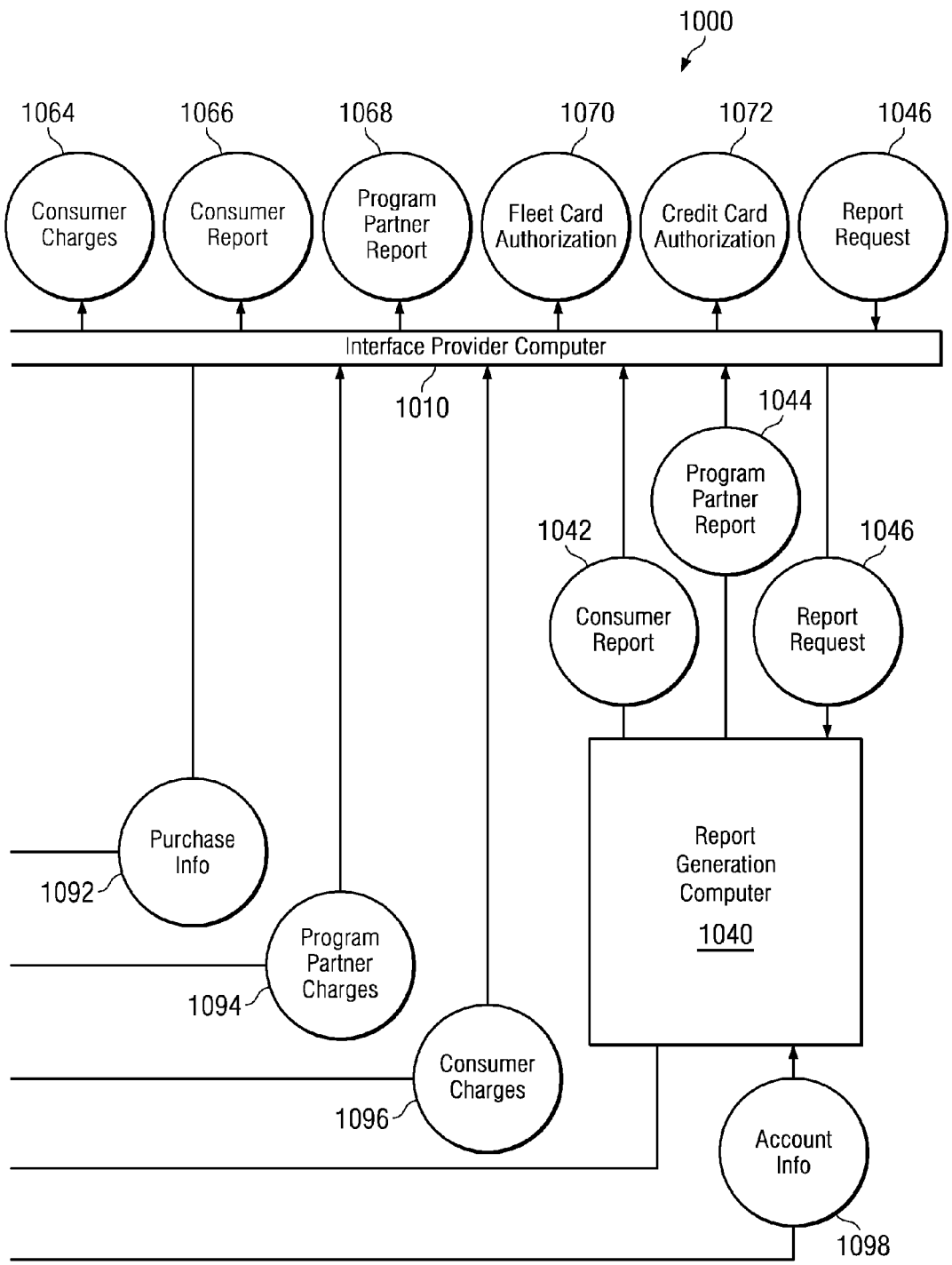

Moving now to FIG. 10, one embodiment of a price protection system configured for use in the provisioning of a rewards program which may be used to obtain price protection to a consumer is depicted. Price protection system 1000 comprises an interface provider computer 1010 which is coupled to one or more other computers (not shown) and is configured to receive data from, and send data to, these other computers. This interface provider computer may be configured to communicate via one or more protocols or standards including HTTP, XML, SOAP, Web Services Definition Language (WSDL), FTP, etc. and may additionally be configured to provide one or more interfaces for interaction with price protection system 1000, including, for example, web pages, web services, command line interfaces, database server functionality, application server functionality, web server functionality, etc.

Utilizing the interfaces and protocols according to which the interface provider computer is configured, interface provider computer is operable to receive data such as consumer enrollment information 1052, account update information 1054, fleet card information 1056, report request 1046 and purchase information 1058 from one or more computers external to price protection system 1000. Interface provider computer 1010 may be configured to transform this data according to one or more communication protocols, file formats, etc., for example, parsing received data to extract desired information and communicate the extracted data to one or more of enrollment computer 1050, account manager computer 1020, report generation computer 1040 or purchase processing computer 1030.

Conversely, the interface provider computer 1010 may utilize the configured protocols and interfaces to communicate data received from enrollment computer 1050, purchase processing computer 1030 or report generation computer 1040 to one or more computers external to price protection system 1000. Such data may include fleet card authorization 1080, program partner charges 1094, consumer charges 1096, consumer report 1042 or program partner report 1044. Interface provider computer 1010 may be configured to transform the received data according to one or more communication protocols by, for example, formatting received data according to a format or protocol utilized by an external computer or integrating such data into an interface presented to an external computer such that interface provider computer can communicate program partner charges 1062, consumer charges 1064, consumer report 1066, program partner report 1068, fleet card authorization 1070 or credit card authorization 1072 to the one or more external computers utilizing a format or interface utilized by the external computer.

Enrollment computer 1050 may be configured to, based upon data received from interface provider computer 1010, such as consumer enrollment information 1072 communicate credit card authorization 1078 and fleet card authorization 1080 to interface provider computer 1050. Enrollment computer 1050 may also initiate the creation of an account for the consumer through the communication of account establishment information 1082 to account manager computer 1020, where determination of account establishment information 1082 is based upon a transformation of consumer enrollment information 1072, dealer enrollment information 1074 or fleet card information 1082.

More particularly, in one embodiment, enrollment computer may receive consumer enrollment information 1072 comprising, for example, a consumer's name, social security number, location or name of casino, mailing address, class of participation (for example, pertaining to the reward program e.g. platinum, silver, gold, etc.), phone number, credit card number, billing address, email, security questions to be used, etc. the type of fuel which is price protected under the rewards program, etc.

Enrollment computer 1050 may produce credit card authorization 1078 to pre-authorize a credit card (for example, the card number provided in consumer enrollment information 1072). The credit card authorization 1078 may comprise, for example, a merchant check or the like. Enrollment computer may also send fleet card authorization 1080 to tell a fleet card company to issue card to the consumer, including, for example, a casino identifier or name, and expiration date. Fleet card authorization 1080 may be a file designed to be communicated to a fleet card computer via FTP, etc.

Enrollment computer may then receive fleet card information 1084 comprising, for example, the fleet card number or other information related to the fleet card issued to the consumer. Enrollment computer may then send account establishment information 1082 to account manager computer to establish an account for the consumer where the account establishment information 1020 may comprise an identifier for the consumer such as a social security number, name, a fleet card number, etc. and related information to be associated with the identifier such as a social security number, name, fleet card number, credit card number, virtual reserve (number of protected gallons), location or name of casino, class of participation in the rewards program, etc.

Account manager computer 1020 may be configured to establish, store, access, manage, update and provide information related to accounts corresponding to consumers. Accounts may be established based upon account establishment information 1082. Account manager computer 1020 may transform such account establishment information to store account data associated with a consumer in account data store 1022. Account manager computer 1020 may update accounts stored in account data store 1022 based on account update information 1088 or account update information 1060 and return account information 1090, 1098 based upon a received account information request 1086.

Specifically, in one embodiment, account manager computer 1020 may be configured to establish an account in response to receiving account establishment information 1082 which may comprise an instruction to establish an account for a consumer where the account establishment information 1020 may comprise an identifier for the consumer such as a social security number, name, fleet card number, etc and related information to be associated with the identifier such as a social security number, name, fleet card number, credit card number, virtual reserve (number of protected gallons), location or name of casino, class of participation in the rewards program, number of reward "points," etc.

Account manager computer 1020 may transform at least a portion of account establishment information 1082 to produce an account configure to be stored in account data store 1022, where the account may comprise an identifier for the consumer and associated information such as social security number, name, fleet card number, credit card number, virtual reserve (number of protected gallons), location or name of casino, class of participation in the rewards program, number of reward "points," etc. At least some of the account data may be stored in an encrypted form in account data store 1022.

Furthermore, account manager computer 1020 may be configured to update an account based upon account update information 1088 or account update information 1060 which may comprise an identifier corresponding to a consumer whose account it is desired to update and an instruction identifying the account data to be updated and how the account data is to be updated. To illustrate, a consumer may obtain rewards (for example "points" or the like) through use of the casino or its affiliates (gambling, dining, drinking, etc.). These earned rewards may be communicated through an interface provided by interface provider computer 1010 as account update information 1054. Thus, when such account update information 1054 is provided to interface provided computer 1010 it may be transformed and provided to account manager computer 1020. Account manager computer 1020 may in turn, update the account in account data store 1022 associated with consumer according to the account update information (in this example by adding the number of reward points to a number of reward points associated with the consumer's account.).

In another example, interface provider computer 1010 may provide an interface through which a consumer may manage his rewards account by applying accumulated rewards (referred to herein as "points" and which are accumulated through gambling or other use of a casino) to obtaining a number of price protected gallons of fuel (for example, adding to a consumer's virtual tank). Thus, when such account update information 1054 is provided to interface provided computer 1010 it may be transformed and provided to account manager computer 1020. Account manager computer 1020 may in turn, update the account in account data store 1022 associated with consumer according to the account update information (in this example by deducting the number of utilized reward points from the a number of reward points associated with the consumer's account and adding a corresponding number of gallons to the consumer's virtual reserve.).

Account update information 588 from purchase processing computer 1030 may comprise an account identifier and an instruction to deduct a certain amount of gallons from the virtual reserve or a certain number of points from accumulated reward points corresponding to the account associated with that identifier, record a purchase transaction in association with the account, etc. In response to receiving such account update information 1088 the account manager computer may obtain account data corresponding to the identifier from the account data store 1022, transform the account data according to the instruction on how the account data is to be updated and stored the updated account in account data store 1022.

Account manager computer may also be configured to receive account information requests 1086 comprising one or more identifiers corresponding to accounts on which information is desired, for example an identifier for a particular consumer, a set of consumers, a participation level, a geographical region, an age group, etc. and what information from these accounts is desired. In response the account manager computer 1020 may obtain account data from the account(s) corresponding to the identifier from the account data store 1022 to provide account information 1090, 1098.

Purchase processing computer 1030 is configured to process purchases made by consumers, determine charges to be assessed to a consumer or to a program partner and determine what account information for the consumer is to be update based upon the consumer purchase. Purchaser processing computer 1030 may be configured to utilize charge determiner 1032 to determine charges to be assessed to a program provider or a consumer. Charge determiner 1032 may employ a rules engine to evaluate a purchase made by a consumer with respect to the consumer's account to determine the charges to be assessed.

In particular, in one embodiment purchase information 1092 comprising level-3 data corresponding to a consumer's purchase including the fuel grade, number of gallons, fleet card number, etc. is received at purchase processing computer 530. Purchase processing computer 1030 may determine any charges to be assessed to the program provider. Purchase processing computer may validate the purchase information for reasonableness based on a set of rules (for example, is the quantity of fuel above or below a certain amount, is the price above or below a certain amount, etc.).

Purchase processing computer 1030 will then match the purchase transaction corresponding to the purchase information 1092 to an account by issuing an account information request 1086 to account manager computer 1020 comprising an identifier for a consumer's account, where the identifier corresponds to data received in purchase information 1092. Account information 1090 matching the identifier will be received from account manager computer 1020 and comprise information regarding the consumer's account, such a protected fuel grade, program price at which the consumer is protected, reward points, participation level, number of gallons in virtual reserve, etc.

Based on the account information 1090 and purchase information 1092 charges to assess to the consumer's credit card or the program partner, if any, may be determined utilizing charge determiner 1032. Any such charges are generated as program partner charges 1094 or consumer charges 1098, where the program partner charges 1094 may be configured as a text file including a consumer identifier and a charge amount owed by the program provider while the consumer charge 1096 is a file configured to be provided to the credit card company corresponding to the credit card stored in association with consumer's account and indicating a card number and an amount to charge to the credit card.

Report generation computer 1040 is configured to generate reports based upon account information. These reports may include a consumer report 1042 for presentation to a specific consumer and program partner report 1044 from a program partner. More specifically, in one embodiment, report generation computer 1040 may be configured to receive report request 1046 comprising an indication of a type of report to be generated and any associated data, such as a particular consumer, set of consumers, geographical area or other parameters corresponding to a desired report.

Accordingly, report generation computer 1040 may issue an account information request 1086 comprising a request for account information to generate the report corresponding to report request 1046 such as account information pertaining to one or more consumers and data related to the consumer(s) such as the number of gallons left in a consumer's virtual reserve, number of gallons purchased, number of unutilized rewards points accumulated by the consumer, price at which fuel was purchased under the incentive program, what a consumer currently owes the program partner or operator of the price protection system, etc. Report generation computer 1040 may then transform the received account information 1098 into a report responsive to the report request 546, which may include a program partner report 1044 or consumer report 1042. A program partner report 1044 may comprise data or the results of an analysis of data corresponding to the set, or some subset, of consumers participating in the incentive program offered by the program partner such as an analysis of purchase prices paid by the consumers, a rewards program participation level breakdown, a geographical breakdown of the consumers, a price and geographic break down of consumers, analysis of number of gallons left in the consumer's virtual reserve, future projections related to the consumers or almost any other type of analysis desirable. A consumer report may comprise data or the results of an analysis of data corresponding to a particular consumer including rewards data, purchase data, price protected fuel data or some combination.

After reading the above it should be noted that each of account manager computer 1020, purchase processing computer 1030, report generation computer 1040, enrollment computer 1050 and interface provider computer 1010 may be a computing device with a processor and a memory. Furthermore, in some embodiments the memory of one or more of these computers may store a set of instructions configured to implement a module for accomplishing at least a portion of the functionality associated with that computer. For example, account manager computer 1020 may comprise a memory having instructions stored thereon, where the instructions comprise an account manager module configured to implement at least a portion of the functionality associated with account manager computer 1020. Similarly, purchase processing computer 1030 may comprise a memory storing a purchase processing module (which may include a charge determiner module), report generation computer 1040 may comprise a memory storing a report generation module, enrollment computer 1050 may comprise a memory storing an enrollment module and interface provider computer 1010 may comprise a memory storing a interface provider module.

In addition to performing the specific functionality and transformations discussed, each of account manager computer 1020, purchase processing computer, report generation computer 1040, enrollment computer 1050 and interface provider computer 1010 may be a general purpose computer of the type known in the art having a central processing unit ("CPU"), at least one read-only memory ("ROM"), at least one random access memory ("RAM"), at least one hard drive ("HD"), or one or more input/output ("I/O") device(s). Furthermore, it will be realized that although account manager computer 1020, purchase processing computer 1030, report generation computer 1040, enrollment computer 1050 and interface provider computer 1010 are depicted as separate computers, the functionality described with respect to these computers may be combined into one or more computers, including one or more general purpose computers. In such embodiments it will also be noted that the functionality of one or more of any modules implemented on memories of account manager computer 1020, purchase processing computer 1030, report generation computer 1040, enrollment computer 1050 and interface provider computer 1010 may also be combined. While the descriptions of the various computers, memories and modules in the preceding paragraphs are described with respect to FIG. 10 it will be apparent that these descriptions may apply equally well to other embodiments, whether explicitly described herein or not.

Figure 11A:
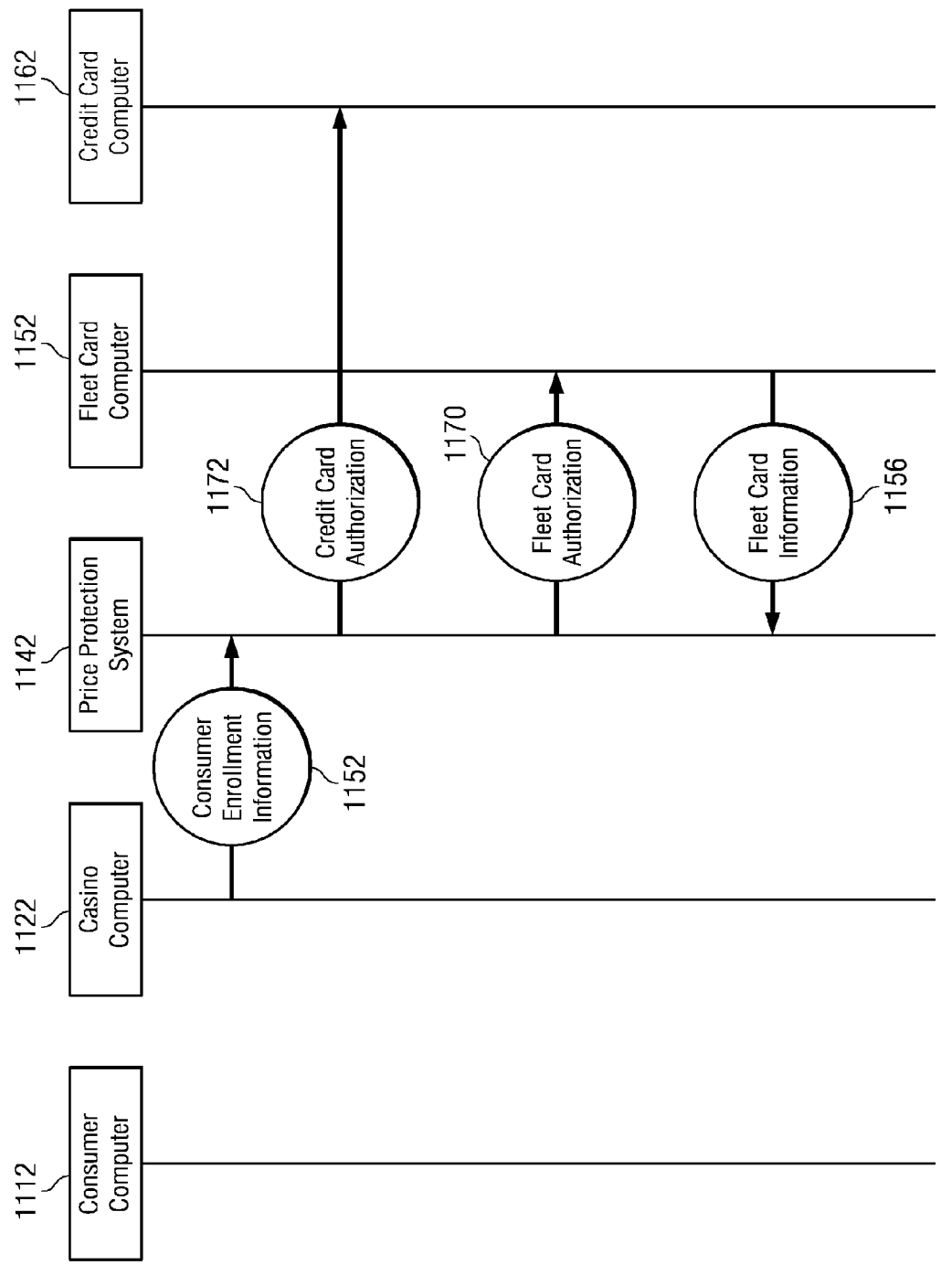
FIG. 11A is a block diagram illustrating one embodiment of an information flow utilizing a price protection system.

Moving to FIGS. 11A and 11B, one embodiment of a method, and associated information flow, for a process of enrolling a consumer in a rewards program related to fuel purchasing offered by a casino utilizing a price protection system is depicted. Referring conjointly to FIGS. 11A and 11B, at step 1110 a consumer may decide to enroll in a rewards program offered by a casino in which the consumer gambles. The rewards program may allow a consumer to obtain price protection with respect to the purchase of fuel and may be offered, for example, at casinos which depend heavily on drive-in customers. Such a rewards program may, for example, allow the consumer to accumulate rewards points based upon activities associated with the casino or its partners such as gambling, dining, attending shows or the like. By exchanging these reward points for price protected gallons of fuel a consumer may provided with the ability to pay no more than a program price for fuel for a certain time period associated with those price protected gallons and may additionally be provided a fixed discount off the price of fuel if the price is below the program price.

Accordingly, the casino may provide enrollment information concerning the consumer to the price protection system responsible for implementing at least a portion of the rewards program in conjunction with its program partner the casino such that the enrollment information is received at the price protection system at step 1120. This step may entail the casino obtaining from the consumer, and entering, information such as the consumer's name, address, participation level, casino information, program information, email address and information on a credit card such as the card number, expiration date, name on the card, CCV2 security code, etc. into casino computer 1020. This consumer enrollment information 1052 is then communicated to, and received by price protection system 1042. The entry or communication may be accomplished, for example, using an interface provided by price protection system 1042 such as one or more web pages, FTP locations, etc. In other embodiment, a consumer may enroll directly in a rewards program offered by the casino such that consumer enrollment information may be entered from consumer computer 1012 using an interface provided by price protection system 1042.

Pre-authorization for the credit card provided in the consumer enrollment information 1052, as is known in the art, may be obtained at step 1130 by sending credit card authorization request 1072 from price protection system 1142 to credit card computer 1162. Once pre-authorization for the credit card is obtained an identification or payment mechanism such as a fleet card may be issued to the consumer enrolling in the program at step 1170 by sending fleet card authorization 1070 from price protection system 1142 to fleet card computer 1152. This fleet card authorization 1070 may comprise any information needed by a fleet card company to issue a card and may include such information as a name, casino operator, an expiration date (of the incentive program, the card, etc.), etc. Fleet card information 1056, including the assigned number, expiration etc. may be returned from fleet card computer 1152 to price protection system 1142. The fleet card itself may then be sent from the operators of fleet card computer 1152 to the consumer via mail.

At step 1150, then an account may be established for the consumer, including, for example, an identifier for the consumer, data corresponding to the consumer's credit card, data corresponding to the fleet card issued to the consumer, a number of rewards points earned by the consumer, a virtual tank storing the amount or allotment of fuel the consumer is currently eligible to purchase under the program and one or more associated program prices each program price associated with a portion of the amount represent by the virtual tank, or any other type of information which it may be desired to keep or which may be useful in implementing the program.

If desired, at step 1160, a hedge or other form of price protection may be obtained by the casino, the operators of the price protection system or both. Whether, who, and what type of, hedge is obtained may vary based on the financial arrangements between of operators of the price protection system and the casino operators. For example, in one embodiment casino operators may pay a fee to operators of price protection system for implementing such a rewards program. However, in cases such as these the casino operators may take on the risk associated with the price of fuel going above the program price associated with the incentive program provided to the consumer. Here, the casino operator may choose to obtain a hedge against such a risk, either in the market or by purchasing one or more products from a financial institutions designed to at least partially protect the casino operators against such risk. Alternatively, casino operators may, in addition to paying operators of price protection system for the provisioning of the rewards program also pay operators of the price protection system for one or more products designed to protect the casino operators against the risk of increased fuel prices. In this case, operators of price protection system may themselves desire to obtain a hedge against their risk by, in one embodiment, purchasing a product from a financial institution to protect them from such risk or by hedging their risk directly in one or more markets. It will be apparent from the above description that the scenarios depicted are exemplary only and that other arrangements of payments and hedging will be possible and may depend on the type and amount of risk borne by various parties involved in the provisioning and implementation of such a rewards program.

Figure 12A:
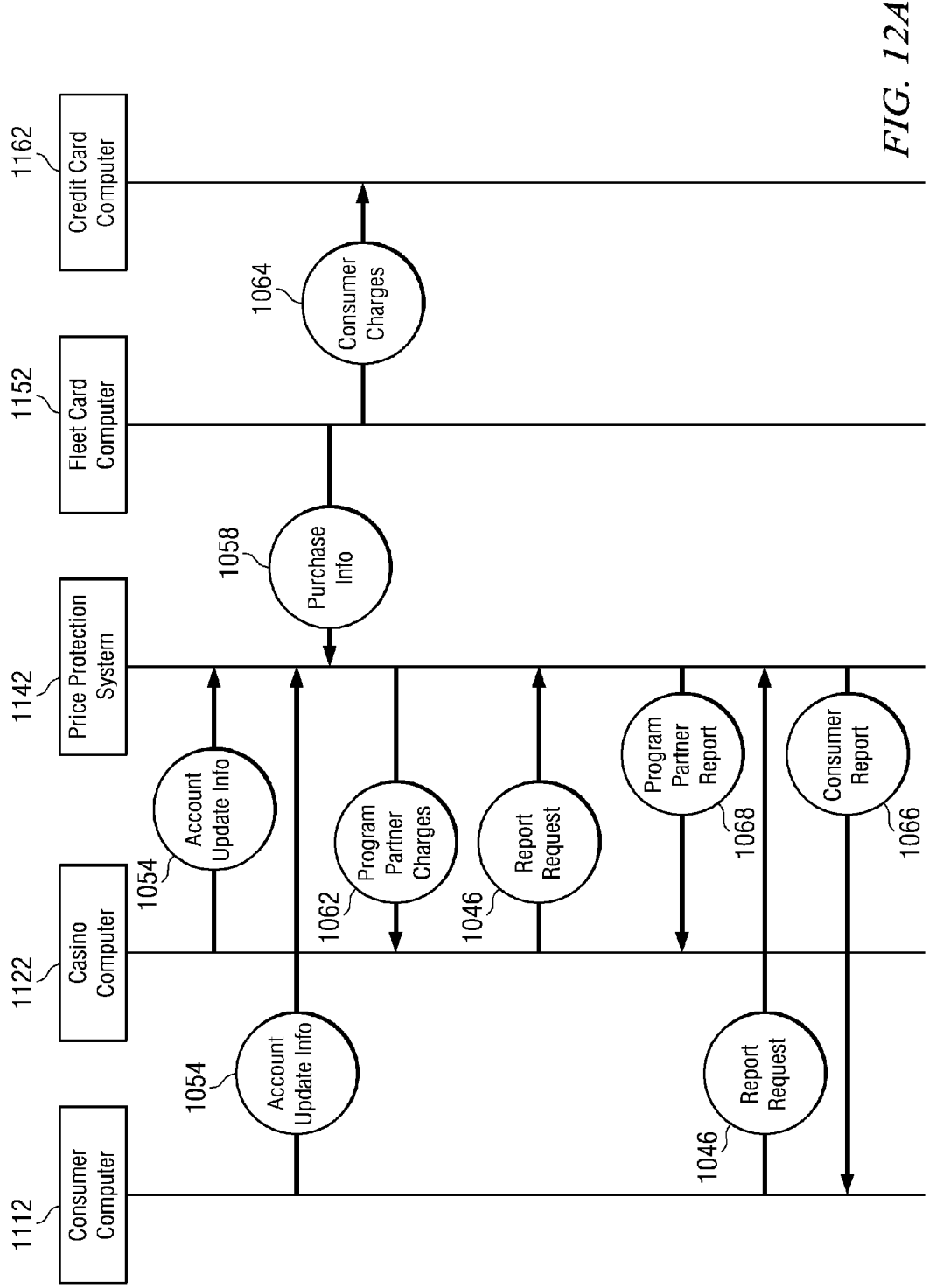
FIG. 12A is a block diagram illustrating one embodiment of an information flow utilizing a price protection system.
Figure 12B:
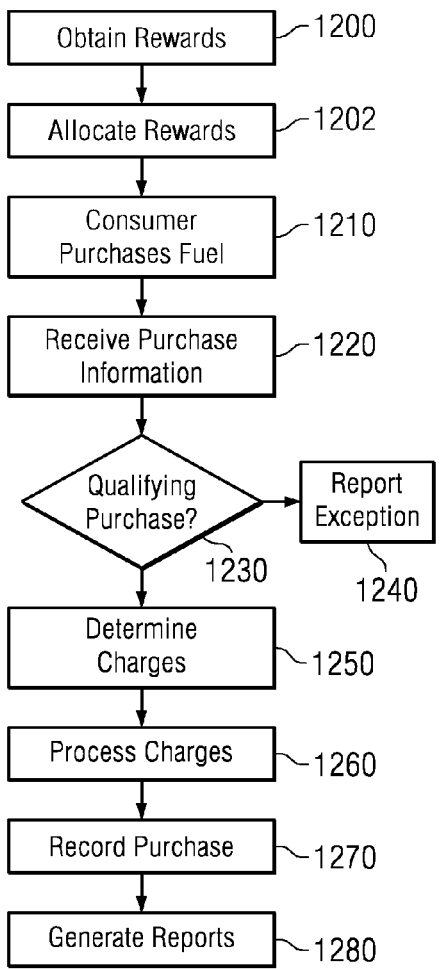
FIG. 12B is a flow diagram illustrating one embodiment of a purchase involving a price protection system.

Continuing on now to FIGS. 12A and 12B a method and associated information flow for a process of processing a transaction according to an rewards program offered in tandem with casino operators where the rewards may relate to fuel purchasing is depicted. Referring conjointly to FIGS. 12A and 12B, a consumer enrolled in a rewards program offered in tandem with a casino may obtain rewards at step 1202. These rewards may be obtained through, for example, gambling or other use of facilities affiliated with the casino or casino operators. The amount of points awarded may be dependent on a wide variety of factors including such things as amount spent, nights stayed, time of playing, time of year, desire of casino operators to provide an incentive to consumers, etc.

Accordingly, account update information 1054 may be sent from casino computer 1122 to price protection system 1142 through an interface provided by price protection system 642 where account update information 1054 may include an identifier for a consumer and a number of points to add to the consumer's accumulated reward points stored in the consumers account. Based upon the account update information price protection system 1142 may then update the consumer's account with the indicated number of obtained points.

A consumer may decide, at some point, to allocate his rewards at step 1212. The allocation of a consumer's rewards may comprise the consumer indicating that he would like a certain number of points to be utilized to obtain price protected gallons of fuel (in other words that his reward point be utilized to increase the amount in his virtual reserve or used to lower the program price associated with at least some of the amount of fuel currently represented by his virtual tank.).

To that end, price protection system 1142 may present an interface where a consumer may manage his rewards including displaying to the consumer his currently accumulated rewards and a representation of his virtual tank. The consumer may then be allowed to allocate his rewards in a variety of ways utilizing the interface, including obtaining price protected fuel at a program price, where the amount of price protected fuel and the associated program price may vary based upon the number of reward points utilized. Account update information 1054 having an identifier for the consumer and an indication of how to allocate at least a portion of the consumer's rewards points may thus be received at price protection computer 1142 through such an interface and the consumer's account updated accordingly. It will be noted that though obtain rewards step 1202 and allocate rewards step 1212 are depicted once these may be occur substantially continuously during a consumer enrollment in, or use of, such a rewards program.

During such a rewards program, then, a consumer may purchase fuel using the fleet card provided in association with the rewards program at step 1210. Thus, when this purchase occurs, or at some later point, fleet card computer 1152 may receive point of sale (POS) data from the fuel vendor (for example, a computer associated with a retail point of sale location, etc.). This POS data may comprise what is known as level-3 transaction data pertaining to the purchase.

At step 1220 this purchase information 1038 may be communicated from fleet card computer 1152 to price protection system 1142. Specifically, the fleet card computer may determine that the purchase was made by a consumer enrolled in a rewards program (for example, using the fleet card number provided in the transaction data) and thus send the purchase information 1038 to the price protection system 1142. The purchase information 1038 may be in a batch file comprising transaction data from multiple purchases by multiple consumers enrolled in such a rewards program.

It can then be determined at step 1230 whether the purchase qualifies under the rewards program. This determination may be made using a variety of criteria such as whether certain data is outside certain ranges (for example, price too high/low, quantity too high/low), whether the transaction data corresponds to a consumer or a wide variety of other qualification parameters which may be noted from a review of this disclosure. If the purchase does not qualify the purchase may be reported as an exception (for example, to a provider of the fleet card) at step 1240.

If the purchase does qualify, charges corresponding to the purchase by the consumer may be determined at step 1250. In one embodiment, this determination is made by applying a set of rules corresponding to the rewards program in which the consumer is enrolled to the purchase. Applying these rules may, for example entail determining if the consumer is over a gallon limit (for example, how man gallons the consumer has left in his virtual reserve) and if the consumer is over the limit charging the consumer the retail price at the pump or automatically deducting a number of reward points from the consumer's account, determining if the fuel purchased is of the grade corresponding to the rewards program (for example, regular versus premium, etc.), determining if the price is above any of the program prices associated with consumer's virtual reserve and thus whether to apply a fixed discount to the purchase price, etc. It will be apparent that a whole host of other or different rule may be applied and the specific rules applied in any embodiment may vary depending on the type of rewards program implemented. Additionally, if the casino operator has purchased price protection from operators of the price protection system additional or different rules which incorporate the terms of the obtained price protection may also be utilized to determine any charges.

From the application of the rules then charges to be paid by the consumer and the casino operator may be determined (where either or both of these charges may be zero) and then processed at step 1260. The processing of these charges may, in one embodiment, entail sending consumer charges 1064 from price protection system 1142 to credit card computer 1162 where consumer charge 1064 may identify the consumer's credit card and an amount to be charged to that credit card and the entity (operators of price protection system 1142) who is placing the charge on the card. Similarly program partner (in this case the casino operators) charges 1062 may be sent from price protection computer 1142 to casino computer 1122 where the program partner charges may detail the charges owed by the casino operator to the providers of price protection system 1142 under this purchase. Details of this purchase transaction may then be recorded in conjunction with the consumer's account or another location at step 1270.

Reports corresponding to this purchase, a consumer, the casino operator, the rewards program or some other criteria may then be generated at step 1280. Consumer report 1066 or program partner report 1068 may be generated in response to a received report request 1046 issued through an interface provided by price protection system 1142 or may be automatically generated once or on a periodic basis. In one embodiment, a report for a consumer 1066 may be generated and sent to a consumer computer 1112 through an interface presented by price protection system 1142 and utilized by a consumer to interact with price protection system 1142 to access, manage, update or perform other actions with respect to the rewards program in which they are enrolled and their account under the incentive program. Consumer report 1066 may comprise a list of the consumers purchases, charges, virtual tank (for example, a representation of an amount of protected gallons remaining under the incentive program), one or more program prices associated with virtual tank, an amount of accumulated or utilized reward points, pump price for each transaction, savings on each purchase, etc. A program partner report 1068 may also be generated for the manufacturer. This program partner report may, for example, include purchase transaction or other data related to the rewards program where such data may be broken down by one or more criteria such as geographical location, cost, participation level, amount, vehicle type, etc. and which may be presented in a variety of formats, including textually or graphically.

It will be noted that the above examples of consumer reports 1066 and program partner reports 1068 are examples only and that a wide variety of other data may be presented, criteria utilized to create these reports, etc., that such reports may be generated at the behest of consumers or manufacturers and that such reports may be presented using a variety of formats and technologies, including through interfaces such as web pages accessed through consumer computer 1112 or manufacturer computer 1122 or via other methodologies such as mailing such reports.

It should also be noted that though the above embodiment is described with respect to a price protection system which provides for both implementation of a rewards program and a price protection program other embodiments of price protection system may be equally well utilized in the case where the rewards program is implemented by an entity or computer separate from price protection system and such embodiments are covered in the scope of this disclosure.

Again, while embodiments of the present invention may be usefully employed in the provisioning of incentive or rewards programs related to the purchase of goods or service, other embodiments may also be usefully applied in other contexts such as in the provisioning price protection directly to those businesses which may which rent, lease or provide services related to the consumption of particular commodities, such as businesses that lease, rent or offer partial ownership in jets or other types of aircrafts such as helicopters, etc. These businesses, which include business such as Flexjet, NetJets etc., may offer the ability to use an aircraft for a fee. This fee may be almost any type of fee imaginable and may include a one type payment, periodic payments, one time or periodic payments plus a use or service charge, etc. Recently, however, as the price of fuel has increased business of this type have been forced to include to a fuel surcharge in addition to whatever payments have been required of the consumers which utilize the business. Thus, for example, if normally a consumer paid an hourly fee for the use of an aircraft, the hourly fee may be increased by a fuel surcharge, similarly, if the consumer paid a fee (one time or periodic) for a certain number of hours this consumer may be charged a fuel surcharge for each hour or mile that he flies in an aircraft. Other way for imposing such a fuel surcharge an a consumer may also be utilized.

The imposition of these fuel surcharges has resulted in a decline in the use of such businesses. Of equal concern, however, is that no matter whether a fuel surcharge is placed on a fee paid by a consumer of the business the operator of such businesses may bear some, if not all, of the risk of a rise in the price of fuel in conjunction with running that business. To elucidate, no matter what the fee arrangement between a consumer and the business, some component of the fee may be devoted to fuel costs paid conjunction with the consumers use of the good or device provided by the business whether or not that component of the fee is expressly labeled a "fuel surcharge" or not. For example, if a consumer pays an hourly fee to utilize an aircraft a portion of this hourly fee may be devoted to buying fuel for utilization of the aircraft during that hour. The calculation of the amount of this component of the fee charged to a consumer for fuel (referred to as a fuel component) may be made at a different time from the time at which the consumer actually utilizes the aircraft, during which the price of fuel may vary a great deal. If, for example, the fuel component to charge a consumer was calculated using a fuel at one price and the price of fuel subsequently goes up the fuel component charged a consumer may not actually cover the cost of fuel. Currently, the risk of increased fuel prices is borne solely by the operators of the business. Consequently, many business operators may desire to protect themselves from potential increases in the price of the fuel to allow them to lower the costs of their fees and to create greater predictability in their cost structure.

To that end, attention is directed to systems and method for allowing a business operator to obtain price protection for a corresponding commodity in conjunction with the rental or lease of a good which consumes that commodity. Specifically, embodiments of the present invention may provide the ability for business operators to charge a fee for the rental of a good where the good consumes a commodity during use and a portion of the fee charged is related to the purchasing of that commodity. Based at least upon the component of the fee devoted to that commodity the business operator may obtain or modify a price protection contract related to the commodity such that the business operator is protected from increases in the price of the commodity.

Specifically, embodiments of the present invention may provide the ability for operators of an aircraft rental operation to obtain a price protection contract for the purchase of fuel based upon a fee charged to utilize the business. More particularly, in one embodiment each client of the aircraft rental business may pay a fee to use an aircraft operated by the aircraft rental business. Based upon the fee(s) paid by one or more of the clients of the aircraft rental business or some other criteria the operators of the aircraft rental business may obtain a price protection contract, where the terms of the price protection contract may cover some or all of the risk related to the use of fuel by the aircraft rental business during a particular time period. When the business operator purchases fuel under the price protection contract during that time period settlement may be made between the business operator, the fuel or the providers of the price protection contract based upon a price at which the fuel was purchased and the obtained price protection contract.

Before delving into the details of these various embodiments it may be helpful to give an overview of an embodiment of the present invention with respect to the embodiment of a topology described above in FIG. 2, again using the example commodity of fuel in conjunction with the rental of an aircraft. Program provider (in this case an aircraft rental business) 180 may charge clients a certain fee for the use of their aircraft, where, as discussed above the fee may be charged based upon almost any business proposition desired: a onetime fee with so many hours of use attached, a membership fee plus a per hour fee, a membership fee plus a per mile fee or almost any other fee arrangement possible. As in most cases the fee charged to a client of the aircraft rental business may include some fuel component (a portion of the fee charged by the aircraft rental business 180 to a client intended to cover fuel costs associated with the client's use of an aircraft, where the fuel component may be expressly designated as a fuel component (for example, a "fuel surcharge" component of a fee) or may be incorporated into the fee charged unbeknownst to the client), the aircraft rental business 180 is taking on a degree of risk with respect to the client's use of the aircraft as the cost of fuel may increase between calculation or payment of the fee (and the fuel component) and the purchase of fuel for the client's actual use of an aircraft. Thus, these aircraft rental businesses may themselves wish to obtain some protection from future increases in the price of fuel to increase predictability of future fuel costs and better calculate the fees to charge clients. To accomplish this, operators of aircraft rental businesses may access price protection system 120 to obtain price protection contracts pertaining to fuel, where the terms of the obtained price protection contract may be based upon a fee charged to a client or the fuel component of such a fee.

Numerous advantages may be obtained through the use of embodiments such as these. More specifically, by purchasing such price protection contracts in conjunction with these incentives the aircraft rental business will accurately be able to price the cost of the fees charged and obtain the benefit of decreases in the price of a commodity while mitigating the risk of increases in these prices. Aircraft rental business 180 may additionally benefit as operators of price protection system 120 may have an extant infrastructure which may be used to implement such price protection contracts without additional involvement by the aircraft rental business 180. Clients of the aircraft rental business may benefit as any fees to them which are involved with obtaining price protection or fuel purchases in conjunction with the use of an aircraft may be rolled into the fees charged to them.

Figure 13:
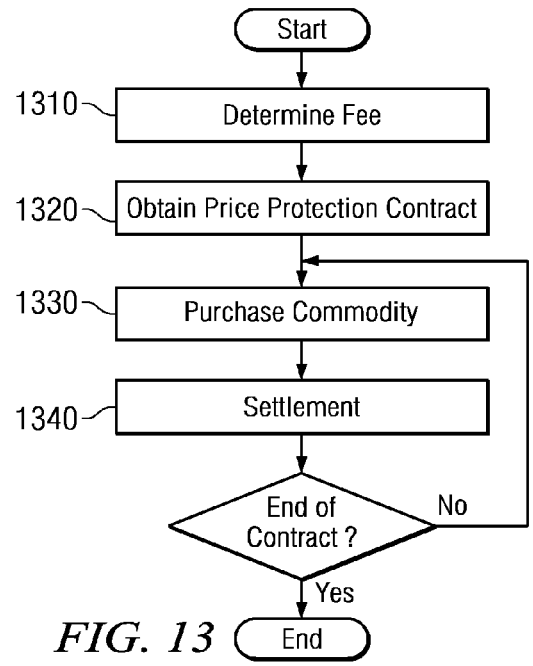
FIG. 13 is a flow diagram illustrating one embodiment of a method for the provisioning of price protection contracts in conjunction with the rental or leasing of a good.

IN FIG. 13 one embodiment for a method of obtaining a price protection in conjunction with the rental of a good is presented. At step 1310 a fee may be determined and charged to a client of the rental business in conjunction with the client's use of the rented good. In particular, this fee may include an implicit or explicit associated commodity component intended to be utilized to cover or otherwise pay for the use of a particular commodity in conjunction with the use of the rented good. In conjunction with the charging of this fee then, at step 1320 the rental business may obtain a price protection contract with a certain set of terms based upon the fee or the associated commodity component charged to the client or other criteria such as anticipated commodity usage during a time period, etc. It will be noted that the price protection contract obtained may be obtained based upon the fee or associated commodity component charged to multiple clients, the anticipated commodity usage by one or more clients, or any other type of analysis made by the rental business.

During a time period specified by the price protection contract then, at step 1330 when the rental business purchases the commodity covered by the price protection contract a settlement between the rental business and the providers of the price protection contract may take place at step 1340, where the terms of the settlement between the rental business and the provider may be based upon a price associated with the commodity purchased, the set of terms associated with corresponding price protection contract or any other business arrangements made between the rental business and the operators of the price protection system.

Figure 14:
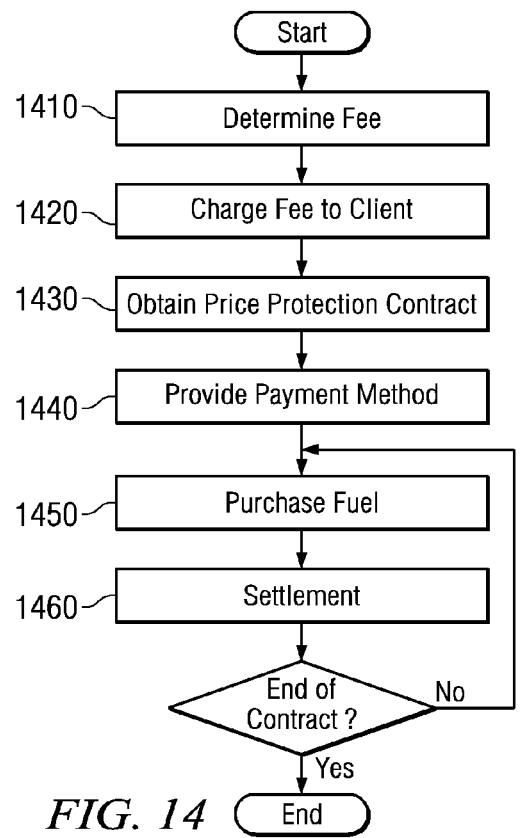
FIG. 14 is a flow diagram illustrating one embodiment of a method for the provisioning of price protection contracts for fuel in conjunction with an aircraft rental business.

As discussed above, certain embodiments of the present invention may be particularly useful with respect to obtaining price protection for fuel in conjunction with an aircraft rental business. It may be useful here to delve into more detail with respect to these types of embodiments. With that in mind attention is now directed to FIG. 14 which depicts one embodiment for a method of providing or obtaining price protection for fuel in conjunction with an aircraft rental business.

At step 1410 a fee to charge a client is determined by an aircraft rental business. This fee may be determined based upon a variety of factors such as the client's membership level, anticipated use of aircraft, type of aircraft the client wishes to use, timing at which fees are imposed, etc. The determined the fee may also include an implicit or explicit fuel component intended to be utilized to cover or otherwise pay for the purchase of fuel in conjunction with the client's anticipated usage of aircraft. This fee can then be charged to the client by the aircraft rental business at step 1420

As the clients of the aircraft rental business may have obtained the right to use an aircraft for a certain amount of time, distance etc. by paying the fee, where this right of usage include the fuel used by the aircraft during this use, after charging fees to one or more clients, the aircraft rental business 180 may desire to obtain protection against increases in the price of fuel. Thus, at step 1430 the aircraft rental business may obtain a price protection contract with a certain set of terms. The terms of the desired price protection contract may be based on a variety of factors, including the fees charged to one or more clients, anticipated usage, type of aircraft owned, geographical area in which the aircraft may be utilized or almost any other criteria.

The pricing of the price protection contract provided to the aircraft rental business by the operators of price protection system may be determined based upon a forward projection of the price of fuel and a number of other factors. Such price protection may be provided through the application of risk management tools and mechanisms including, but not limited to, swaps (financial contracts that provide the obligation to buy or sell at a fixed and/or defined floating price), options (providing the right but not the obligation to buy or sell) and combinations of these such as swaptions (the right but not the obligation to buy or sell a swap at a specific point in the future). While such risk management tools may be transparent to the ultimate end user, they would likely form the basis for the relationship between and among the parties discussed and elaborated on herein.

In conjunction with providing the fuel incentive program to the purchaser, a payment method may be provided to the aircraft rental business at step 1440 such that transactions (for example, at retail point of sale locations) under the obtained provided price protection contract. This payment method may be a credit card provided by credit card company or another type of identification mechanism such as a fleet card. The payment mechanism may be associated with the purchaser and the price protection contract provided to the aircraft rental business and may also be branded in conjunction with providers of price protection contracts, aircraft rental business, suppliers of retail point of sale locations, etc. or co-branded in some manner.

During the time period associated with obtained price protection contract then (for example, a time period which may be a term of the obtained price protection contract) the operators of aircraft rental business may purchase fuel at step 1450 using the payment methodology provided by the operators of the price protection system. A settlement between the operators of the airline rental business and the providers of the price protection contract may then take place at step 1460, where the settlement between the operators of the airline rental business and the provider may be based upon a price associated with the fuel purchase, the sets of terms associated with the corresponding price protection contract, another business arrangement between the operators of the aircraft rental business and the operators of price protection system, etc.

While embodiments of the present invention may be utilized in provisioning price protection to businesses which may which rent, lease or provide services related to the consumption of particular commodities, other embodiments may also be usefully applied in other contexts such as in conjunction with the providing of benefits programs to employees, where the benefit program is related to the purchase of a commodity. More specifically, as the transitive nature of the composition of communities has increased in recent years, it is increasingly common for both employers and employees to move locations, and for employees to move around within the same community for a variety of reasons, such as to live in a more desirable area, buy a bigger house, enroll their children in better schools, etc. The transience of both employee and employer has resulted, in many cases, in employees living at some distance from an employer or prospective employer. While employers still desire to hire the most qualified or most desirable candidates for a job, irrespective of the distance the employee lives from the employer, the employees cannot be so sanguine about this situation. As the price of fuel continuously rises, and the mass transportation facilities in many urban areas continue to be woefully inadequate, monetary concerns regarding the cost of commuting to a potential employer may force a potential employee to refuse an otherwise desirable job opportunity or to resign from an otherwise satisfactory job.

To remedy this situation then, employees may desire to offer a fuel program to an employee to help defray the cost of the employee commuting to the employer's site. This fuel program may be disclosed to desirable potential employees to help incentivize these employees to accept a position with the employer, may be provided as a reward to employees, etc. These programs may involve providing a quantity of fixed price fuel for a fixed amount of time (for example, $2.50 a gallon gas for one year), a fixed discount of off the retail price of fuel (for example, $0.60 of the retail price of purchased fuel) for a certain quantity of fuel, free fuel for a certain amount of time (for example, free fuel for a year) or a free quantity of fuel (for example, free 500 gallons), or some other program related to the employee's purchase of fuel whereby the consumer is alleviated of some of the burden or risk associated with the purchase of fuel.

Accordingly, there is a need for systems and methods for commodity purchasing which allow employers to protect an employee against variability in the price of a commodity by allowing the employee to obtain price protection against adverse fluctuations in the price of a commodity in conjunction with providing a benefits program related to that commodity to an employee.

To that end, attention is directed to systems and method for allowing an employer to obtain price protection for a corresponding commodity in association with the provisioning of an incentive program related to that commodity in conjunction with the purchase of a good. Specifically, embodiments of the present invention may provide the ability for employers to provide an incentive program for the purchase of a good, where the program is related to the employee's consumption of a commodity. Based upon the provisioning of the incentive program the employer may obtain a price protection contract related to the commodity such that the employer is protected from increases in the price of the commodity when provisioning the incentive program.

Specifically, embodiments of the present invention may provide the ability for employers to obtain a price protection contract for the purchase of fuel based upon a fuel program offered to their employees where the fuel program for an employee may have a certain set of terms. In such instances, an employer may utilize the expertise of operators of a price protection system, the functionality of a price protection system, the relationships operators of price protection system may have with other entities (for example, a credit card company, a financial institution, an identification mechanism company, etc.), etc. to implement at least a portion of the incentive program offered by the employer.

Additionally, in conjunction with the implementation of such an benefits program or the obtaining of price protection in conjunction with such an incentive program, the employer, the operators of a price protection system, or both, may hedge their position in the market place by directly buying or selling options or futures contracts in one or more markets or by themselves obtaining protection against an increase in the price of fuel from a third party (for example, a financial institution) by paying an insurance cost such that that they are indemnified for any amount paid for fuel at a price above the strike price.

Before delving into the details of various embodiments of the present invention it may be helpful to give an overview of an embodiment of the present invention with respect to the embodiment of a topology described above with respect to FIG. 2, using the example commodity of fuel in conjunction with providing a benefits program to an employee.

When an employee is hired, or it is otherwise desired to provide such a program to an existing employee, a fuel program to provide to the employee may be determined. This fuel program may be similar for each employee or may be tailored to each specific employee and may be determined based upon a variety of criteria, such as the model and manufacturer of the car driven by the employee (which may have associated mileage figures), the distance the employee lives from employer, the cost of gas in a geographic area, the type or level of the employee, or almost any other criteria desired.

No matter the actual fuel program provided to the employee, as in most cases the fuel program involves providing fuel to an employee at a certain cost or a fixed discount, the employer is taking on a degree of risk with respect to the provisioning of these fuel programs, as the cost of fuel may increase. Thus, these employers may themselves wish to obtain some protection from future increases in the price of fuel to increase predictability of future fuel costs in order to, for example, better calculate the cost of providing such fuel programs to employers. Employers may choose to hedge directly in one or more markets. Additionally or alternatively, employers may access a price protection system to obtain price protection contracts pertaining to fuel, where the terms of the obtained price protection contract may be based upon the benefits program provided to one or more employees.

Numerous advantages may be obtained through the use of embodiments such as these. More specifically, employers may provide a wide variety of fuel benefits programs to their employees and associate those fuel benefits programs with slogans or other branding which may increase their exposure. In addition, by purchasing such price protection contracts in conjunction with these fuel programs the employers will accurately be able to price the cost of the various fuel programs and obtain the benefit of decreases in the price of fuel while mitigating the risk of increases in these prices. Employers may additionally benefit as operators of price protection system may have an extant infrastructure which may be used to implement such fuel programs without additional involvement by the employer.

Figure 15:
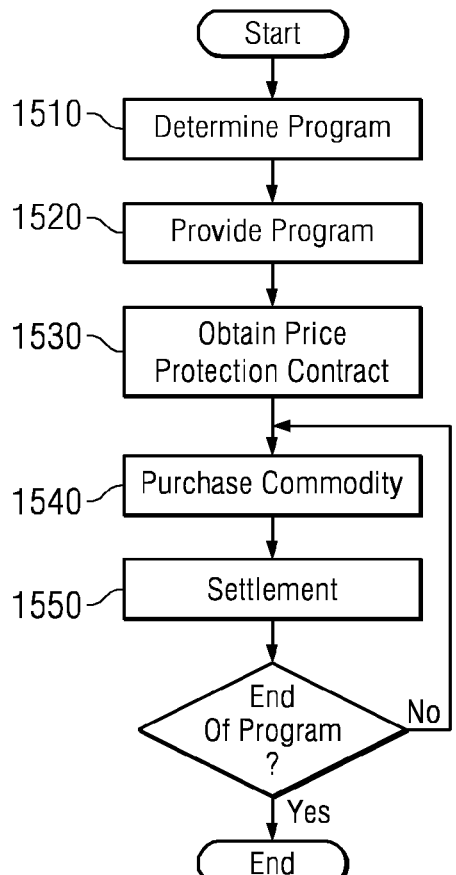
FIG. 15 is a flow diagram illustrating one embodiment of a method for the provisioning of price protection to an employee.

Moving now to FIG. 15, one embodiment for a method of providing a benefits program related to a commodity in conjunction with an employee is presented. At step 1510 a benefits program is determined by an employer, where the benefits program comprises a set of terms related to the purchase of the commodity. For example, an employee may determine a fuel program for an employee with a set of terms relating to time, price, location, etc. where the terms may be varied based on one or more factors associated with employee or employer. At step 1520, when the employer hires an employee the program may be provided to that employee. In conjunction with the provisioning of this program then, at step 1530 the employer, if desired, may obtain a price protection contract with a certain set of terms based upon the terms of the program provided to the employee. During the benefits program then, at step 1540 when the employee who was provided with the benefits program purchases the commodity covered by the program, a settlement between the employer, the operators of the price protection system or other entities involved in the transaction may take place at step 1550, where the terms of the settlement may be based upon the retail price associated with the commodity purchased, the sets of terms associated with the benefits program or any terms of any price protection obtained by the employer.

Figure 16:
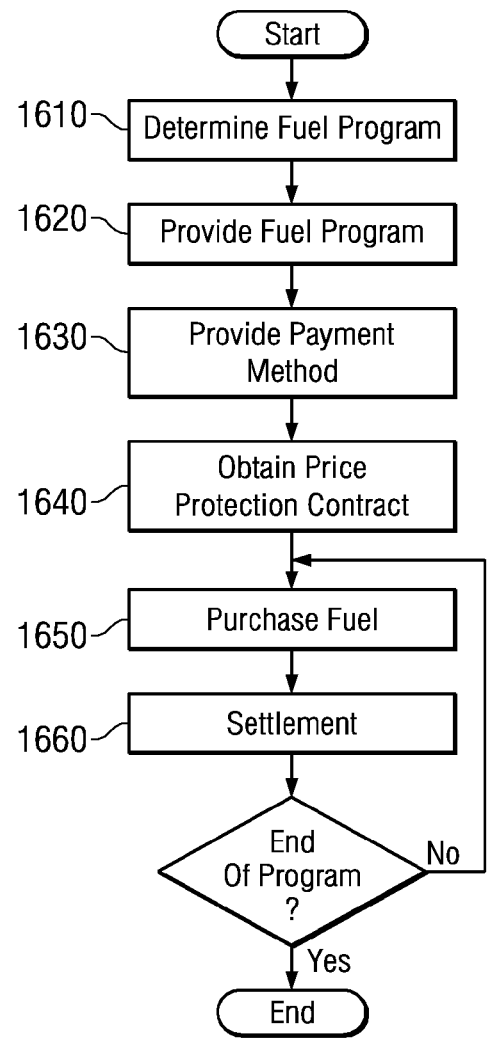
FIG. 16 is a flow diagram illustrating one embodiment of a method for the provisioning of price protection to an employee.

As discussed above, certain embodiments of the present invention may be particularly useful with respect to fuel programs offered to an employee. It may be useful here to delve into more detail with respect to these types of embodiments. With that in mind attention is now directed to FIG. 16 which depicts one embodiment for a method of providing a fuel program to an employee in conjunction with their employment.

At step 1610 a fuel benefits program to offer to an employee may be determined by the employer, where the fuel incentive program comprises a set of terms related to the future purchase or use of fuel. Such a fuel program may be particularly suitable to offer in connection with employees who live some distance from the employer or by an employer who is located a relatively greater distance from an urban area where potential employees live, etc. The fuel benefits program may be similar for each employee or may be tailored to each employee and determined based upon a variety of criteria, such as the model and manufacturer of the car driven by the employee (which may have associated mileage figures), the distance the employee lives from the employer, the cost of gas in a geographic area, the type, role, or level of the employee, employee tenure, or almost any other criteria desired.

The fuel program may, for example, provide the employee with free fuel (up to a certain quantity) for a certain time period after they accept employment, provide the employee with fuel at a set cost for a certain amount of time, provide the employee with a fixed discount for a certain quantity of fuel, some combination of these types programs, or another set of terms altogether. These fuel programs can then be offered by the employer to a potential employee to incentivize a potential employee to, for example, accept a job offer. In fact by setting price terms associated with the fuel program at a discount to current prices, all other thing being equal an employee may be provided with a powerful incentive to accept a job with the employer as the employee can be assured that their fuel budgets for commuting will not exceed a fixed cost during a certain time period, while still being given the benefit of reduction in fuel costs.

When an employee accepts a job with the employer, then, the employee is provided with the fuel program at step 1620. In conjunction with providing the fuel program to the employee, a payment method may be provided to the employee at step 1630 such that transactions (for example, at a retail point of sale locations) under the fuel incentive program may be identified and processed. This payment method may be a credit card provided by a credit card company or another type of identification mechanism (for example, a fleet card provided by an identification mechanism). The payment mechanism may be associated with the employer and the fuel incentive program provided to the employee and may also be branded in conjunction with providers of price protection contracts, employers, suppliers of retail point of sale locations or co-branded in some manner.

After providing the employee with the fuel program and the payment mechanism, the employer providing these fuel benefits programs may desire to obtain protection against increases in the price of fuel. Thus, at step 1640 the employer may obtain a price protection contract with a certain set of terms based upon the terms of the fuel incentive program provided to that employee or the fuel programs provided to a set of employees. The pricing of the price protection contract provided to the employer may be determined based upon a forward projection of the price of fuel and a number of other factors. Such fuel protection may be provided through the application of risk management tools and mechanisms including, but not limited to, swaps (financial contracts that provide the obligation to buy or sell at a fixed and/or defined floating price), options (providing the right but not the obligation to buy or sell) and combinations of these such as swaptions (the right but not the obligation to buy or sell a swap at a specific point in the future). While such risk management tools may be transparent to the ultimate end user, they would likely form the basis for the relationship between and among the parties discussed above and elaborated on herein.

During the fuel benefits program then (for example, a time period during which the fuel incentive program is in effect) the employee may purchase fuel at step 1650 using the payment methodology provided by the employer (step 1620). A settlement between the employer and the operators of the price protection contract may then take place at step 1660, where the settlement between the employer and the operators may be based upon a price associated with the fuel purchase, and the sets of terms associated with the fuel program or the corresponding price protection contract.

Figure 17A:
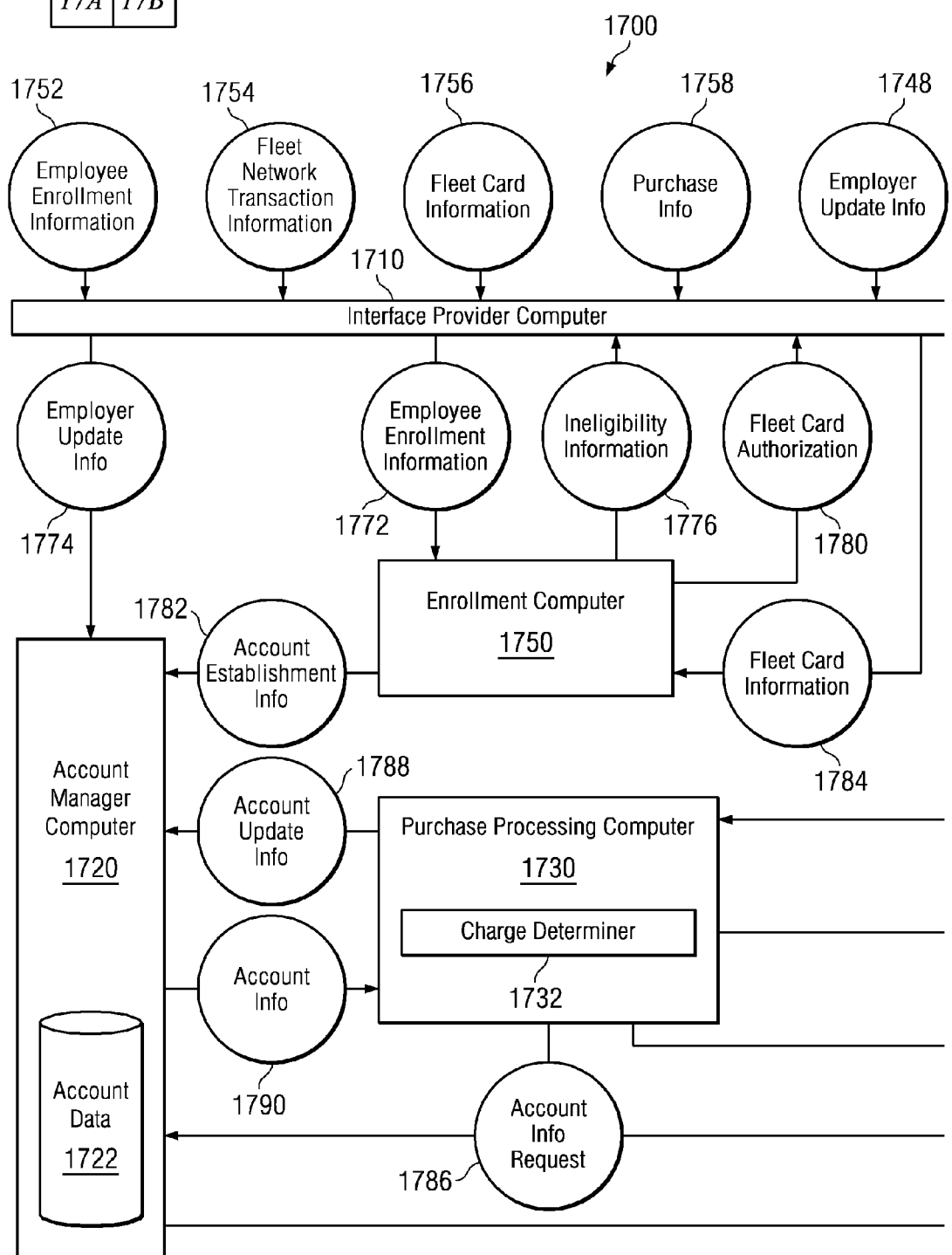
FIG. 17 is a block diagram illustrating one embodiment of a price protection system.
Figure 17B:
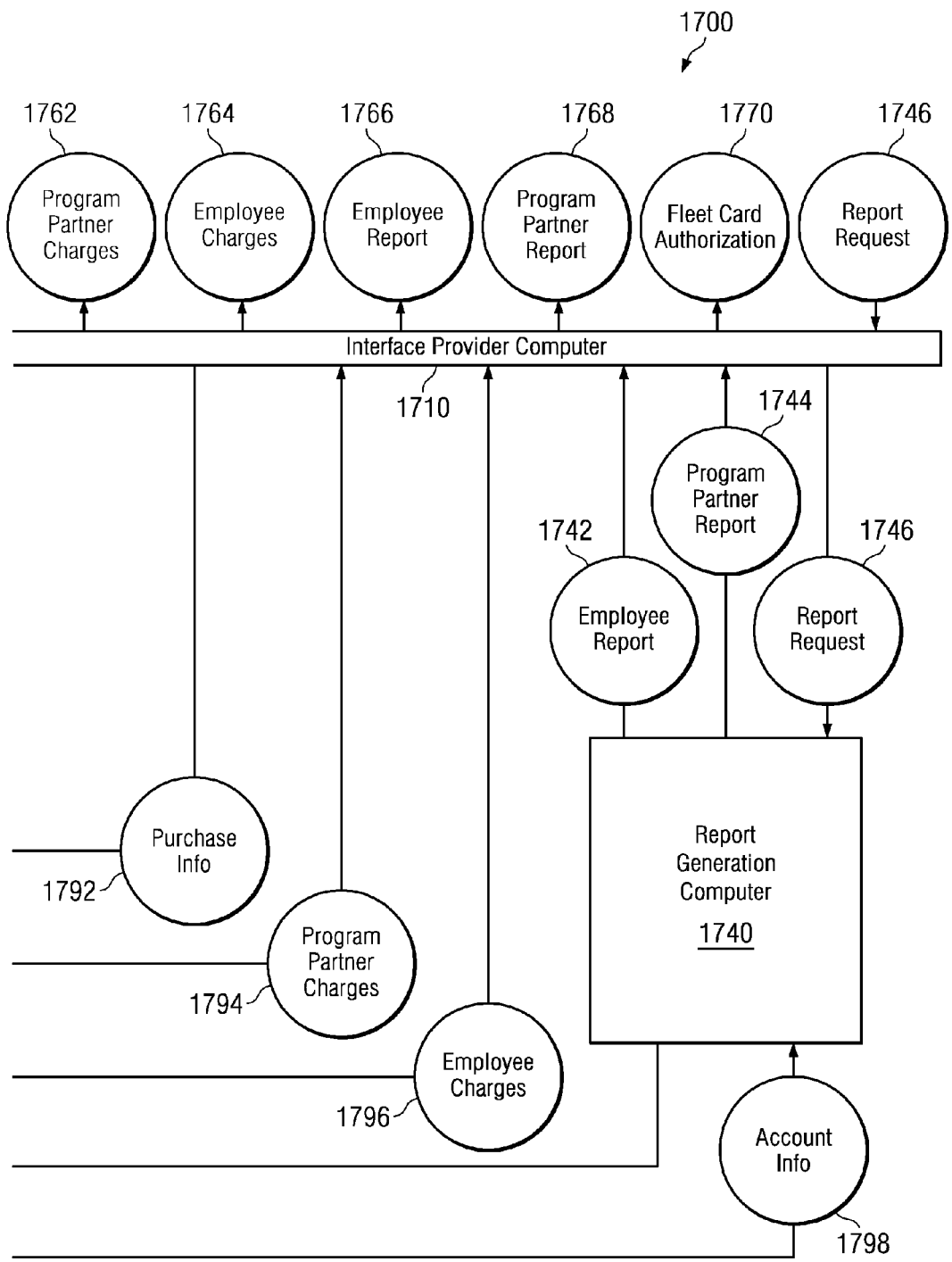

Moving now to FIG. 17, one embodiment of a price protection system configured for use in the provisioning of benefits programs to employees is depicted. Price protection system 1700 comprises an interface provider computer 1710 which is coupled to one or more other computers (not shown) and is configured to receive data from, and send data to, these other computers. This interface provider computer may be configured to communicate via one or more protocols or standards including HTTP, XML, SOAP, Web Services Definition Language (WSDL), FTP, etc. and may additionally be configured to provide one or more interfaces for interaction with price protection system 1700, including, for example, web pages, command line interfaces, database server functionality, application server functionality, web server functionality, etc.

Utilizing the interfaces and protocols according to which the interface provider computer 1710 is configured, interface provider computer is operable to receive data such as employee enrollment information 1752, fleet network transaction information 1754, fleet card information 1756, report request 1746, employer update information 1748 and purchase information 1758 from one or more computers external to price protection system 1700. Interface provider computer 1710 may be configured to transform this data according to one or more communication protocols, file formats, etc. by, for example, parsing received data to extract desired information and communicate the extracted data to one or more of enrollment computer 1750, account manager computer 1720, report generation computer 1740 or purchase processing computer 1730.

Conversely, the interface provider computer 1710 may utilize the configured protocols and interfaces to communicate data received from enrollment computer 1750, purchase processing computer 1730 or report generation computer 1740 to one or more computers external to price protection system 1700. Such data may include fleet card authorization 1780, ineligibility notification 1786, program partner charges 1794, employee charges 1796, employee report 1742 or program partner report 1744. Interface provider computer 1710 may be configured to transform the received data according to one or more communication protocols by, for example, formatting received data according to a format or protocol utilized by an external computer or integrating such data into an interface presented to an external computer such that interface provider computer can communicate ineligibility notification 1760, program partner charges 1762, employee charges 1764, employee report 1742, program partner report 1768 or fleet card authorization 1770 to the one or more external computers utilizing a format or interface utilized by the external computer.

Enrollment computer 1750 may be configured to, based upon data received from interface provider computer 1710 such as employee enrollment information 1772, determine if an employee is eligible to enroll in an benefits program provided by a program partner. If not, enrollment computer 1750 may communicate an ineligibility notification 1776 to interface provider computer 1750 to be provided, for example, back to the program partner. Otherwise, enrollment computer 1750 may communicate fleet card authorization 1780 to interface provider computer 1750. Enrollment computer 1750 may also initiate the creation of an account for the employee through the communication of account establishment information 1782 to account manager computer 1720, where determination of account establishment information 1782 is based upon a transformation of employee enrollment information 1772 or fleet card information 1782.

More particularly, in one embodiment, enrollment computer 1750 may be configured to enroll an employee in a benefits program provided by the program provider based on consumer enrollment information 1772 comprising, for example, an employee's name, social security number, employee ID, employee location, hire date, a referring employee, mailing address, phone number, security questions to be used, etc. a protected price under the benefits program (referred to as a program price), a fixed discount to be used, the type of fuel which is price protected under the incentive program, the number of gallons protected, a time period for which the benefits program is in effect, etc.

Enrollment computer may also establish an driver identifier (driver ID) to be utilized for the employee an account identifier to be utilized to identify an account for the employee, a PIN number to be utilized for the employee and send fleet card authorization 1780 to tell a fleet card company to issue a card to the employee. This fleet card authorization 1780 may include the driver, employee or account IDs and PIN number for the employee, the name of the employee, a hire date or other desired information. Fleet card authorization 1780 may be a file designed to be communicated to a fleet card computer via FTP, etc.

Enrollment computer may then receive fleet card information 1784 comprising, for example, the fleet card number or other information related to the fleet card issued to the employee including data which may have been sent in the fleet card authorization 1780 such as the driver, employee or account IDs and PIN number for the employee, the name of the employee, a hire date, etc. Enrollment computer may then send account establishment information 1782 to account manager computer 1720 to establish an account for the employee where the account establishment information 1720 may comprise an identifier for the employee such as a driver, employee or account IDs, a social security number, etc. or related information to be associated with the identifier such as terms of the benefit program corresponding to the employee, etc.

Account manager computer 1720 may be configured to establish, store, access, manage, update and provide information related to accounts corresponding to consumers. Accounts may be established based upon account establishment information 1782. Account manager computer 1720 may transform such account establishment information to store account data associated with an employee in account data store 1722. Account manager computer 1720 may update accounts stored in account data store 1722 based on account update information 1788 and return account information 1790, 1798 based upon a received account information request 1786.

Specifically, in one embodiment, account manager computer 1720 may be configured to establish an account in response to receiving account establishment information 1782 which may comprise an instruction to establish an account for a consumer where the account establishment information 1720 may comprise an identifier for the employee such as a driver, employee or account IDs, social security number, name, etc. and related information to be associated with the identifier.

Account manager computer 1720 may transform at least a portion of account establishment information 1782 to produce an account configure to be stored in account data store 1722, where the account may comprise an identifier an identifier for the employee such as a driver, employee or account IDs, social security number, name, etc. and related information to be associated with the identifier such as a virtual reserve (number of protected gallons), etc. At least some of the account data may be stored in an encrypted form in account data store 1722.

Furthermore, account manager computer 1720 may be configured to update an account based upon employer update information 1788 which may comprise an identifier corresponding to an employee whose account it is desired to update and an instruction identifying the account data to be updated and how the account data is to be updated. For example, employer update information 1774 may comprise a bonus update comprising a number of gallons, a date and an identifier associated with an employee designed to add a number of gallons to a employees virtual tank based upon the employees referral of another person hire by the employer or a regular account update comprising a number of gallons which an employer wants to place in the employees virtual tank every month, or some update to the employees account altogether, such as if an employee is transferred and the employer wishes to update an address or employer ID associated with the employee. Other types of updates are also contemplated. In response to receiving such employer update information 1774 the account manager computer 1720 may obtain account data corresponding to the identifier from the account data store 1722, transform the account data according to the instruction on how the account data is to be updated and stored the updated account in account data store 1722.

Account manager computer 1720 may also be configured to receive account information requests 1786 comprising one or more identifiers corresponding to accounts on which information is desired, for example an identifier for a particular employee, a set of employees, a geographical region, a employer location, an employee type, an age group, etc. and what information from these accounts is desired. In response the account manager computer 1720 may obtain account data from the account(s) corresponding to the identifier(s) from the account data store 1722 to provide account information 1790, 1798.

Purchase processing computer 1730 is configured to process purchases made by employees, determine charges to be assessed to a consumer or to a program partner and determine what account information for the employee is to be update based upon the employee purchase. Purchaser processing computer 1730 may be configured to utilize charge determiner 1732 to determine charges to be assessed to a program provider or an employee. Charge determiner 1732 may employ a rules engine to evaluate a purchase made by an employee with respect to the employees' account (for example, a benefit or program type, a program price or fixed discount, etc. identified in the account of the employee) to determine the charges to be assessed.

In particular, in one embodiment purchase information 1792 comprising level-3 data corresponding to an employees' purchase including the fuel grade, number of gallons, fleet card number, etc. is received at purchase processing computer 1730. Purchase processing computer 1730 may determine any charges to be assessed to the program provider. Purchase processing computer may validate the purchase information for reasonableness based on a set of rules (for example, is the quantity of fuel above or below a certain amount, is the price above or below a certain amount, etc.).

Purchase processing computer 1730 will then match the purchase transaction corresponding to the purchase information 1792 to an account by issuing an account information request 1786 to account manager computer 1720 comprising an identifier for an employee's account, where the identifier corresponds to data received in purchase information 1792. Account information 1790 matching the identifier will be received from account manager computer 1790 and comprise information regarding the employee's account, such a protected fuel grade, program price at which the employee is protected, number of gallons in virtual reserve, etc. Based on the account information 1790 and purchase information 1792 charges to assess to the employee or the program partner, if any, may be determined utilizing charge determiner 1732. Any such charges are generated as program partner charges 1794 or employee charges 1798, where the program partner charges 1794 may be configured as a text file including a consumer identifier and a charge amount owed by the program provider which may comprise such information as total amount spent, gallons and a servicing fee charged by operators of price protection system 1700 while the employee charge 1796 may be a file configured to be provided to the employer such that the any amount to be paid by the employee under a transaction may be deducted from an employee's check by the employer. It should be noted that while certain embodiments of the present invention may provide advantages, such as not incurring additional transaction fees from a credit card company, by allowing employee charges to be deducted from employee's checks, other embodiments may allow employee charges to be paid in other ways, such as by credit or debit card as in other embodiments discussed above.

Report generation computer 1740 is configured to generate reports based upon account information. These reports may include an employee report 1742 for presentation to a specific employee and program partner report 1744 from a program partner. More specifically, in one embodiment, report generation computer 1740 may be configured to receive report request 1746 comprising an indication of a type of report to be generated and any associated data, such as a particular employee, set of employees, geographical area or other parameters corresponding to a desired report.

Accordingly, report generation computer 1740 may issue an account information request 1786 comprising a request for account information to generate the report corresponding to report request 1746 such as account information pertaining to one or more employees and data related to the employee(s) such as the number of gallons left in a employee's virtual reserve, number of gallons purchased, price at which fuel was purchased under the benefits program, how much is to deducted from an employee's check, etc. Report generation computer 1740 may then transform the received account information 1798 into a report responsive to the report request 1746, which may include a program partner report 1744 or consumer report 1742. A program partner report 1744 may comprise data, or the results of an analysis of data, corresponding to the set, or some subset, of employees participating in the benefits program offered by the program partner such as an analysis of purchase prices paid by the employees, a geographical breakdown of the employees, a price and geographic break down of employees, analysis of number of gallons left in the employee's virtual reserve, future projections related to the employees or almost any other type of analysis desirable. An employee report may comprise data or the results of an analysis of data corresponding to a particular employee, including the number of gallons placed in the virtual tank during a period, number of gallons still remaining in the virtual tank, gallons rolled over from a previous time period, program level of the employee, etc.

After reading the above it should be noted that in addition to performing the specific functionality and transformations discussed, each of account manager computer 1720, purchase processing computer, report generation computer 1740, enrollment computer 1750 and interface provider computer 1710 may be a general purpose computer of the type known in the art having a central processing unit ("CPU"), at least one read-only memory ("ROM"), at least one random access memory ("RAM"), at least one hard drive ("HD"), or one or more input/output ("I/O") device(s). Furthermore, it will be realized that although account manager computer 1720, purchase processing computer 1730, report generation computer 1740, enrollment computer 1750 and interface provider computer 1710 are depicted as separate computers, the functionality described with respect to these computers may be combined into one or more computers, including one or more general purpose computers.

Figure 18A:
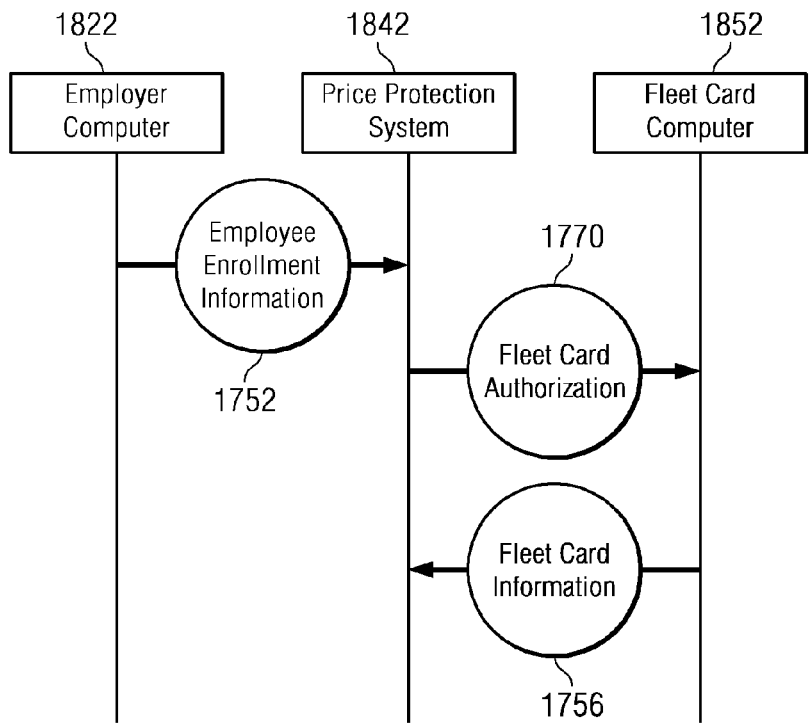
FIG. 18A is a block diagram illustrating one embodiment of an information flow utilizing a price protection system.
Figure 18B:
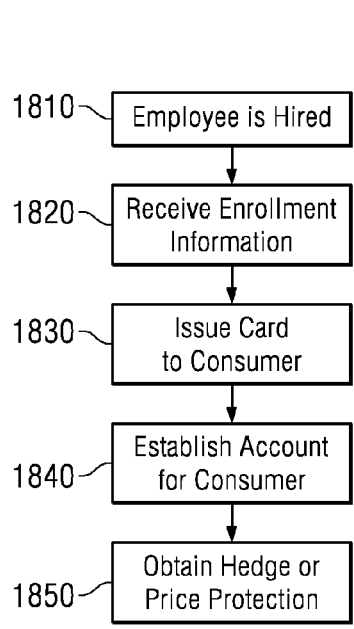
FIG. 18B is a flow diagram illustrating one embodiment of a method for enrollment.

Moving now to FIGS. 18A and 18B, one embodiment of a method and associated information flow a process of enrolling an employee in a benefits program related to fuel purchasing offered by an employer utilizing a price protection system is depicted. Referring conjointly to FIGS. 18A and 18B, at step 1810 a consumer may decide to interview with a particular employer. During the interview process, or when providing information related to employment the employer informs the potential hire that the employer offers a benefits program to employees related to the purchase of fuel and that the employee would be eligible for such a program. Such a benefits program may, be based on employee's tenure or other status with the employer and may provide a monthly or yearly allotment of fuel to the employee such that the employee may purchase that allotment at a program price or a fixed discount from the retail price. Any charges related to the purchase of the fuel under the benefits program may be deducted directly from the employee's check. Any unused allotment of fuel remaining at the end of a particular time period may be rolled over to the next time period. Based on this incentive program or other considerations the consumer may then decide to accept an offer of employment from the employer.

When the employee hires on with the employer he becomes eligible for the benefits program and thus the employer may provide enrollment information concerning the employer to the price protection system responsible for implementing at least a portion of the benefits program in conjunction with its program partner the employer such that the employer enrollment information is received at the price protection system at step 1820. This step may entail the employer utilizing an interface provided by a price protection system 1842 to enter information such as the employee's ID, a unique driver ID, the employee's name, the employee's hire data the employee's location etc. This employee enrollment information 1752 is then communicated to, and received by price protection system 1842. The entry or communication may be accomplished, for example, using an interface provided by price protection system 1842 such as one or more web pages, FTP locations, etc. Alternatively, the employee enrollment information may be communicated from employer computer 1822 to price protection system 1842 as part of a batch file (for example, in Excel) sent at the inception of the benefits program so that data for multiple employees may be loaded en masse.

Once employee enrollment information 1752 is received, an identification or payment mechanism such as a fleet card may be issued to the consumer enrolling in the program at step 1830 by sending fleet card authorization 1770 from price protection system 1842 to fleet card computer 1852. This fleet card authorization 1770 may comprise any information intended to notify a fleet card company of a status change, including for the issuance of new cards and utilized by a fleet card company to issue a card and may include such information as a driver, account or employee ID, a PIN number to use, the employee name, the employee hire date, etc. Fleet card information 1756, including an assigned number (for example CARD ID), expiration etc. may be returned from fleet card computer 1752 to price protection system 1742. The fleet card itself may then be sent from the operators of fleet card computer 1752 to the employee via mail.

At step 1840 then an account may be established for the consumer, including, for example, one or more identifiers for the consumer, data corresponding to the employee such as a level for the employee, an allotment per time period, etc., data corresponding to the fleet card issued to the employee, a virtual tank storing the amount or allotment of fuel the consumer is eligible to purchase under the program or for some portion of the program, or any other type of information which it may be desired to keep or which may be useful in implementing the benefits program.

If desired, at step 1850, a hedge or other form of price protection may be obtained by the employer, the operators of price protection system or both. Whether, who, and what type of, hedge is obtained may vary based on the financial arrangements between of operators of the price protection system and the employer. For example, in one embodiment an employer may pay a fee to operators of price protection system for implementing such a benefits program. However, in cases such as these the employer may take on the risk associated with the price of fuel going above the program price associated with the benefits program provided to the employee. Here, the employer may choose to obtain a hedge against such a risk, either in the market or by purchasing one or more products from a financial institution designed to at least partially protect the employer against such risk. Alternatively, employer may, in addition to paying operators of price protection system for the provisioning of the incentive program also pay operators of the price protection system for one or more products designed to protect the employer against the risk of increased fuel prices. In this case, operators of price protection system may themselves desire to obtain a hedge against their risk by, in one embodiment, purchasing a product from a financial institution to protect them from such risk or by hedging their risk directly in one or more markets. It will be apparent from the above description that the scenarios depicted are exemplary only and that other arrangements of payments and hedging will be possible and may depend on the type and amount of risk borne by various parties involved in the provisioning and implementation of such an incentive program.

Figure 19B:
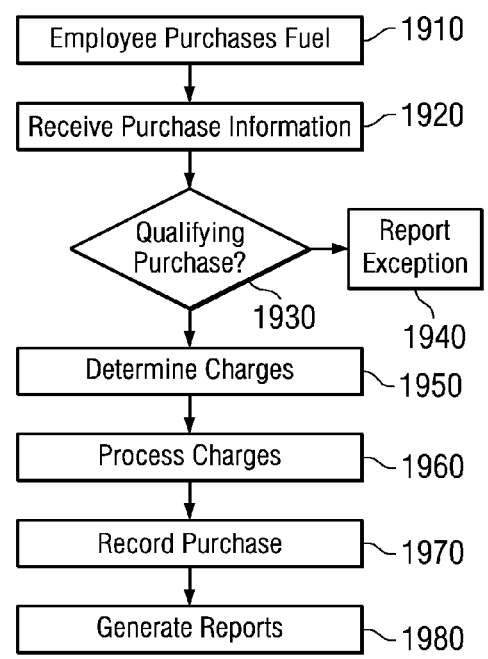
FIG. 19B is a flow diagram illustrating one embodiment of a purchase involving a price protection system.
Figure 19A:
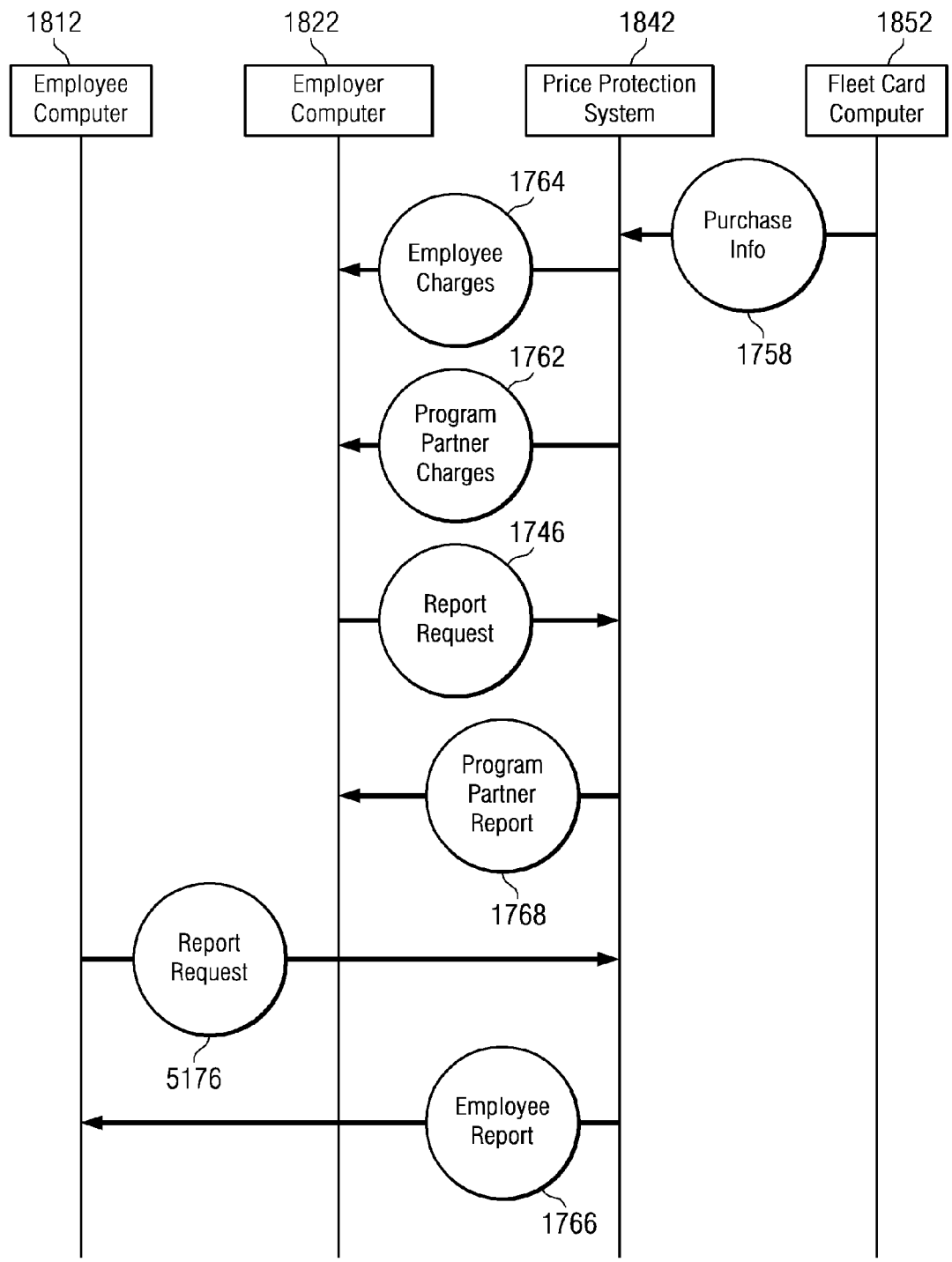
FIG. 19A is a block diagram illustrating one embodiment of an information flow utilizing a price protection system.

Continuing on now to FIGS. 19A and 19B a method and associated information flow for a process of processing a transaction according to an benefits program related to fuel purchasing offered by an employer is depicted. Referring conjointly to FIGS. 19A and 19B, an employee enrolled in an incentive program related to the purchase of fuel may purchase fuel using the fleet card provided in association with the program at step 1910. Thus, when this purchase occurs, or at some later point, fleet card computer 1852 may receive point of sale (POS) data from the fuel vendor (for example, a computer associated with a retail point of sale location, etc.). This POS data may comprise what is known as level-3 transaction data pertaining to the purchase.

At step 1920 this purchase information 1738 may be communicated from fleet card computer 1852 to price protection system 1842. Specifically, the fleet card computer may determine that the purchase was made by an employee enrolled in a benefits program (for example, using the fleet card number provided in the transaction data) and thus send the purchase information 1738 to the price protection system 1842. The purchase information 1738 may be in a batch file comprising transaction data from multiple purchases by multiple consumers enrolled in such an incentive program. Specifically, in one embodiment, purchase information 1738 may be a data file comprising all the transactions which have occurred under the benefits program in a given time period, including retail pint of sale location identifiers, price per gallon of the transaction, total purchase amount, fuel type, driver identifiers or card identifiers. Additionally, purchase information 1738 may include totals, including the total amounts owed to the fleet card provider calculated by adding the retail expenditures plus any processing fees charged by the fleet card provider minus any discount or credits.

It can then be determined at step 1930 whether the purchase qualifies under the benefits program at step 1930. This determination may be made using a variety of criteria such as whether certain data is outside certain ranges (for example, price too high/low, quantity too high/low), whether the transaction data corresponds to a employee with an account, whether the employee has any amount left in his virtual tank, whether the employee has exceeded his allotment for a time period (that day, that month, etc.), or a wide variety of other qualification parameters which may be noted from a review of this disclosure. If the purchase does not qualify the purchase may be reported as an exception (for example, to a provider of the fleet card or an employer) at step 1940.

If the purchase does qualify, charges corresponding to the purchase by the employee may be determined at step 1950. In one embodiment, this determination is made by applying a set of rules corresponding to the benefits program in which the consumer is enrolled to the purchase. Applying these rules may, for example entail determining if the employee is over a gallon limit (for example, how many gallons the employee has left in his virtual reserve) and if the employee is over the limit charging the employee the retail price at the pump, determining if the fuel purchased is of the grade corresponding to the benefits program (for example, regular versus premium, etc.), determine if the price is above the program price and thus whether to apply a fixed discount to the retail price, etc. It will be apparent that a whole host of other or different rule may be applied and the specific rules applied in any embodiment may vary depending on the type of benefits program implemented. Additionally, if the employer has purchased price protection from operators of the price protection system additional or different rules which incorporate the terms of the obtained price protection may also be utilized to determine any charges.

From the application of the rules then, charges to be paid by the employee and the employer may be determined (where either or both of these charges may be zero) and then processed at step 1960. The processing of these charges may, in one embodiment, entail sending employee charge 1764 from price protection system 1842 and program partner charge 1762 to employer computer 1822. Employee charge 1764 may identify the portion of the purchase transaction which should be charged to the employee. In particular, in one embodiment employee charge 1764 may be a formatted file which may be uploadable to a payroll system utilized by the employer such that the payroll system may substantially automatically deduct any amount to be charged to the employee from a payroll check to be issued to the employee. Such a file may include, for example, an identifier for the employee, the total for a transaction, the total to be billed to the employer and the employee under this transaction. In some embodiments, employee charge 1764 may comprise multiple transaction corresponding to single or multiple employers and may also correspond to a time period, such as, for example, a pay period utilized by the employer.

Similarly program partner (in this case the employer) charges 1762 may be sent from price protection computer 1842 to employer computer 1822 where the program partner charges 1762 may detail the charges owed by the employee to the providers of price protection system 1842 under the purchase, including the total amount of the purchase, total number of gallons, and type of servicing fees, etc. Again, program partner charges 1762 may be a file which corresponds to multiple transactions by multiple employees which may comprise information such as total spent by employees in a time period, total number of transactions, total number of gallons, and total servicing fees in addition to information corresponding to each individual transaction.

Reports corresponding to this purchase, an employee, the manufacturer or some other criteria may then be generated at step 1980. Employee report 1766 or program partner report 1768 may be generated in response to a received report request 1746 issued through an interface provided by price protection system 1742, or may automatically be generated once or on a periodic basis. In one embodiment, a report for an employee 1766 may be generated and sent to an employee's computer 1812 through an interface presented by price protection system 1842 and utilized by an employee to interact with price protection system 1842 to access, manage, update or perform other actions with respect to the benefits program in which they are enrolled and their account under the benefits program. Employee report 1866 may comprise a usage summary comprising an online report of usage of the employee's fleet card, a rollover summary comprising an online report of unused amounts in the virtual tank which may be carried over to a succeeding time period, a bonus summary comprising a report of gallons awarded to an employee (for example, at hire, each time period, for a referral, etc.) and an account overview comprising an online report of profile information corresponding to the employee's profile. Thus, information may be presented, including, for example, a list of the employees purchases, charges, virtual tank (for example, amount of protected gallons remaining under the benefit program), pump price for each transaction, savings on each purchase, etc.

A program partner report 1868 may also be generated for the employer. This program partner report 1868 may, for example, include purchase transaction or other data related to the benefits program where such data may be broken down by one or more criteria such as geographical location, cost, amount, vehicle type, charge to employer, etc. and which may be presented in a variety of formats, including textually or graphically.

It will be noted that the above examples of consumer reports 1866 and program partner reports 1868 are examples only and that a wide variety of other data may be presented, criteria utilized to create these reports, etc., that such reports may be generated at the behest of employees or manufacturers and that such reports may be presented using a variety of formats and technologies, including through interfaces such as web pages accessed through employee computer 1812 or employer computer 622 or via other methodologies such as mailing such reports.

Figure 20A:
Figure 20B:
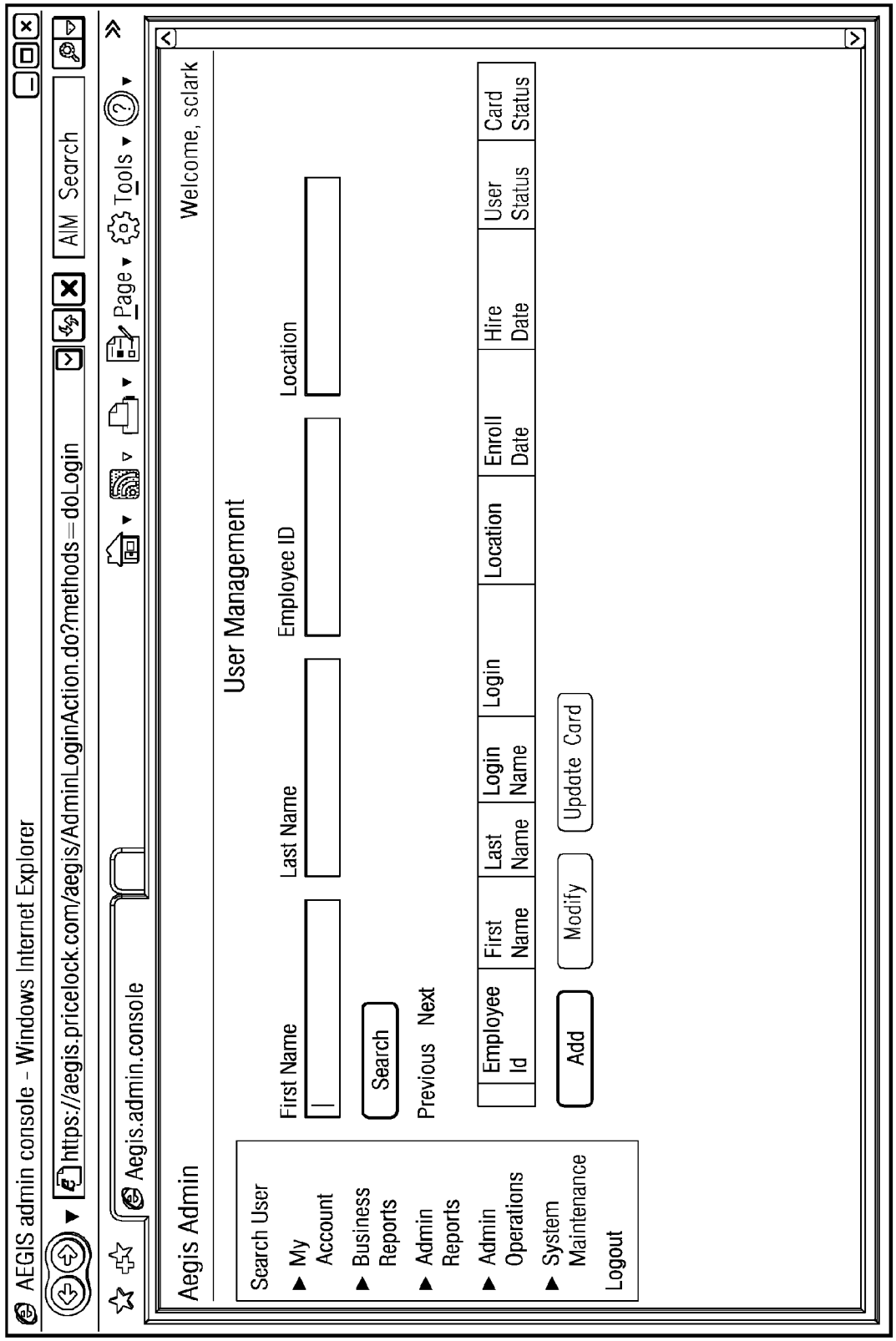
Figure 20D:
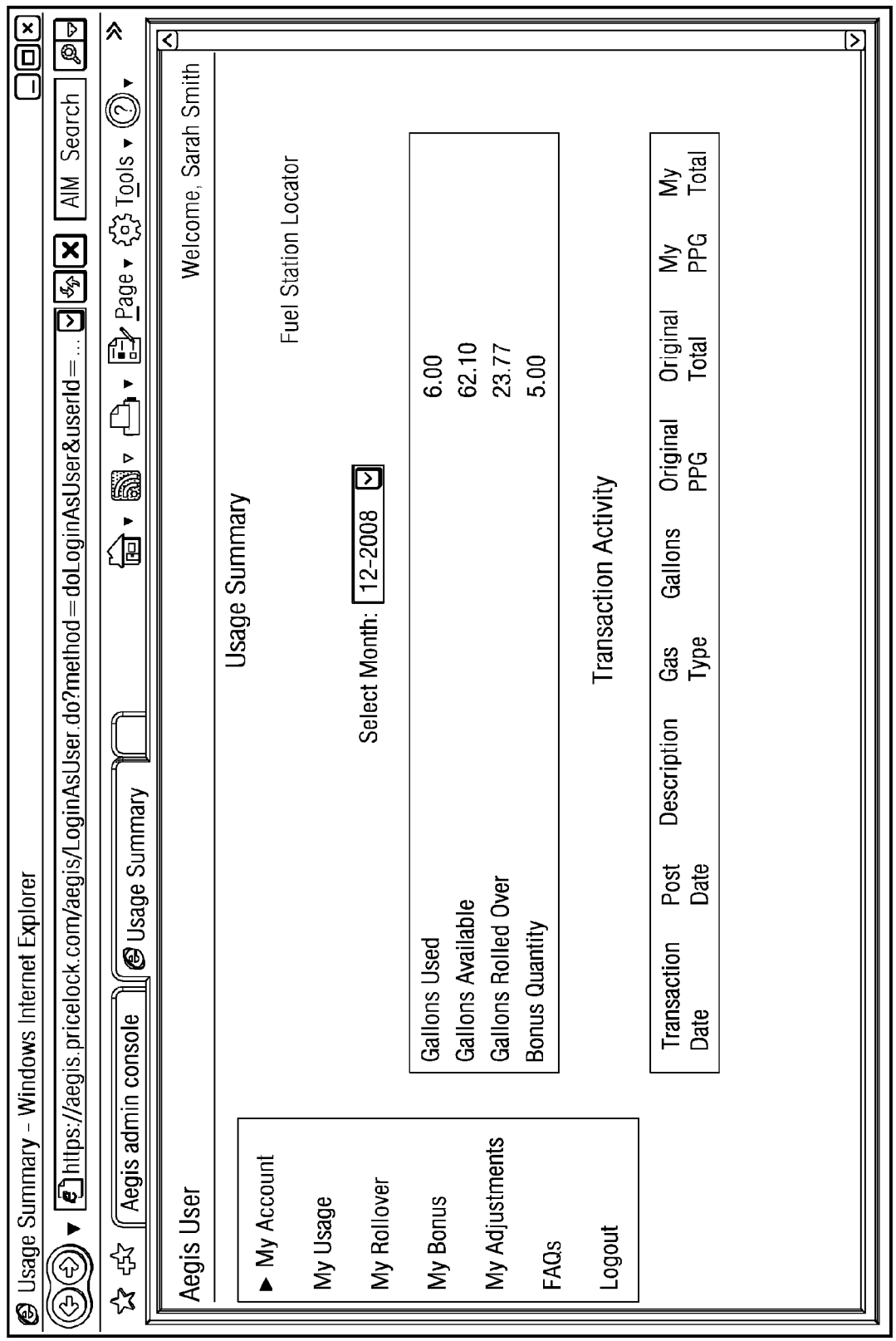
Figure 20G:
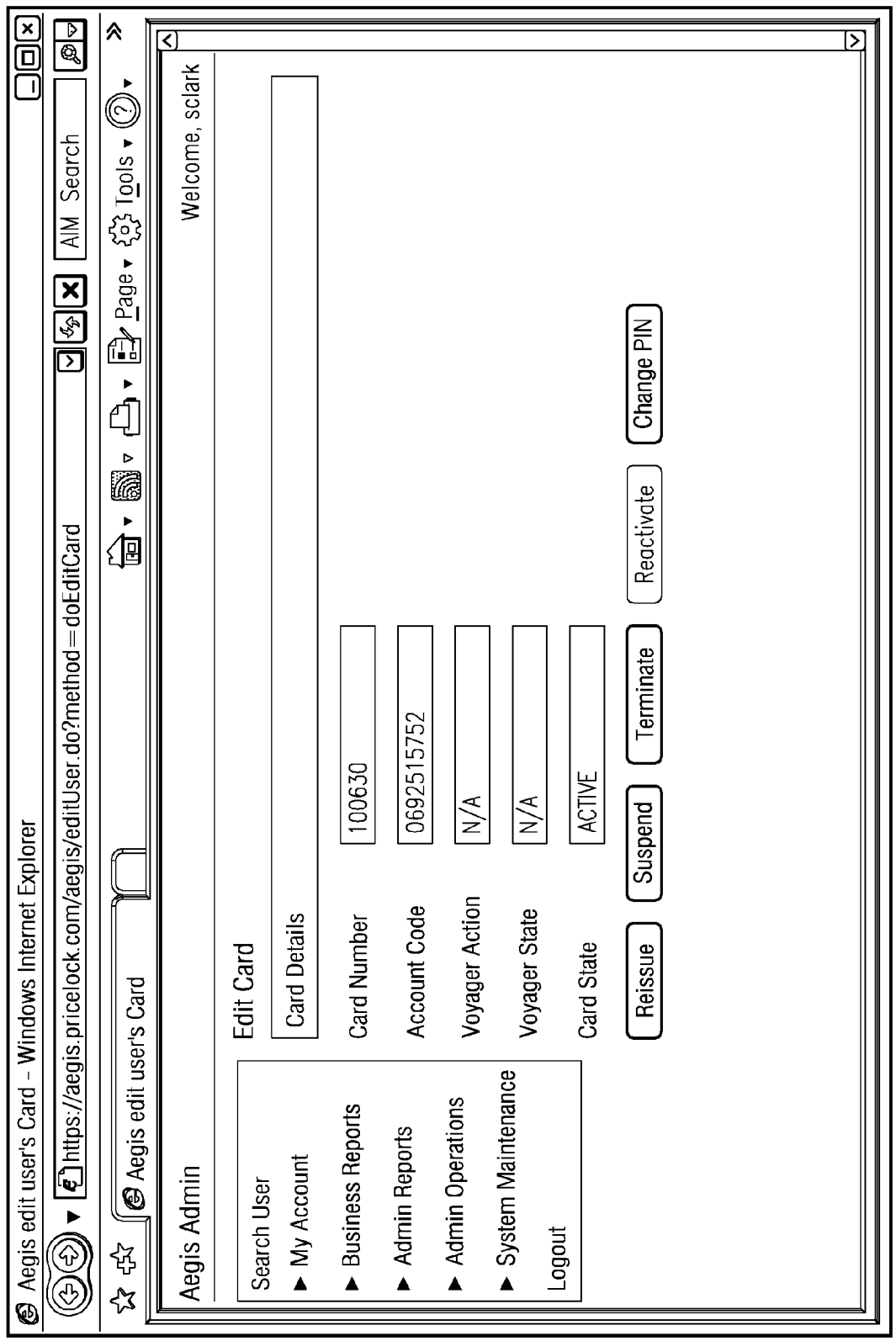
Figure 20H:
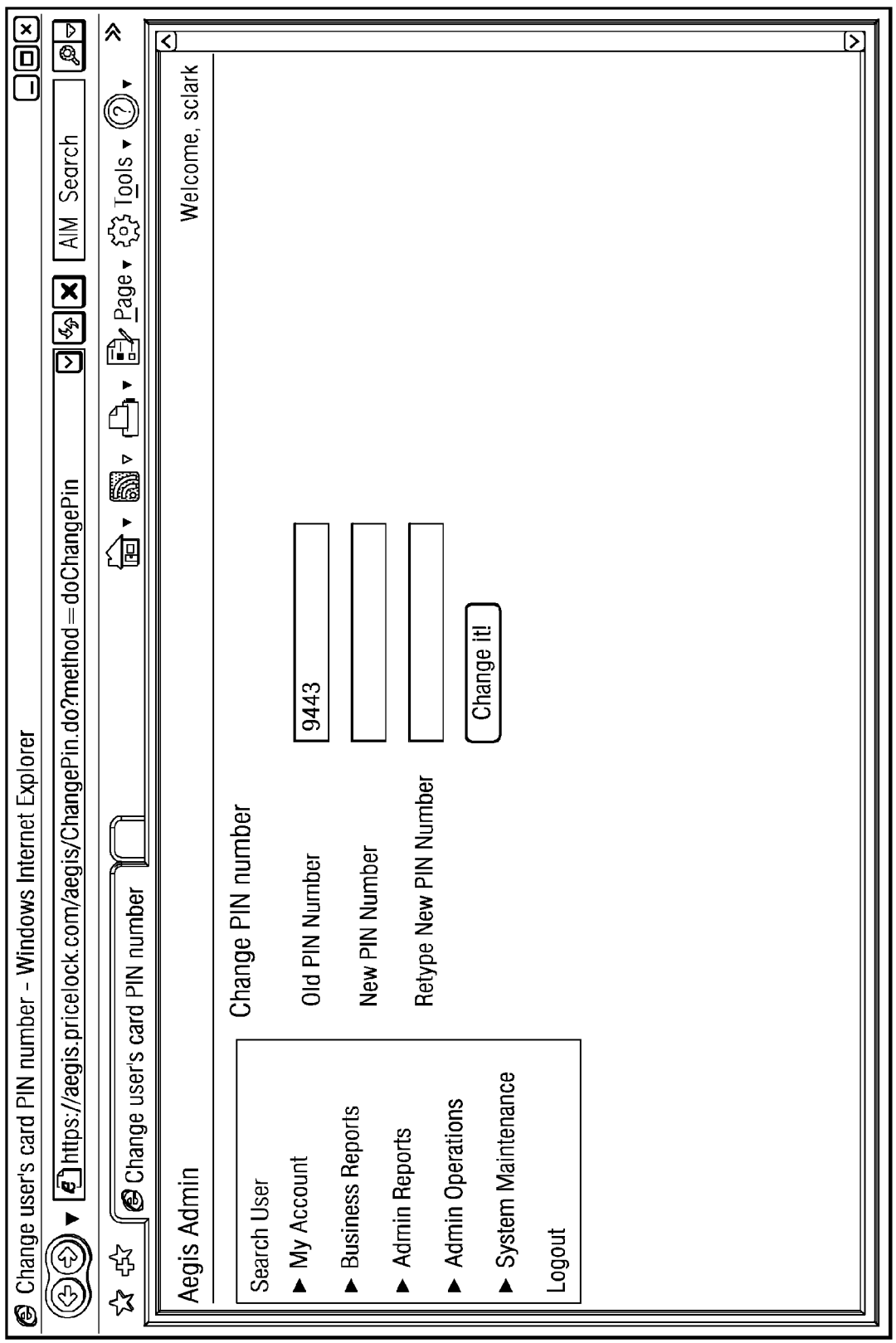

To illustrate examples of such interfaces, FIGS. 20A-20H depict embodiments of interfaces which may be provided by a price protection system for a employee or employer such that an employee or employer may interact with price protection system in conjunction with the provisioning of a benefits program to a consumer. Specifically, FIG. 20A depicts one embodiment of an interface that may be utilized by price protection system to present an employee report comprising a summary of an employee's usage to the employee. FIGS. 20B-20H depict embodiments of interfaces utilized by a price protection system to allow employees or employers to manage employee accounts.

In the foregoing specification, the invention has been described with reference to specific embodiments. However, one of ordinary skill in the art appreciates that various modifications and changes can be made without departing from the scope of the invention as set forth in the claims below. For example, though certain embodiments have been described in conjunction with individual purchasers other embodiments will be understood to apply equally well to the provisioning of incentive programs with fleet purchases of vehicles, etc. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for providing a price protection program using a price protection system coupled to a network and comprising one or more computing devices having a processor, the price protection system comprising an account manager computer and a purchase processing computer, and an employer computer, comprising:

receiving enrollment information corresponding to an employee from an employer computer via the network, wherein the enrollment information comprising an identifier for the employee, one or more of the model and manufacturer of an automobile used by the employee and the distance the employee lives from the employer, and one or more of the type of the employee, the role of the employee, the tenure of the employee and the level of the employee is for enrolling the employee in a price protection program provided by the employer, the price protection program specifying a program price related to the purchase of a commodity within a locale and a payment method associated with the employer, the price protection program giving the employer the right to purchase the commodity, wherein for each purchase at a retail location of a plurality of retail locations within the locale, the commodity may be purchased at the program price if a retail price of the commodity is above the program price associated with the commodity and the locale or at the retail price of the commodity otherwise;

issuing the payment method associated with the price protection program to the employee;

establishing an account associated with the price protection program for the employee comprising the enrollment information at the account manager computer, wherein the account defines a quantity of the commodity that the employee is able to purchase at the program price;

receiving, by the purchase processing computer via the network, purchase information corresponding to a purchase of the commodity using the payment method from a fleet card computer over a network;

determining, by the purchase processing computer, if the purchase is a qualifying purchase corresponding to the price protection program;

determining, at the purchase processing computer for each qualifying purchase, an employee charge and an employer charge based on the retail price of the commodity associated with the qualifying purchase and a set of terms corresponding to the price protection program or the employee, wherein the set of terms comprises the locale and the program price based on the locale;

receiving, at the account manager computer via the network, update information, wherein the update information includes the identifier for the employee and an account update; and sending via the network the employee charge and the employer charge to the employer computer, wherein the account manager computer is further configured to perform:

receiving information pertaining to the employee;

analyzing the information to determine one or more of a remaining quantity of the commodity that the employee can purchase at the program price and purchase prices paid by the employee; and generating an employee report or an employer report.

2. The method of claim 1, wherein the update information comprises a bonus update including the identifier for the employee and an increase in the quantity of the commodity that the employee is able to purchase at the program price.

3. The method of claim 1, wherein the update information comprises an employee transfer including the identifier for the employee and a new address.

4. A non-transitory computer readable medium, comprising a set of instructions for providing a price protection program using a price protection system comprising one or more computing devices having a processor and coupled to a network, executable by the processor for:

receiving enrollment information corresponding to an employee from an employer computer coupled to the network, wherein the enrollment information comprising an identifier for the employee, one or more of the model and manufacturer of an automobile used by the employee and the distance the employee lives from the employer, and one or more of the type of the employee, the role of the employee, the tenure of the employee and the level of the employee is for enrolling the employee in a price protection program provided by the employer, the price protection program specifying a program price related to the purchase of a commodity within a locale and a payment method associated with the employer, the price protection program giving the employer the right to purchase the commodity within the locale, wherein for each purchase at a location of a plurality of retail locations within the locale, the commodity may be purchased at the program price if a retail price of the commodity is above the program price associated with the commodity and the locale or at the retail price of the commodity otherwise;

issuing a payment method associated with the price protection program to the employee;

establishing an account associated with the price protection program for the employee comprising the enrollment information, wherein the account defines a quantity of the commodity that the employee is able to purchase at the program price;

receiving purchase information corresponding to a purchase of the commodity using the payment method from a fleet card computer via the network;

determining if the purchase is a qualifying purchase corresponding to the price protection program;

determining for each qualifying purchase, an employee charge and an employer charge based on a retail price associated with the qualifying purchase and a set of terms corresponding to the price protection program or the employee, wherein the set of terms comprises a locale and the program price based on the locale;

receiving update information, wherein the update information includes the identifier for the employee and an account update; and sending via the network the employee charge and the employer charge to the employer computer, wherein the instructions are further executable to perform:

receiving information pertaining to the employee;

analyzing the information to determine one or more of a remaining quantity of the commodity that the employee can purchase at the program price and purchase prices paid by the employee; and generating an employee report or an employer report.

5. The non-transitory computer readable medium of claim 4, wherein the update information comprises a bonus update including the identifier for the employee and an increase in the quantity of the commodity that the employee is able to purchase at the program price.

6. The non-transitory computer readable medium of claim 4, wherein the update information comprises an employee transfer including the identifier for the employee and a new address.

7. A system for providing a price protection program, comprising:

an interface provider computer, configured to provide an interface;

an enrollment computer configured to receive enrollment information for an employee associated with an employer from the interface provider computer, wherein the enrollment information comprises an identifier for the employee, one or more of the model and manufacturer of an automobile used by the employee and the distance the employee lives from the employer, and one or more of the type of the employee, the role of the employee, the tenure of the employee and the level of the employee, determine if the employee is eligible for a price protection program offered by the employer using the enrollment information and obtain fleet card information corresponding to a fleet card issued to the employee, the price protection program specifying a program price related to the purchase of a commodity within a locale and a payment method associated with the employer, the price protection program giving the employer the right to purchase the commodity, wherein for each purchase at a location of a plurality of retail locations within the locale, the commodity may be purchased at the program price if a retail price of the commodity is above the program price associated with the commodity and the locale or at the retail price of the commodity otherwise;

an account manager computer configured to establish an account for the employee enrolled in the price protection program including the fleet card information and the enrollment information, access the account for the employee, modify the account and return information corresponding to the account, wherein the account defines a quantity of the commodity that the employee is able to purchase at the program price, wherein the account manager computer is further configured to receive update information, wherein the update information includes the identifier for the employee and an account update, wherein the update information comprises a bonus update including the identifier for the employee and an increase in the quantity of the commodity that the employee is able to purchase at the program price;

a purchase processing computer configured to receive purchase information corresponding to a purchase of the commodity, obtain account information corresponding to the employee, determine if the purchase is a qualifying purchase corresponding to the price protection program and determine an employee charge and an employer charge based on the retail price associated with the purchase and a set of terms corresponding to the price protection program or the employee, wherein the set of terms comprises the locale and the program price based on the locale; and a report generation computer configured to:
 receive information pertaining to the employee;
 analyze the information to determine one or more of a remaining quantity of the commodity that the employee can purchase at the program price and purchase prices paid by the employee; and
 generate an employee report or an employer report.

8. The system of claim 7, wherein the purchase processing computer is further operable to send the employee charge and the employer charge to an employer computer.

9. The system of claim 7, wherein the fleet card information and the purchase information are received from a fleet card computer via the network.

10. The system of claim 7, wherein the update information comprises a bonus update including the identifier for the employee and an increase in the quantity of the commodity that the employee is able to purchase at the program price.

11. The system of claim 7, wherein the report generation computer is configured to:
 provide the employee report or the employer report through the interface of the interface provider computer.

12. The system of claim 7, wherein the update information comprises an employee transfer including the identifier for the employee and a new address.

* * * * *